United States Patent
Finch

(10) Patent No.: US 10,358,179 B2
(45) Date of Patent: Jul. 23, 2019

(54) METHOD AND APPARATUS FOR MOVING A SHIP OVER LAND

(71) Applicant: Steven Caffall Finch, London (GB)

(72) Inventor: Steven Caffall Finch, London (GB)

( * ) Notice: Subject to any disclaimer, the term of this patent is extended or adjusted under 35 U.S.C. 154(b) by 0 days.

(21) Appl. No.: 15/565,150

(22) PCT Filed: Apr. 6, 2016

(86) PCT No.: PCT/GB2016/050964
§ 371 (c)(1),
(2) Date: Oct. 7, 2017

(87) PCT Pub. No.: WO2016/162671
PCT Pub. Date: Oct. 13, 2016

(65) Prior Publication Data
US 2018/0105218 A1     Apr. 19, 2018

(30) Foreign Application Priority Data

Apr. 7, 2015 (GB) .................................... 1505913.2
Jun. 1, 2015 (GB) .................................... 1509460.0

(51) Int. Cl.
*B62D 57/02* (2006.01)
*B65G 35/00* (2006.01)
(Continued)

(52) U.S. Cl.
CPC ............ *B62D 57/021* (2013.01); *B65G 7/02* (2013.01); *B65G 35/005* (2013.01); *B60V 3/025* (2013.01)

(58) Field of Classification Search
CPC ...... B62D 57/021; B62D 67/02; B62D 57/02; B65G 35/005; B65G 7/02; B65G 35/00
(Continued)

(56) References Cited

U.S. PATENT DOCUMENTS 3,537,540 A   11/1970 Zuppiger et al.
3,693,740 A    9/1972 Lewis
(Continued)

FOREIGN PATENT DOCUMENTS

CA      2180985 A1    2/1998

OTHER PUBLICATIONS

Search report on priority application GB1505913.2.
International Search Report on PCT/GB2016/050964.

*Primary Examiner* — Lars A Olson

(57) ABSTRACT

A ship or other large and heavy load may be supported on a fluid cushion comprising a two dimensional array of airbags constrained within elastic mesh compartments (81) and inflated by individual valve assemblies (188, 189, 231 . . . ) which are connected by a grid of airlines and distributed over a flexible web (60) separating respective horizontal layers of the assembly. The ship rests on an upper layer while the compartments of a lower layer are inflated and deflated in sequence to generate a travelling contraction which moves through the fluid cushion to translate its base surface over the ground in any desired direction of travel, with the load gradually moving by fluid pressure in the same direction. The deflated cushion assembly can be stored and deployed on a spool (see FIG. 1-3) rotated by a hydraulic motor. Independent claims are included to the cushion assembly including an elastic or other tension force generating means, the compartmentalized structure, the layered structure, the deployment spool, the distributed valve assemblies, and corresponding methods of operation.

23 Claims, 26 Drawing Sheets

(51) Int. Cl.
  *B65G 7/02* (2006.01)
  *B60V 3/02* (2006.01)
(58) Field of Classification Search
  USPC .................. 440/12.51; 198/630; 180/8.1, 8.5
  See application file for complete search history.

(56) References Cited

U.S. PATENT DOCUMENTS

| | | |
|---|---|---|
| 3,948,538 A | 4/1976 | Hovila |
| 4,227,608 A | 10/1980 | Alfthan et al. |
| 6,595,350 B1 | 7/2003 | Stouffer |

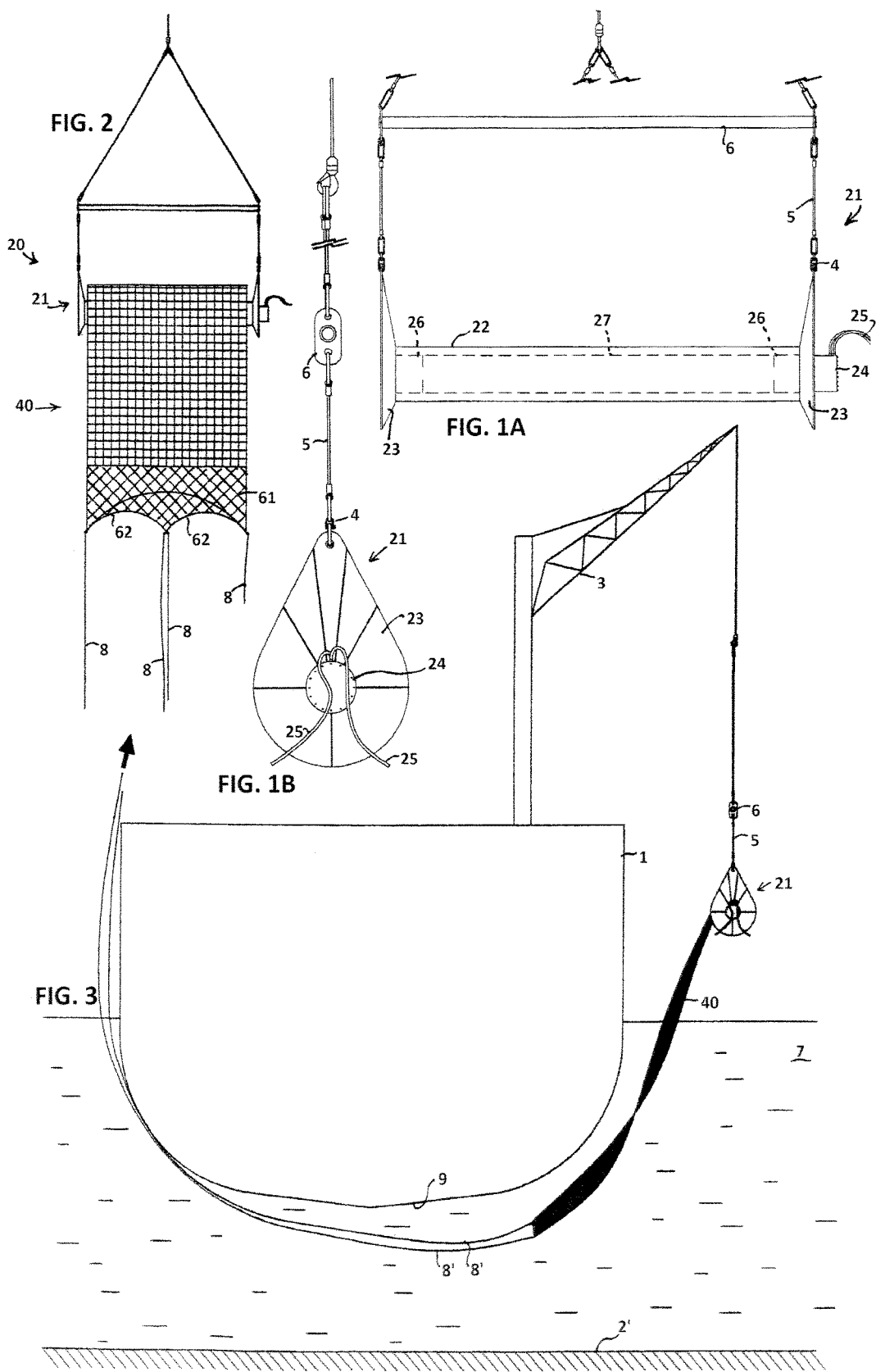

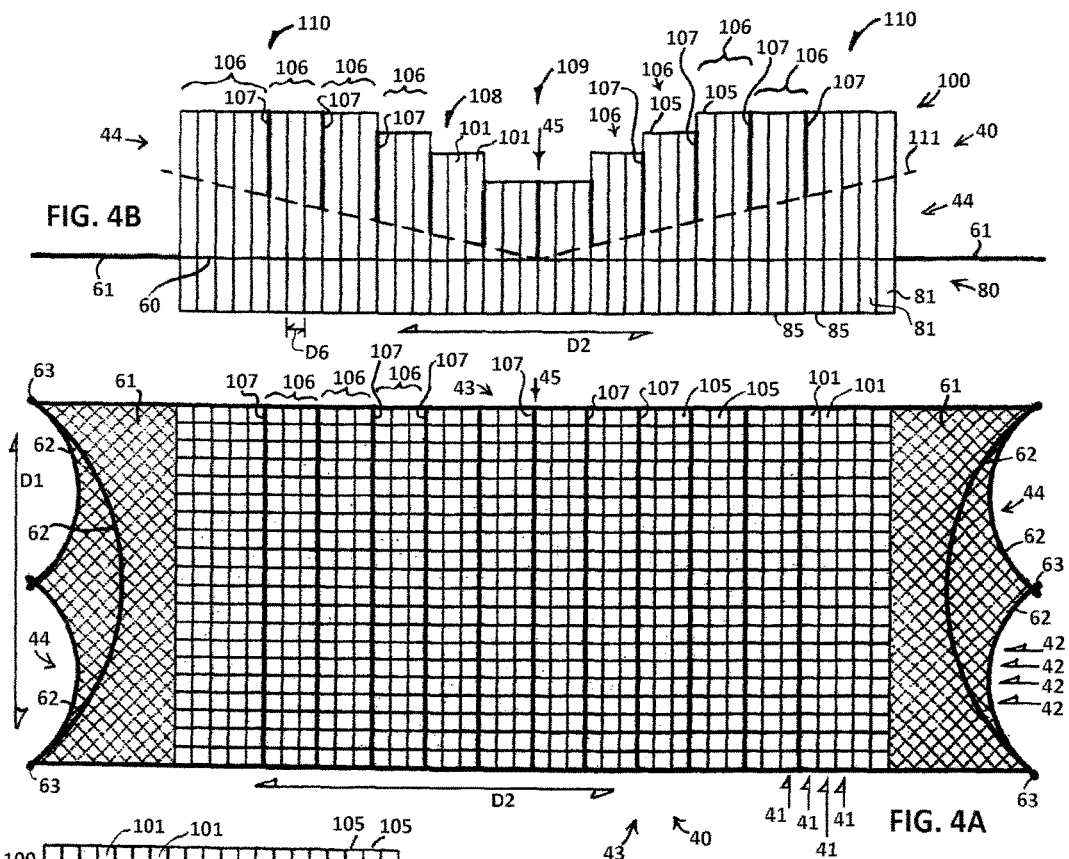
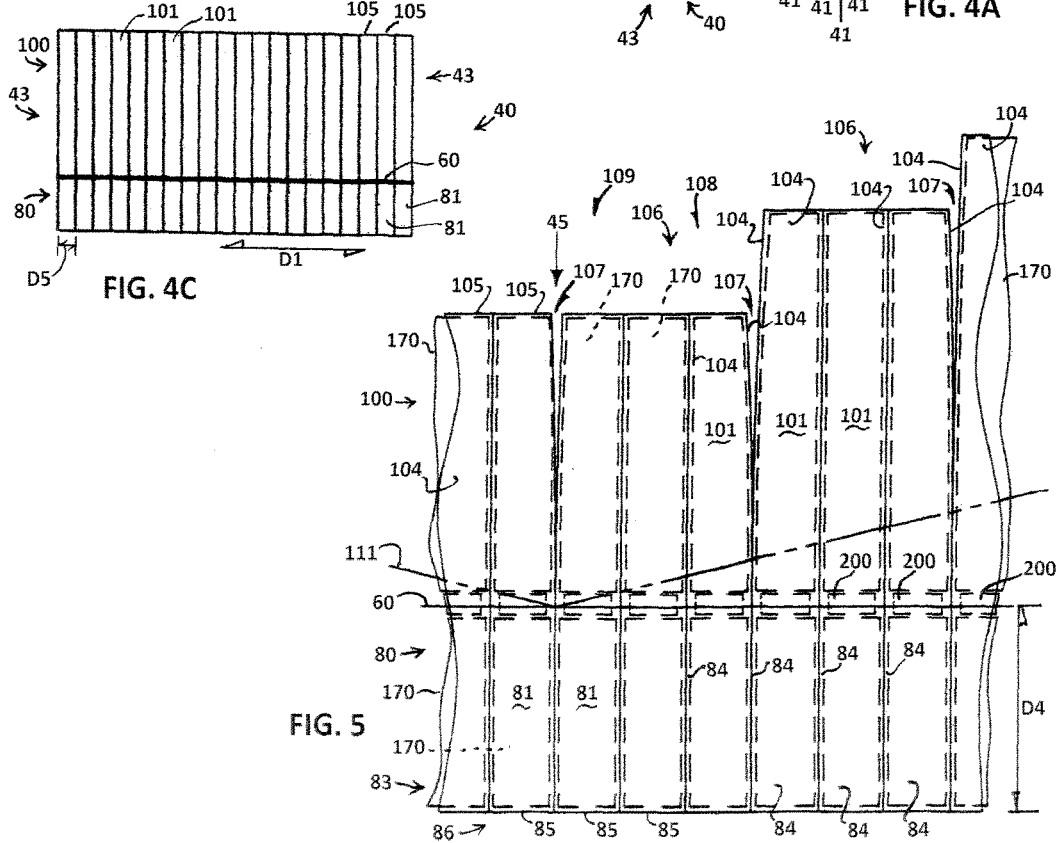

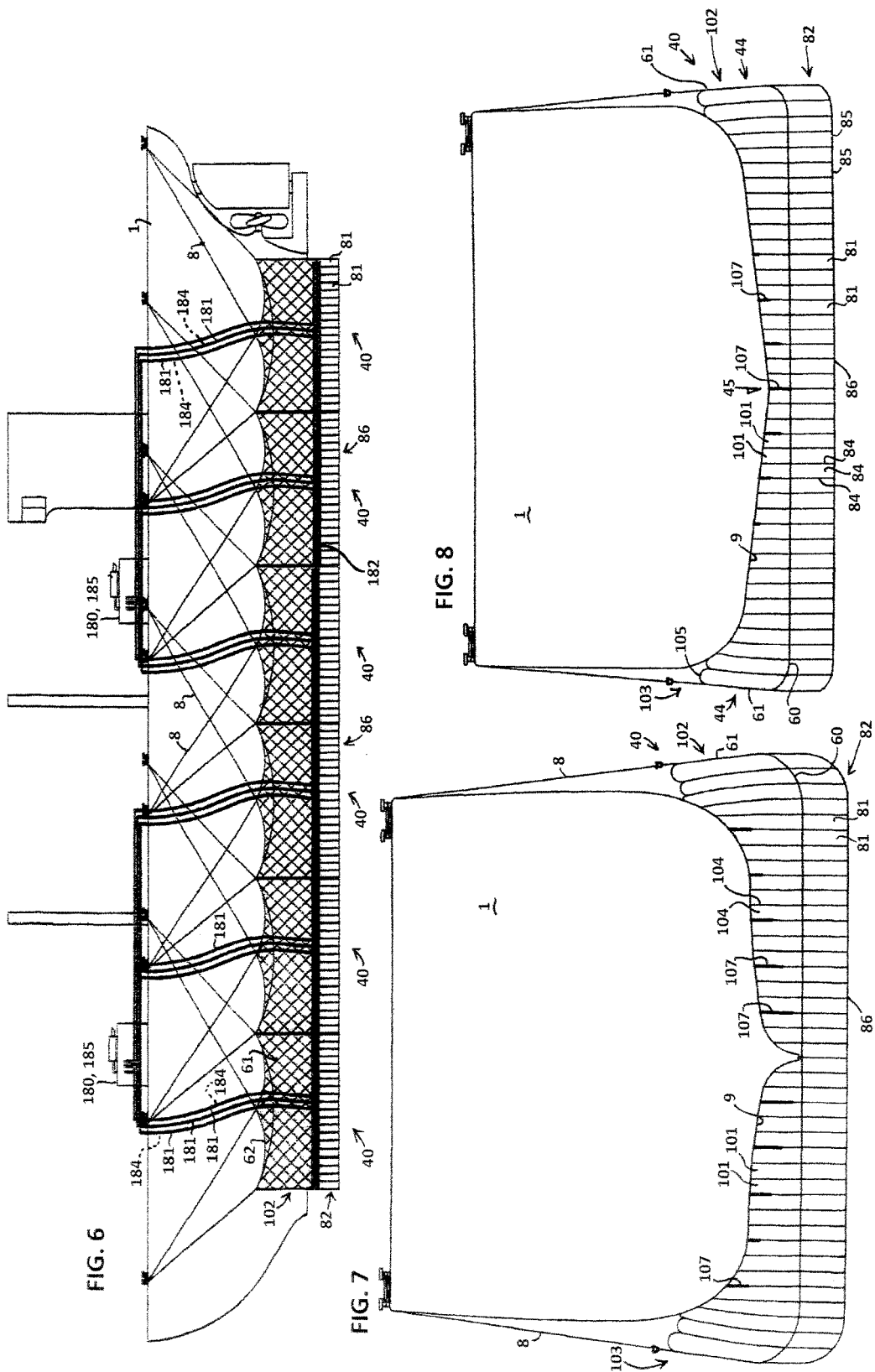

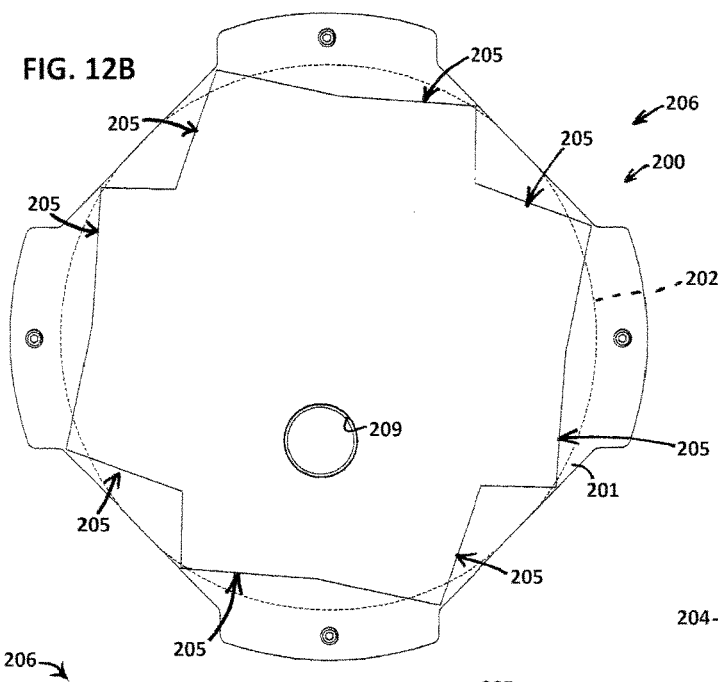
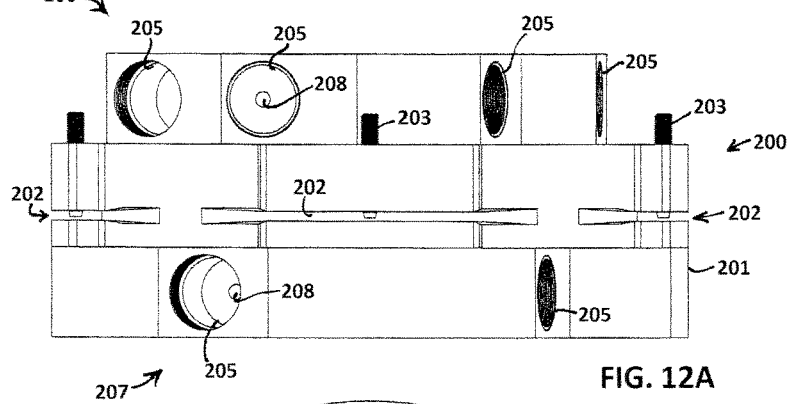
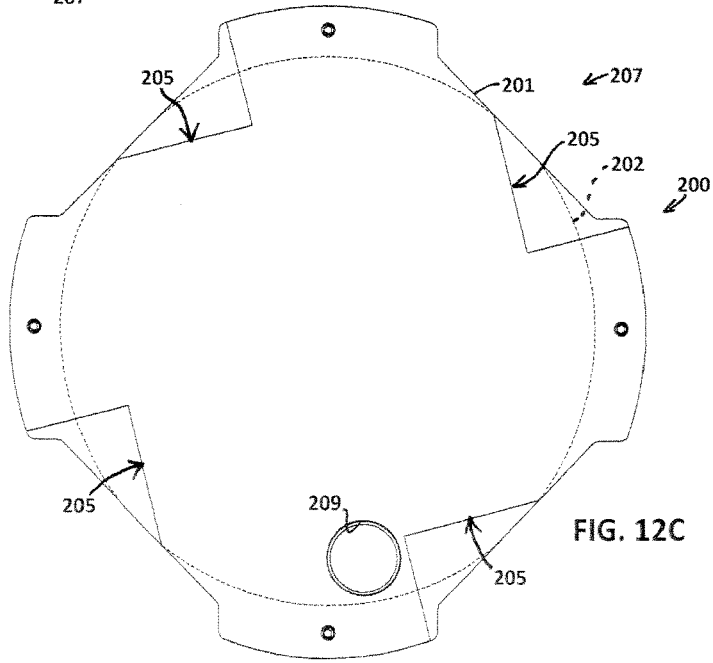
FIG. 12B
FIG. 13
FIG. 12A
FIG. 12C

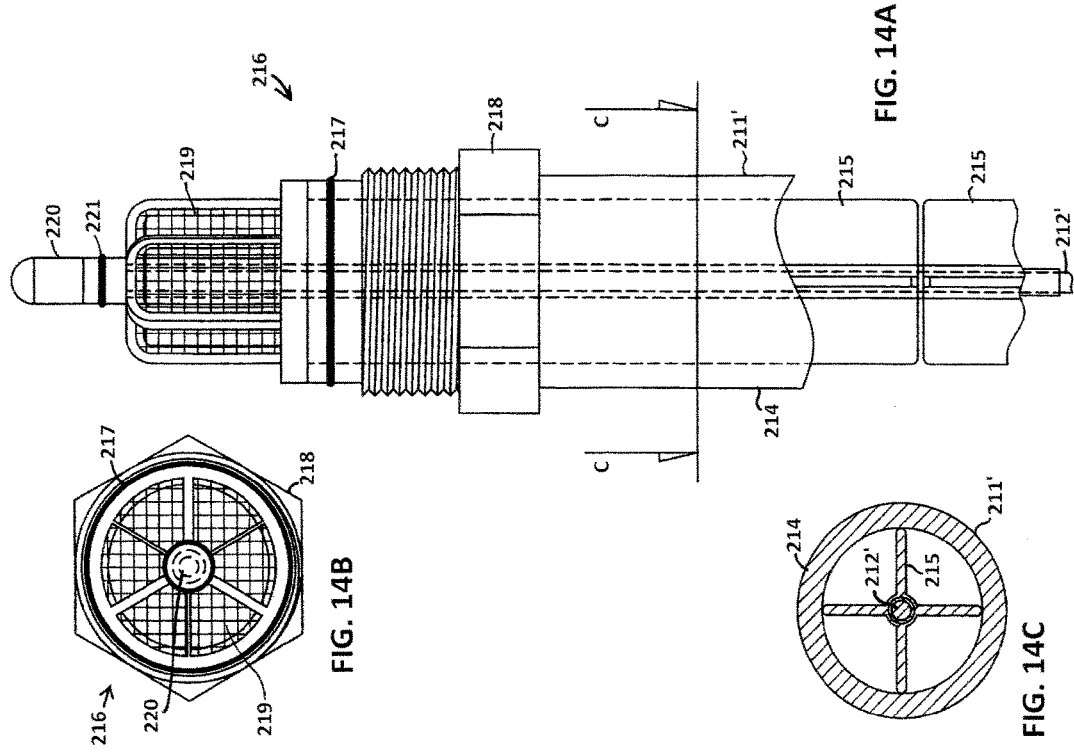
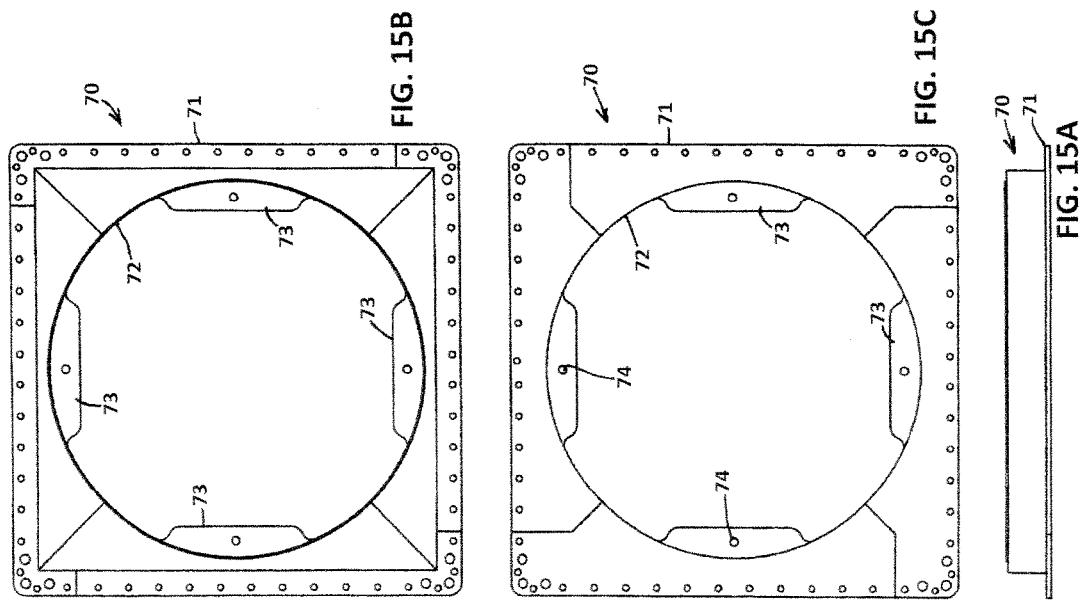

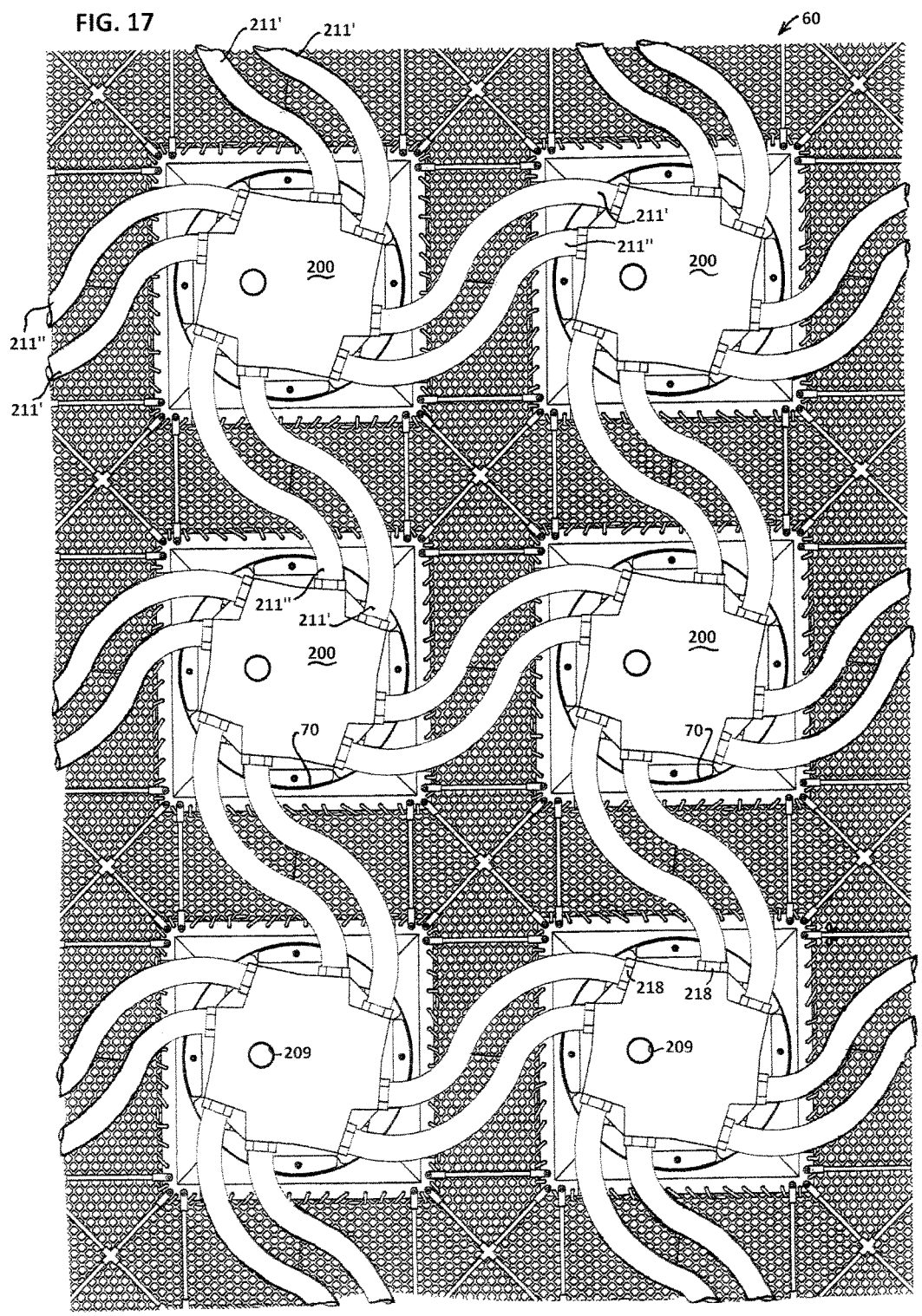

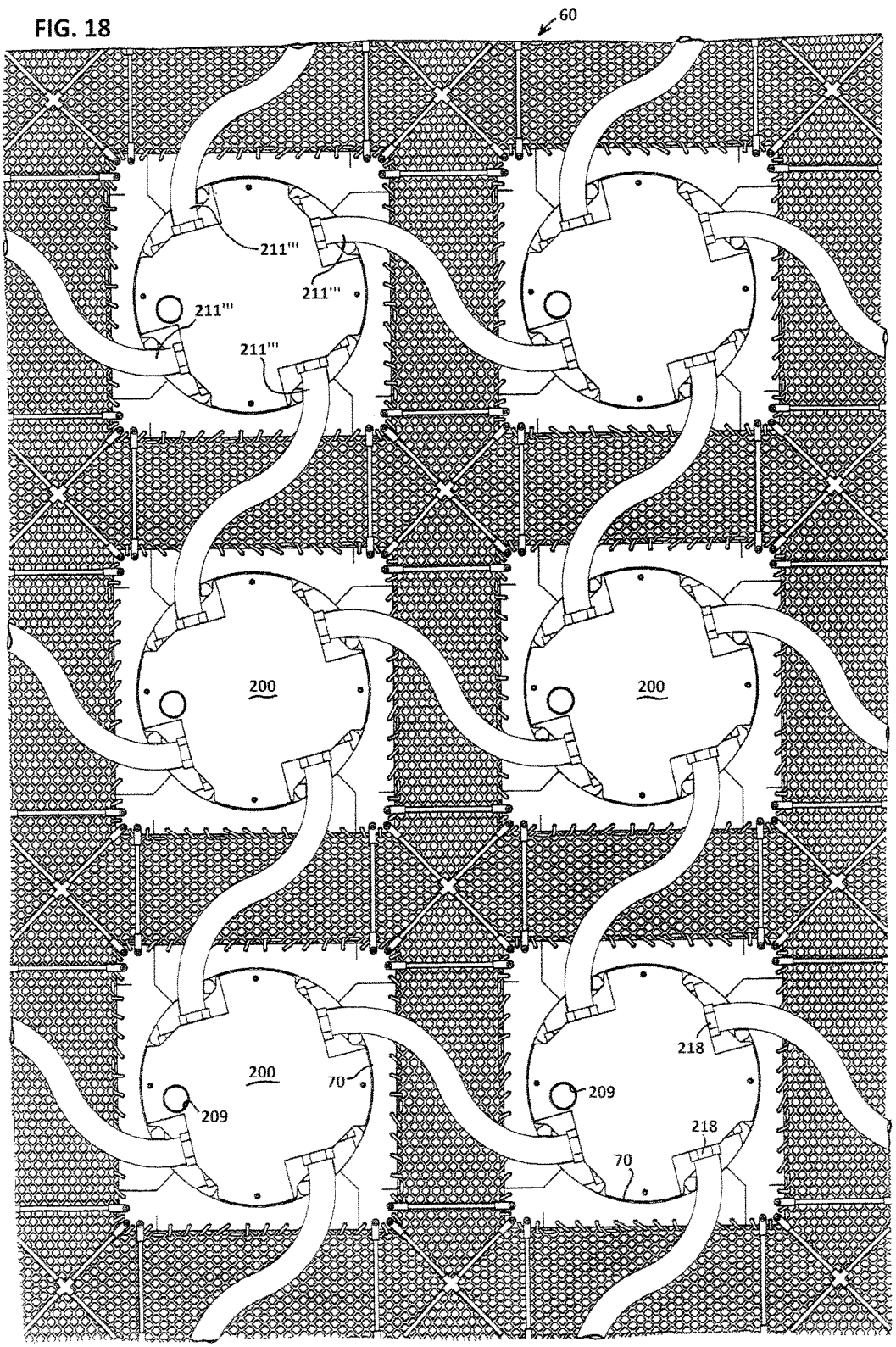

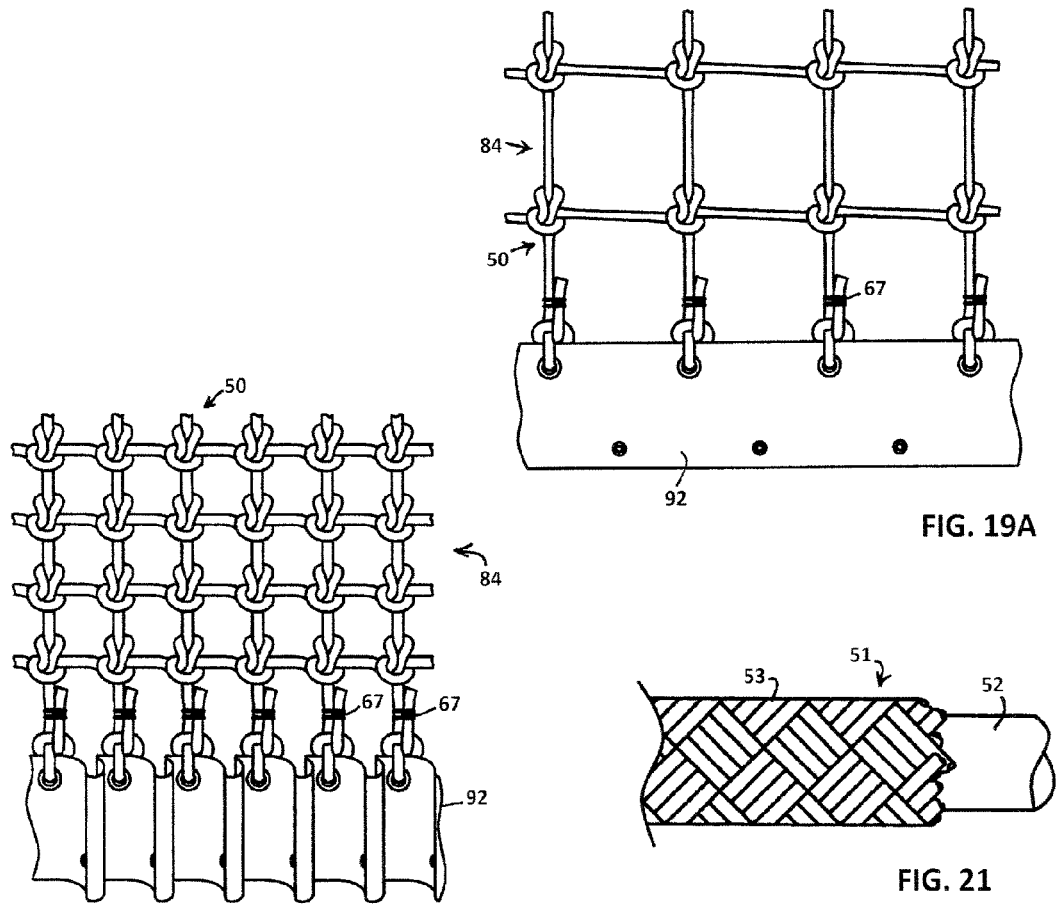
FIG. 19A
FIG. 19B
FIG. 21
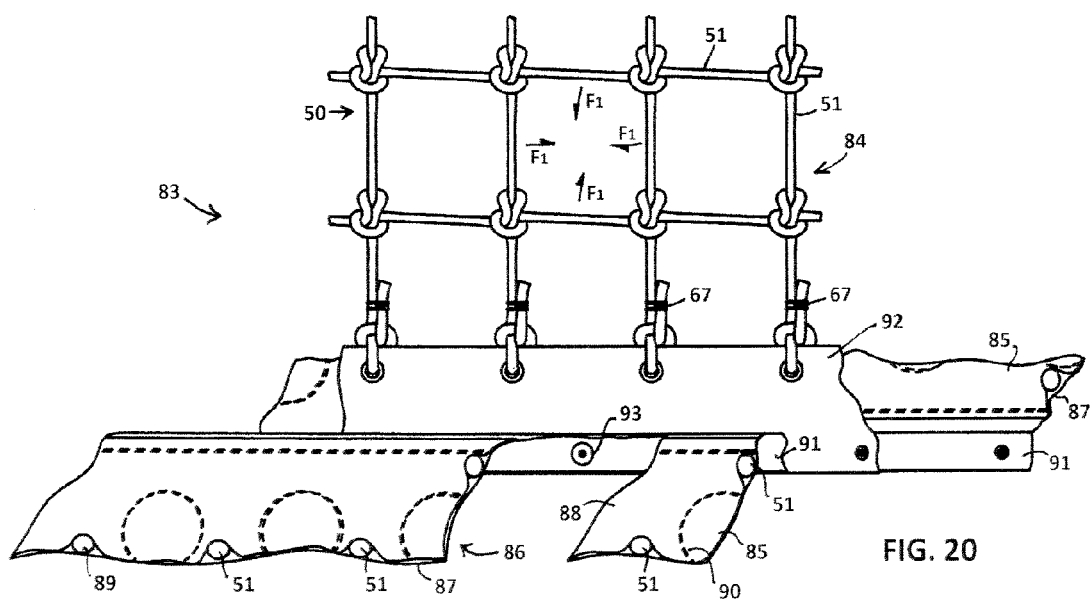
FIG. 20

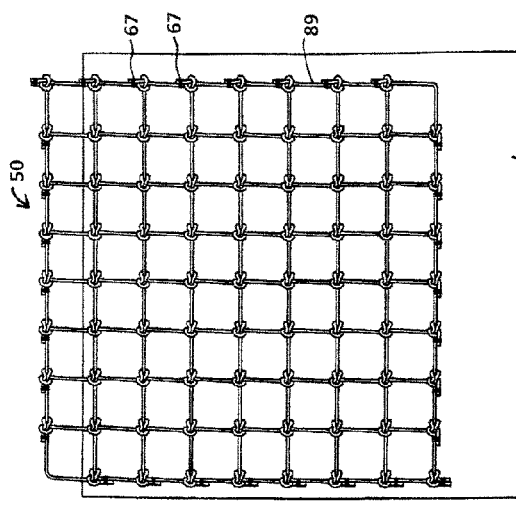
FIG. 23
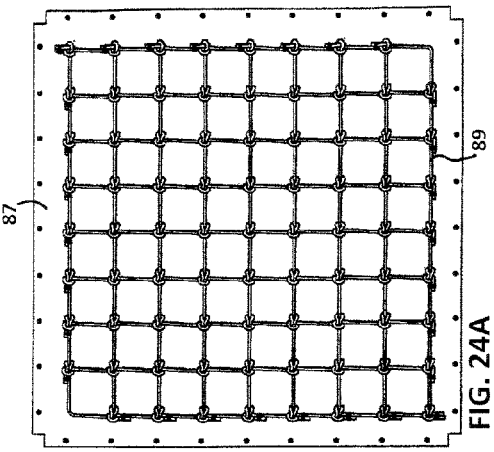
FIG. 24A
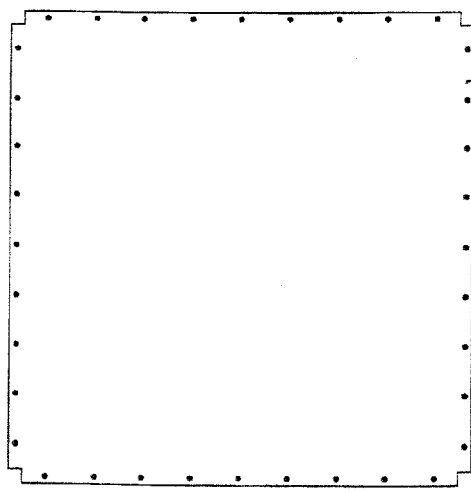
FIG. 22
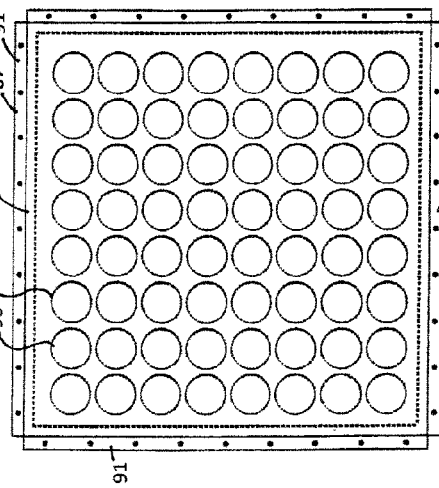
FIG. 24B
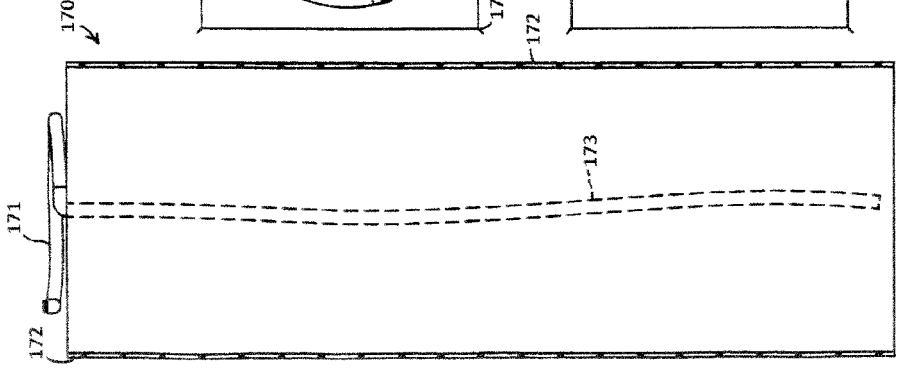
FIG. 25A
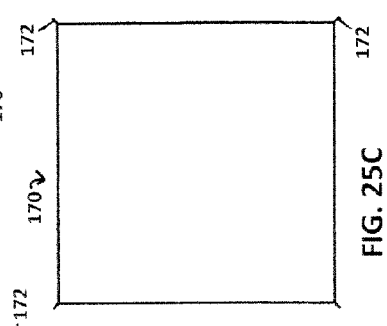
FIG. 25B
FIG. 25C

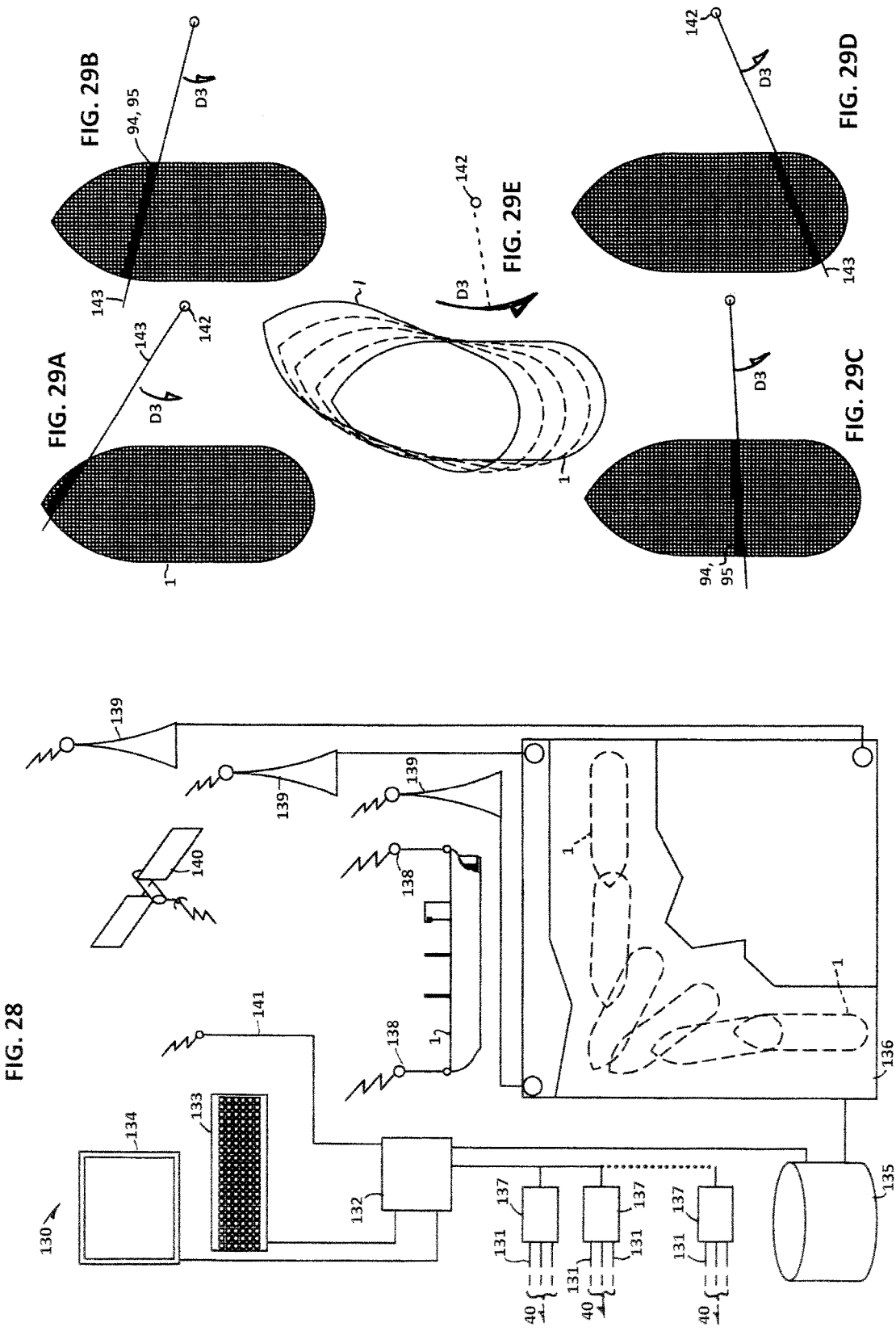

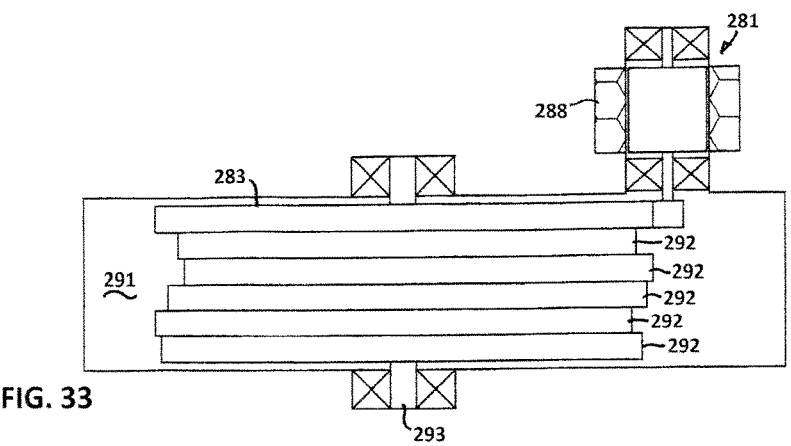
FIG. 33
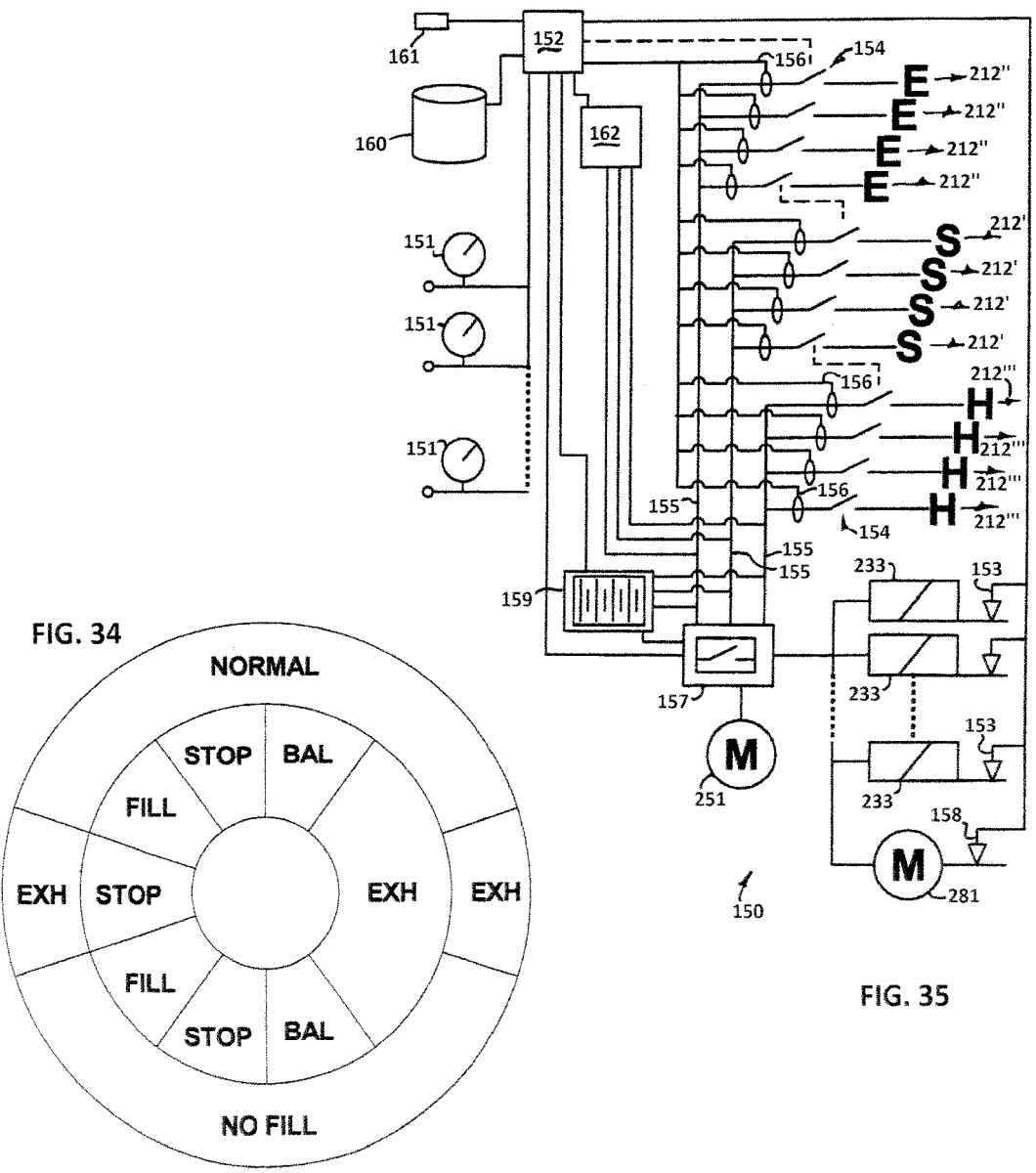
FIG. 34
FIG. 35

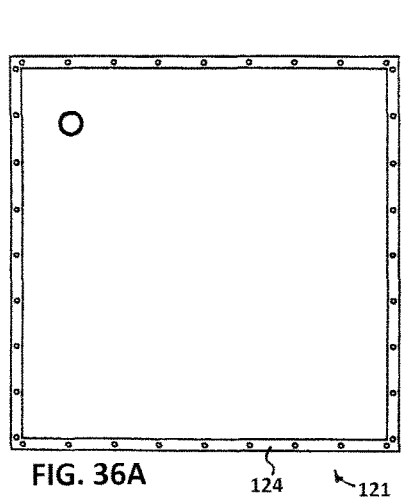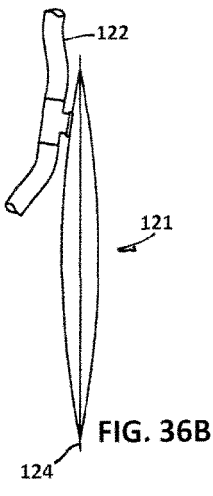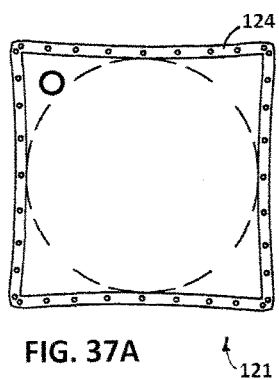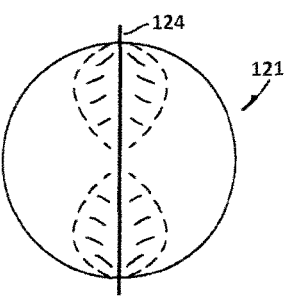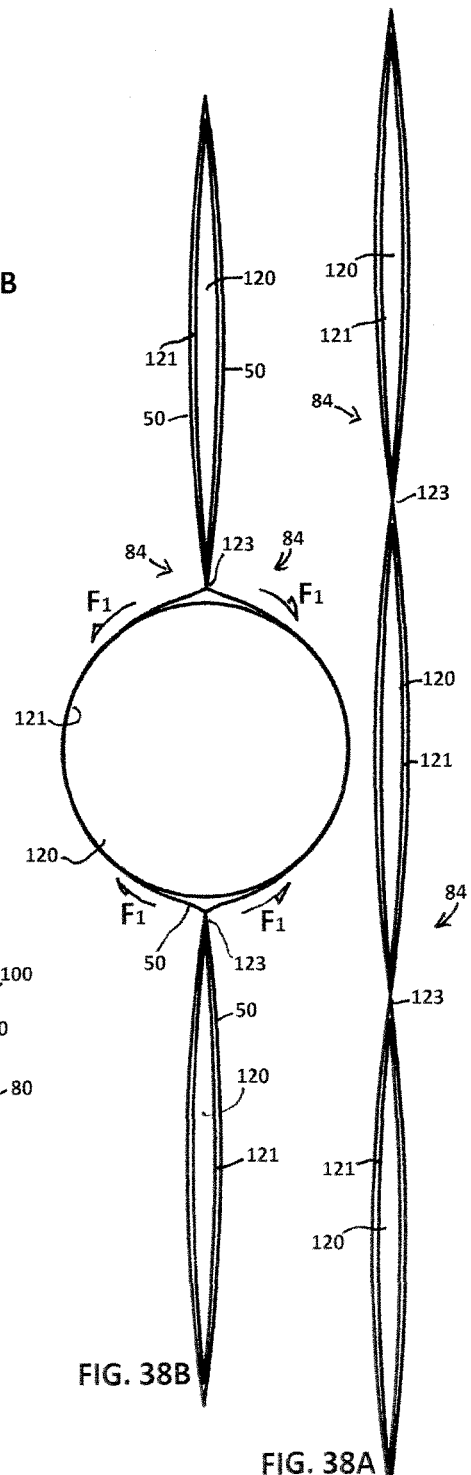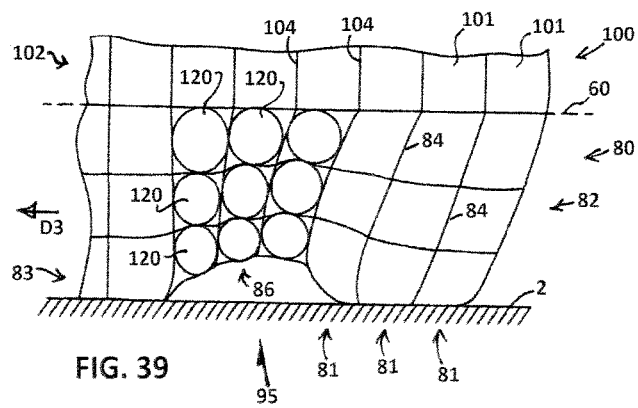

METHOD AND APPARATUS FOR MOVING A SHIP OVER LAND

This invention relates to methods for moving ships and other very large and heavy loads over land.

In this specification, a ship is taken to be a floating vessel with steering and propulsion means and a displacement of at least 1000 tonnes in a fully laden condition.

Ships are usually constructed in a dry dock or on a slipway and brought into a dry dock for repairs. The capacity of a shipyard to undertake construction and repairs is therefore limited by the number and size of its slipways or dry docks, each of which must be located at a suitable deepwater access point. The limited availability of suitable deepwater access points restricts the expansion of shipyard facilities, while limited availability of facilities for larger ships increases voyage times and costs for shipowners.

It would be useful to overcome these constraints to enable a shipyard to accept multiple parallel orders and unscheduled repair works by moving ships in and out of the water via a single deepwater access point to a flat inland ground area large enough to accommodate them.

It is known to move a ship for a short distance over land on multiple hydraulically actuated, wheeled cradles incorporating load sensors which are monitored and moved in synchrony. However, the application of such technology is limited by problems of scale and the availability of suitable dockyard infrastructure.

It is also known to arrange cylindrical airbags beneath the keel of a ship to assist in launching the ship down a slipway. The airbags can be supplied with compressed air via rotating pneumatic couplings while they roll beneath the keel as the ship moves by gravity into the water. However, it is difficult to use this technology to move larger ships or to move ships up a slipway out of the water.

U.S. Pat. Nos. 3,693,740 and 3,537,540 disclose arrangements for supporting a load on multiple airbags and moving the load by selectively displacing the airbags in a desired direction of travel. In U.S. Pat. No. 3,693,740 the load is moved by a lateral thrust reaction between adjacent airbags, whereas U.S. Pat. No. 3,537,540 provides a combination of inextensible members which displace the load forwardly and upwardly as each airbag is inflated, and springs or other traction means which displace the lower region of the airbag over the ground surface when it is deflated.

U.S. Pat. No. 4,227,608 discloses a layered flexible mat for carrying a load, in which inflatable bodies are selectively pressurised to create a self-supporting wavelike deformation which progressively moves the mat across the ground surface.

Usefully, these technologies provide movement as well as support to the load. However, the size and complexity of moving components and support structures and the proliferation of airlines and other mechanical parts would make it difficult to implement such technologies on a sufficiently large scale to move a ship. Multicompartmental inflatable structures are difficult to manufacture and repair on a very large scale, while the flexible walls of individual airbags are not well suited to withstand very heavy stress concentrations at localised mechanical connection points to actuators or support surfaces.

Moreover, the principle of operation of some of these prior art arrangements may give rise to the possibility of entrapment of individual airbags on an uneven ground surface. This would prevent forward movement and result in uncertain operation, particularly if implemented on a very large scale.

When moving an extremely large and heavy load such as a ship, it would be desirable for applied loads to be distributed as evenly as possible over the ground surface and throughout the apparatus, and for the load to be supported over as large an area of the ground as possible so that the apparatus could also be used where the ground surface has relatively limited bearing capacity. It would also be useful to be able to move a large ship over land where no dockyard facilities exist. For example, it would be useful to recover a ship onto land for emergency repairs, or to recover a ship cast up onto land back into the sea.

It would further be desirable for such apparatus to be conveniently deployable while a ship is at sea to enable the ship to be brought onto land.

It would be desirable for such apparatus to impart motion to the load as well as supporting the load. It would be desirable to provide multidirectional linear or, most preferably, linear and rotational motion.

It would further be desirable to minimise the mechanical complexity of such apparatus since the multiplication of even basic mechanical parts such as links, actuators, and air or hydraulic lines may render some prior art apparatus impractical on a very large scale. The principle of operation should be reliable, preferably also when the apparatus is used over an uneven ground surface.

The object of the present invention is to provide a practical and convenient method and apparatus whereby an extremely large and heavy load, particularly a ship or other floating vessel of at least 1000 tonnes displacement, may be moved over land.

Accordingly in its various aspects the present invention provides a method and an apparatus for use in moving a load over a ground surface in a direction of travel, as defined in the claims.

In a preferred embodiment, the apparatus includes an inflatable cushion assembly and an inflation means for inflating the cushion assembly with a fluid. The cushion assembly includes a plurality of inflatable compartments and a plurality of interconnected flexible walls, each compartment being separated from an adjacent one or ones of the compartments by a respective one or ones of the flexible walls. The flexible walls are arranged to define at least a first layer of the inflatable compartments, the first layer including at least first said inflatable compartments and having an inflated rest condition in which all of the first compartments are inflated, each to an inflated condition, to form together a first fluid cushion. The load is arranged on the cushion assembly so that the first fluid cushion supports it above the ground surface.

The remaining features of this preferred embodiment can be selected in accordance with either of two alternative, first and second modes of operation.

In accordance with the first mode of operation, the inflation means is operated to deflate and re-inflate selected ones of the first compartments in a sequence so as to produce a deflated region of the first fluid cushion which travels through the first fluid cushion in the direction of travel. The cushion assembly includes a tension means which is energised so as to induce a tension force which acts between respective ones of the flexible walls on deflation of each respective first compartment from the inflated condition to a deflated condition. The tension means pulls, by the tension force, a respective flexible wall or walls of each deflating or deflated first compartment in a base region of the first layer forwardly in the direction of travel or upwardly away from the ground surface. This produces a contraction in the deflated region of the first fluid cushion. The contraction travels through the first fluid cushion so as to move the base region of the first layer of the cushion assembly progressively in the direction of travel.

In accordance with the second, alternative mode of operation, the cushion assembly includes a tension means which is energised so as to induce a tension force between respective ones of the flexible walls. The tension means pulls, by the tension force, a respective flexible wall or walls of each respective first compartment in a base region of the first layer, in the inflated condition of the said first compartment, forwardly in the direction of travel or upwardly away from the ground surface. This produces a local contraction in the first fluid cushion. The tension means is energised to apply the tension force to the respective flexible walls of selected ones of the first compartments in a sequence, so that the contraction travels through the first fluid cushion and moves the base region of the first layer of the cushion assembly progressively in the direction of travel.

It will be understood therefore that the first and second modes of operation provide alternative ways of moving the base region of the first layer of the cushion assembly over the ground surface.

In both modes of operation, the base region is moved over the ground surface by a contraction which travels through the first fluid cushion in the direction of travel. Advantageously, the load remains supported by the first fluid cushion as the contraction travels through it, so that it is not necessary to provide any separate support structure to relieve the load from the cushion assembly while it moves forward over the ground surface. Further advantageously, the contraction is produced by a tension means which acts between respective ones of the flexible walls. This provides a simple structure in which forces are distributed within the cushion assembly, whereby mechanical complexity is reduced and stress concentrations are avoided. The tension force is reacted against the inflated compartments which lie ahead of the contraction in the direction of travel, and acts to pull the compartment walls in the region of the contraction forwardly in the direction of travel or upwardly away from the ground surface. By pulling the compartment walls rather than pushing them, and preferably by pulling them upwards as well as forwards, the potential problem of folding and entrapment of the contracted region beneath the base of an adjacent inflating compartment is avoided. This makes the mode of action more reliable, especially when used to transport a very large load over uneven ground.

Whereas in the first mode of operation the tension means is arranged to produce the contraction in a deflated region of the cushion assembly, in the second mode of operation the first compartments remain in the inflated condition so that the tension means acts in opposition to the fluid pressure in the first compartments.

In both the first and second modes of operation, the tension force may be induced by inflating and deflating second compartments in a sequence, with the second compartments preferably being arranged between the first compartments.

In the first mode of operation, the tension force may be induced by an elastic means which is incorporated into the flexible walls and energised by inflation of the first compartments so that it draws the compartment walls together as each first compartment deflates.

Many further optional features and advantages of the above described preferred embodiment in accordance with the first and second modes of operation are set forth in the following description with reference to the accompanying figures, all of which show features of the preferred embodiment in accordance with the first and/or second mode of operation.

It should be understood that all of the features and embodiments described and illustrated are set forth, purely as illustrative examples which are not intended to limit the scope of the invention as defined by the claims, and may generally be combined together in any desired combination within the scope of the claims.

Although the first and second modes of operation are described in the alternative, the cushion assembly of the preferred embodiment may combine the features of both of the first and second modes of operation so that it can be operated in either of them or alternately or simultaneously in both of them.

In accordance with other aspects of the invention, and as summarised at the end of the description, various of the features described and illustrated may alternatively be used in other embodiments which may, but need not, include the principal features of the preferred embodiment, and which may, but need not, be in accordance with either of the first and second modes of operation.

The figures show an apparatus for moving a load over a ground surface in a direction of travel in accordance with the preferred embodiment of the invention, wherein:

FIGS. 1A and 1B show a spool assembly respectively in front and end view;

FIG. 2 shows a deployment module comprising a deflated cushion assembly partially wound onto the spool assembly;

FIG. 3 shows the deployment module in use wherein the deflated cushion assembly is being hauled under a floating ship;

FIGS. 4A, 4B and 4C show the cushion assembly, respectively in plan view, side view, and end view;

FIG. 5 is an enlarged view of part of FIG. 4B showing adjacent groups of upper compartments;

FIG. 6 shows a ship supported by six cushion assemblies arranged in the use position;

FIGS. 7 and 8 show the cushion assembly in end view supporting two differently shaped ship's hulls;

FIGS. 12A, 12B and 12C show a flow control module (FCM) respectively in side view, top plan view, and bottom plan view;

FIG. 13 shows one of the screws for fastening the FCM to a frame forming part of a flexible web of the cushion assembly;

FIGS. 14A, 14B and 14C show a hose end assembly of a flexible hose for connecting the FCM to respective inflatable bladders of the cushion assembly, respectively in side view, in end view, and in section at C-C of FIG. 14A;

FIGS. 15A, 15B and 15C show the frame for securing the FCM to the flexible web, respectively in side, top plan, and bottom plan view;

FIGS. 16 and 17 show the upper surface of part of the flexible web with the upper compartments removed for clarity, respectively before and after fitting the FCMs and flexible hoses;

FIG. 18 shows the corresponding lower surface of the same part of the flexible web, with the lower compartments removed for clarity, after fitting the FCMs and flexible hoses;

FIGS. 19A and 19B show a small portion of the elastic mesh sidewall separating two adjacent first compartments of the cushion assembly, and including the tape by which they are attached to respective base panels of the first compartments, respectively in an elastically extended condition (FIG. 19A) and an elastically contracted condition (FIG. 19B);

FIG. 20 shows the same portion of the sidewall after attaching the tape to the base panels;

FIG. 21 shows one of the cords of the elastic mesh;

FIGS. 22-24B show component parts of the base panel of one of the first compartments, wherein:

FIG. 22 shows the base sheet;

FIG. 23 shows the upper sheet and the elastic mesh panel in an extended condition;

FIG. 24A shows the elastic mesh panel laid over the base sheet in the extended condition, wherein the extended condition is maintained by a stretching frame (not shown); and FIG. 24B shows the finished base panel in the extended condition after the upper sheet is stitched to the base sheet through the mesh;

FIGS. 25A, 25B and 25C show a first bladder of one of the first compartments connected to a flexible hose, respectively in side, top plan, and bottom plan view;

FIG. 28 shows how the central control system controls the operation of each of the cushion assemblies to move a ship within a shipyard;

FIGS. 29A-29D show in schematic plan view four stages in a sequence of operation in which the first compartments of several cushion assemblies supporting a ship are inflated and deflated to produce a travelling contraction which travels through the inflated cushion assemblies to move the ship in rotation about a point;

FIG. 29E shows how the ship moves about the point as the sequence of operation is repeated;

Figure 30:
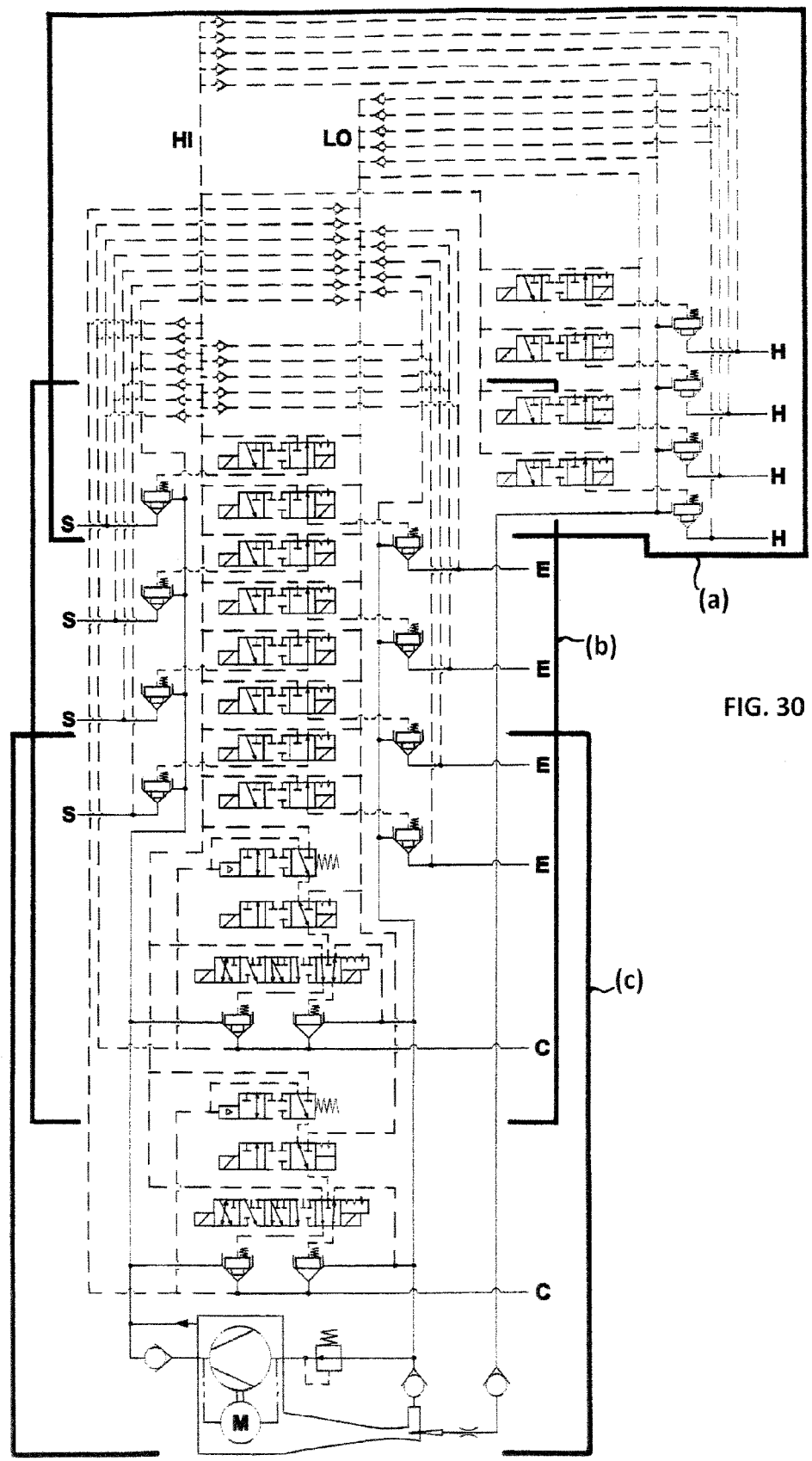
FIG. 30 shows the valve assembly and other flow control components of one FCM for controlling two compartments.
Figure 30A:
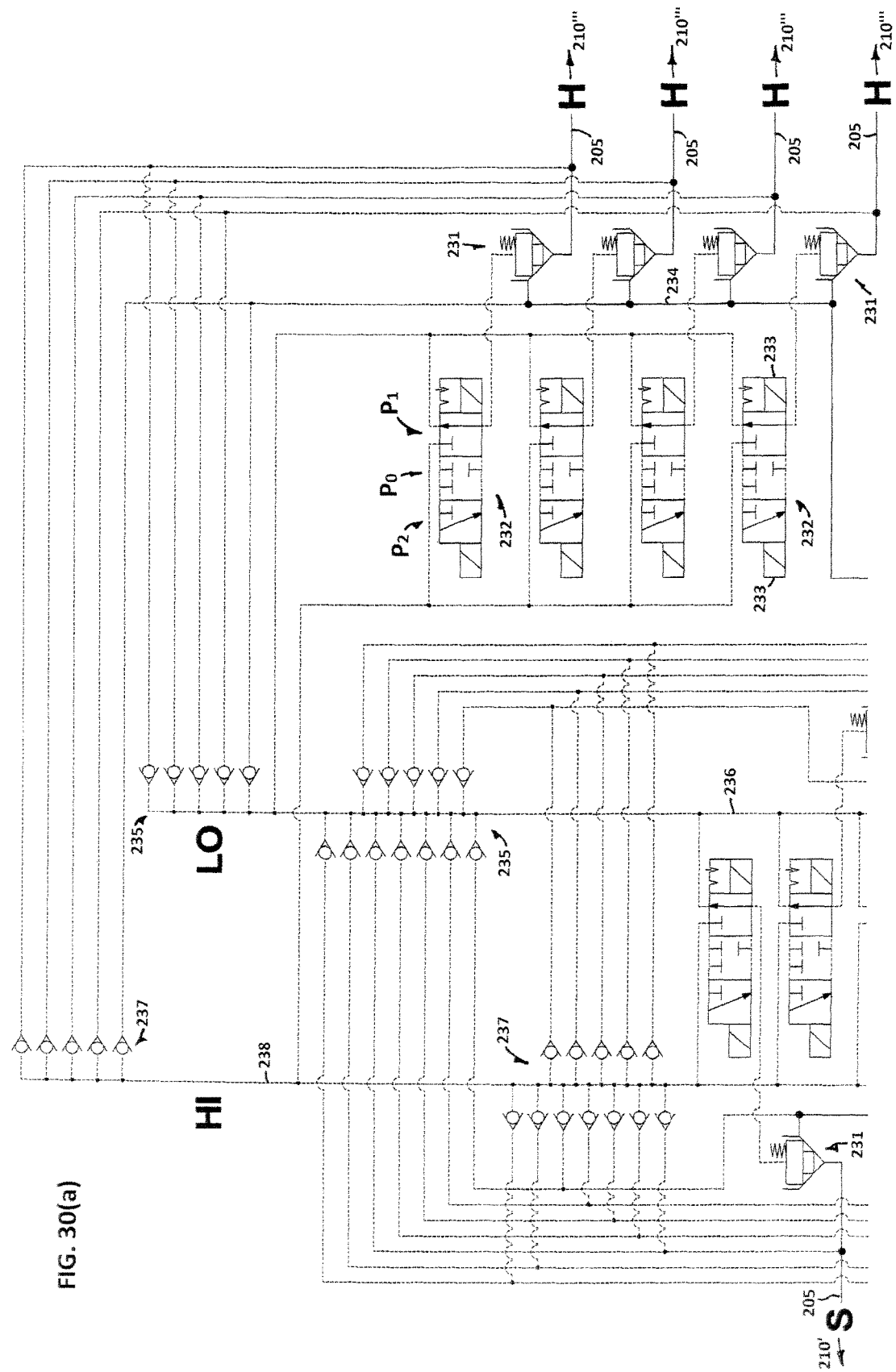
Figure 30:
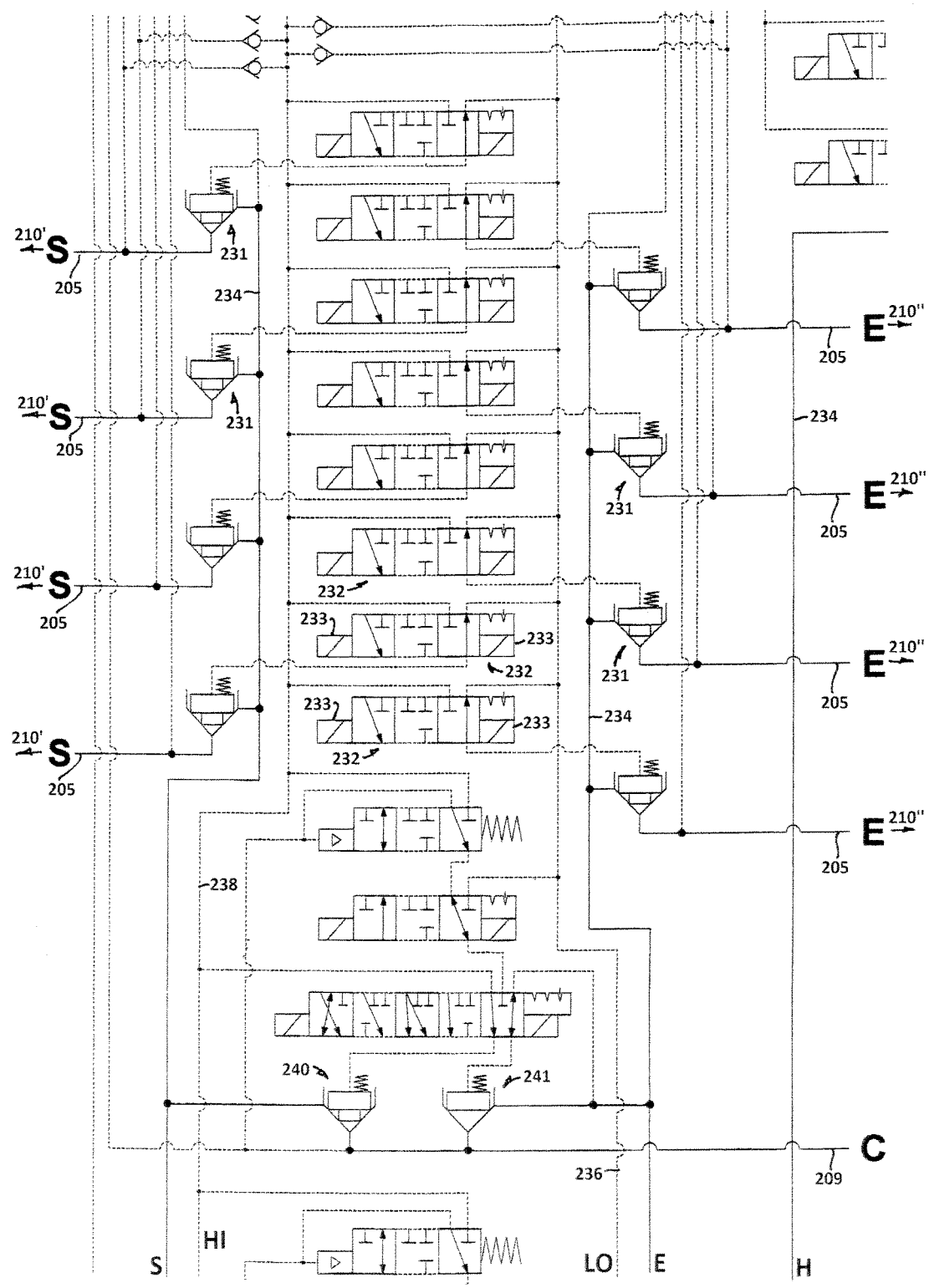
Figure 30:
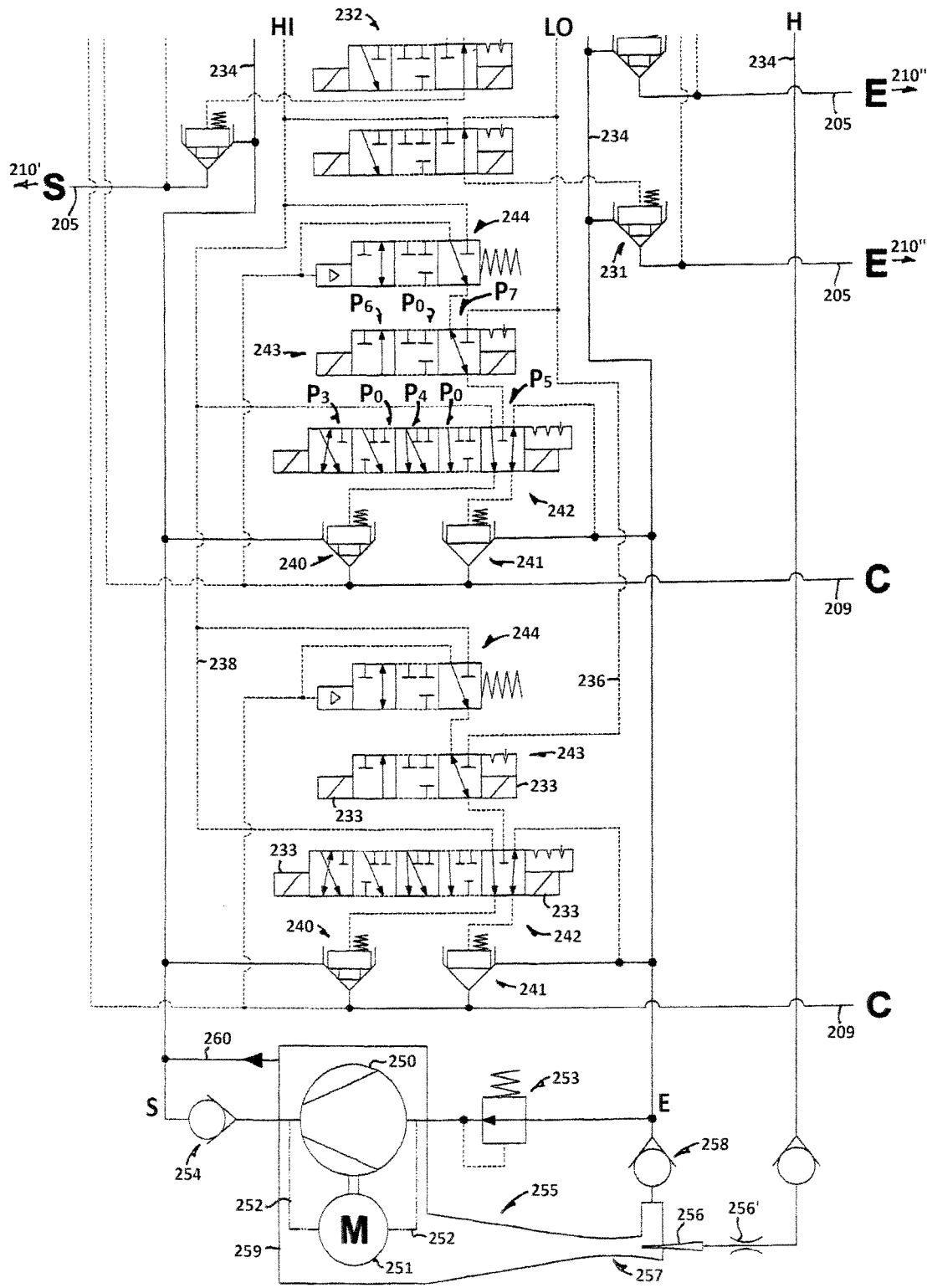
Figure 31A:
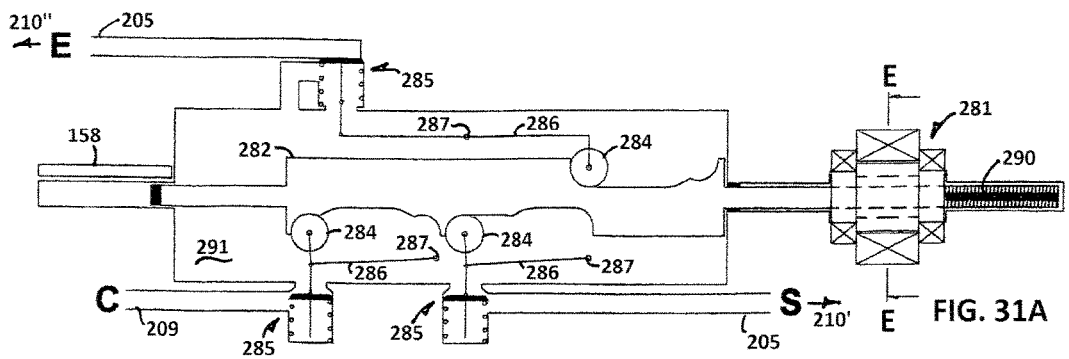
Figure 31B:
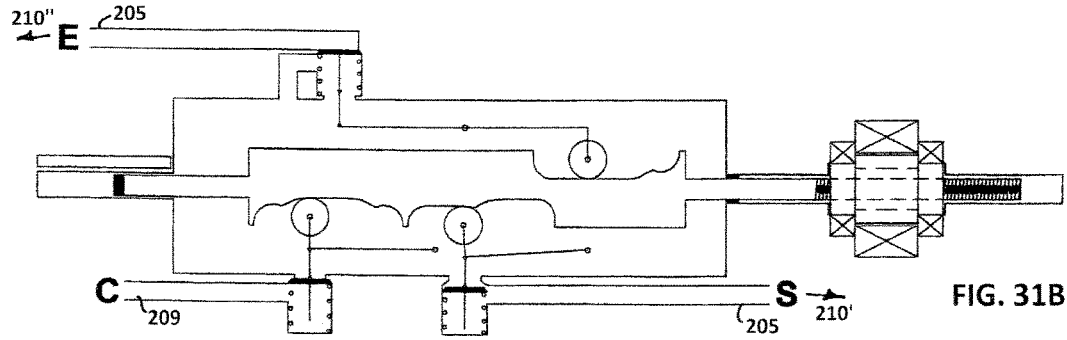
Figure 31C:
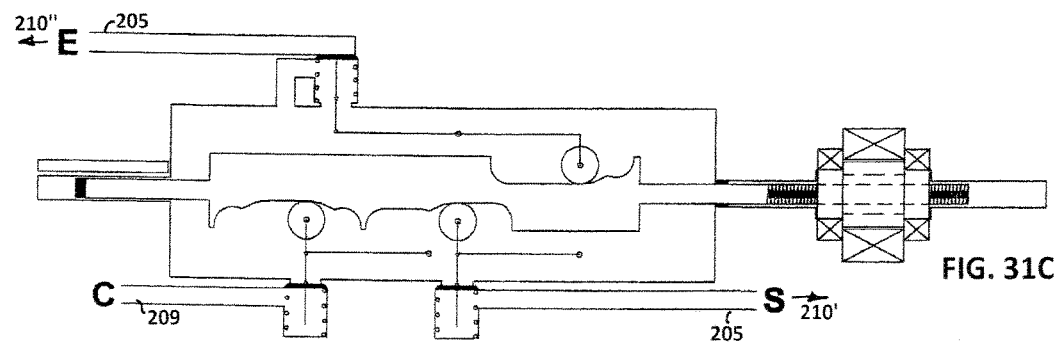
Figure 31D:
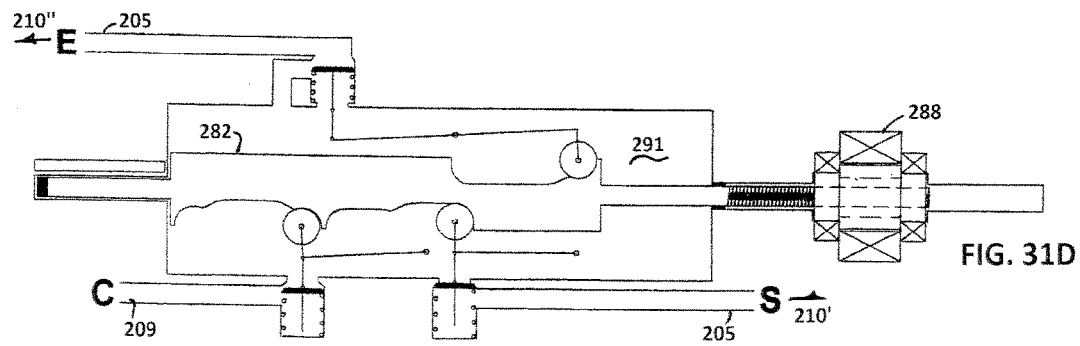
Figure 31E:
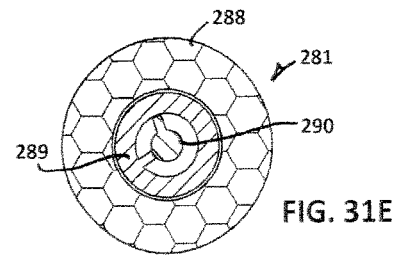
Figure 32:
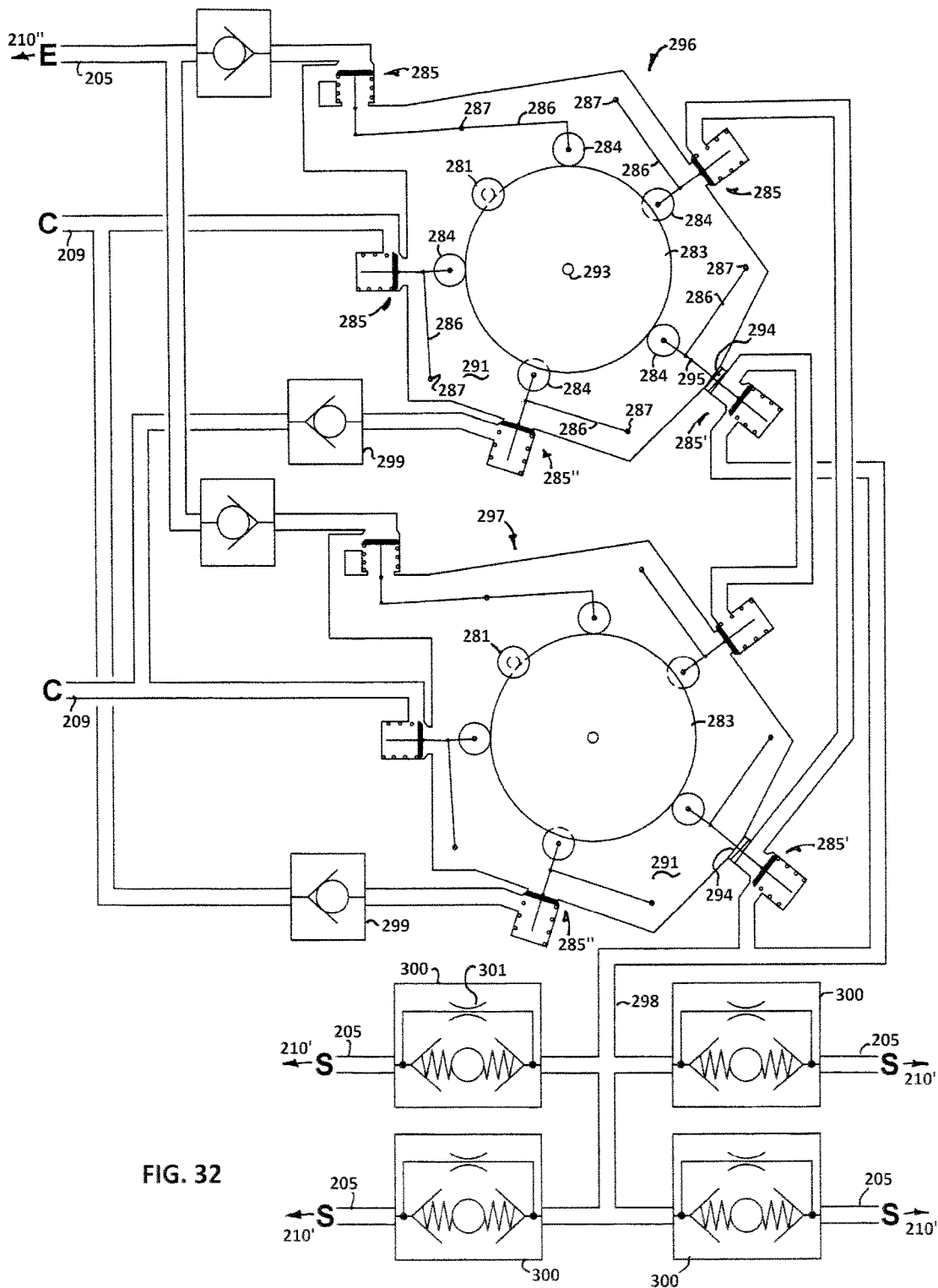

FIGS. 30(a), 30(b) and 30(c) are enlarged views of the overlapping parts (a), (b) and (c) respectively of FIG. 30;

FIGS. 31A-31D show an alternative valve assembly of one FCM for controlling a single compartment, in four different states corresponding respectively to the BALANCE condition (FIG. 31A); the FILL condition (FIG. 31b); the STOP condition (FIG. 31C); and the EXHAUST condition (FIG. 31D);

FIG. 31E is a section through the valve control motor at E-E of FIG. 31A;

FIG. 32 shows in schematic plan view another alternative valve assembly of one FCM, comprising two valve sub-assemblies for controlling two compartments;

FIG. 33 is a schematic side view of the cam and drive motor assembly of one of the two valve sub-assemblies of FIG. 32;

FIG. 34 shows the functional relationship between the first and second sub-assemblies of the valve assembly of FIGS. 32 and 33;

FIG. 35 shows the local electrical control system of one FCM;

FIGS. 36A and 36B show the square bladder of one second compartment of the cushion assembly in a deflated condition, respectively in front view and in side view connected to a flexible hose;

FIGS. 37A and 37B show the square bladder of FIGS. 36A and 36B in an inflated condition, respectively in front and side view;

FIGS. 38A and 38B show in schematic side view a vertical array of three second compartments of the cushion assembly containing three square bladders, respectively with all three compartments deflated, and with only the central compartment inflated to show how the tension force is generated;

FIG. 39 illustrates an alternative, second mode of operation in which the second compartments of FIGS. 38A and 38B are inflated to generate a tension force producing a contraction in the first fluid cushion.

Figure 40A:
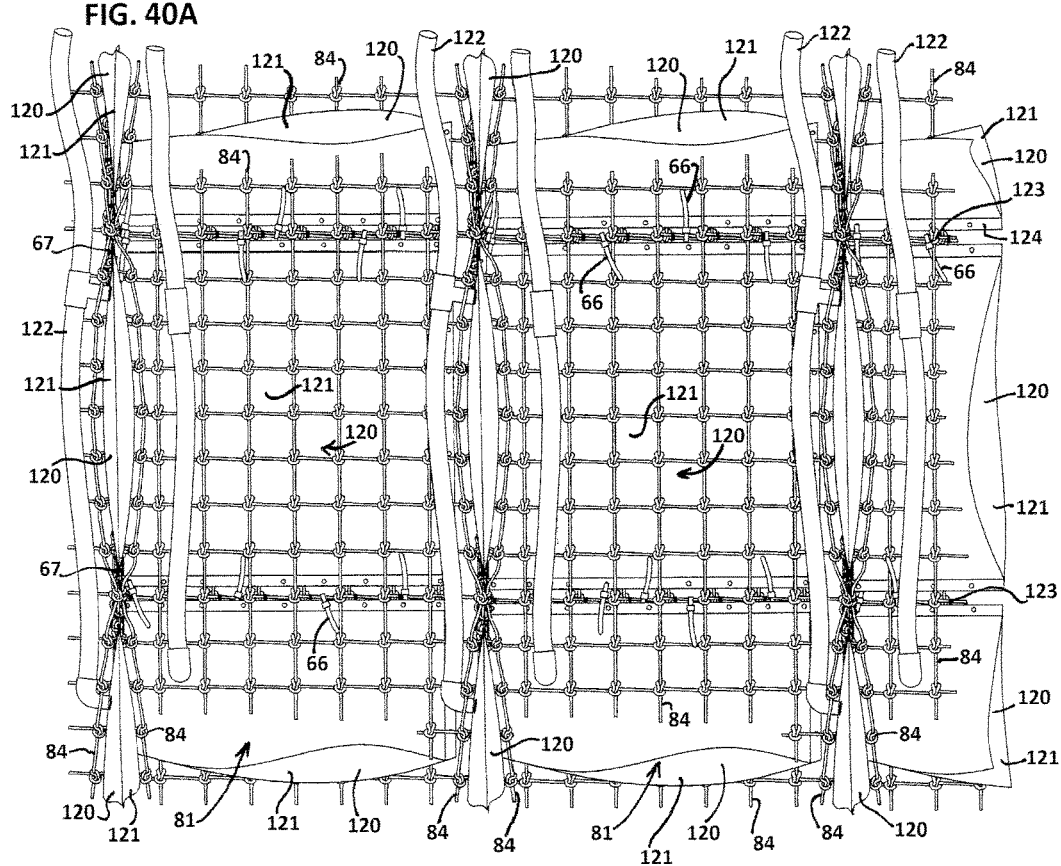
Figure 40B:
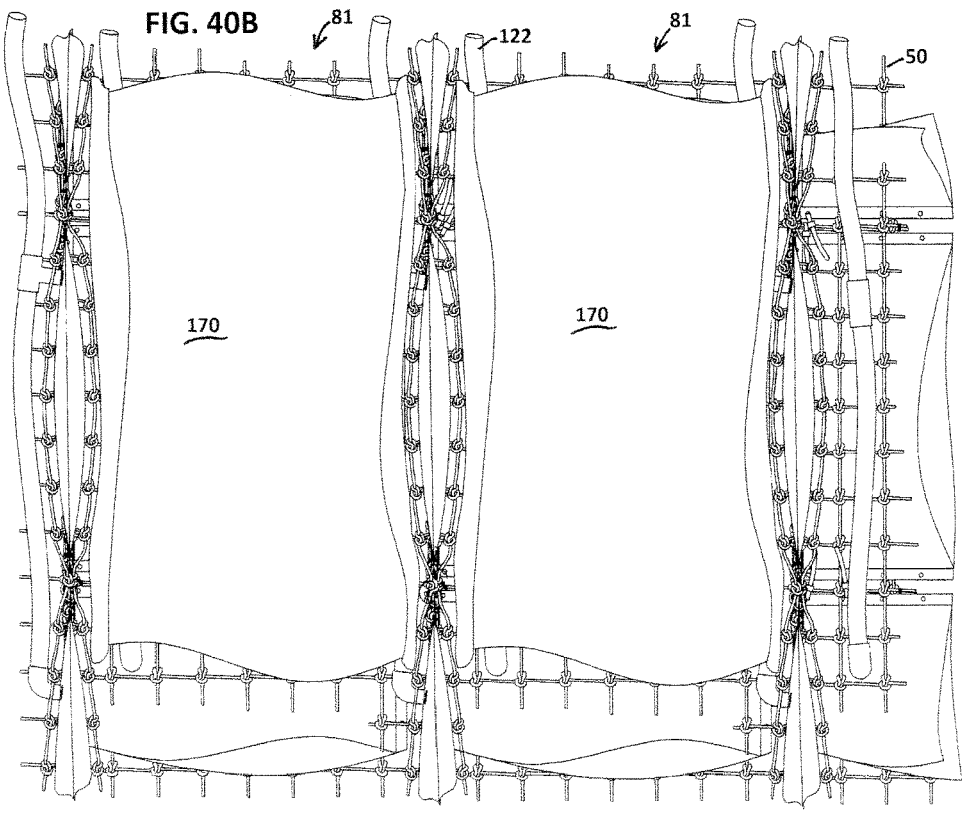
Figure 41B:
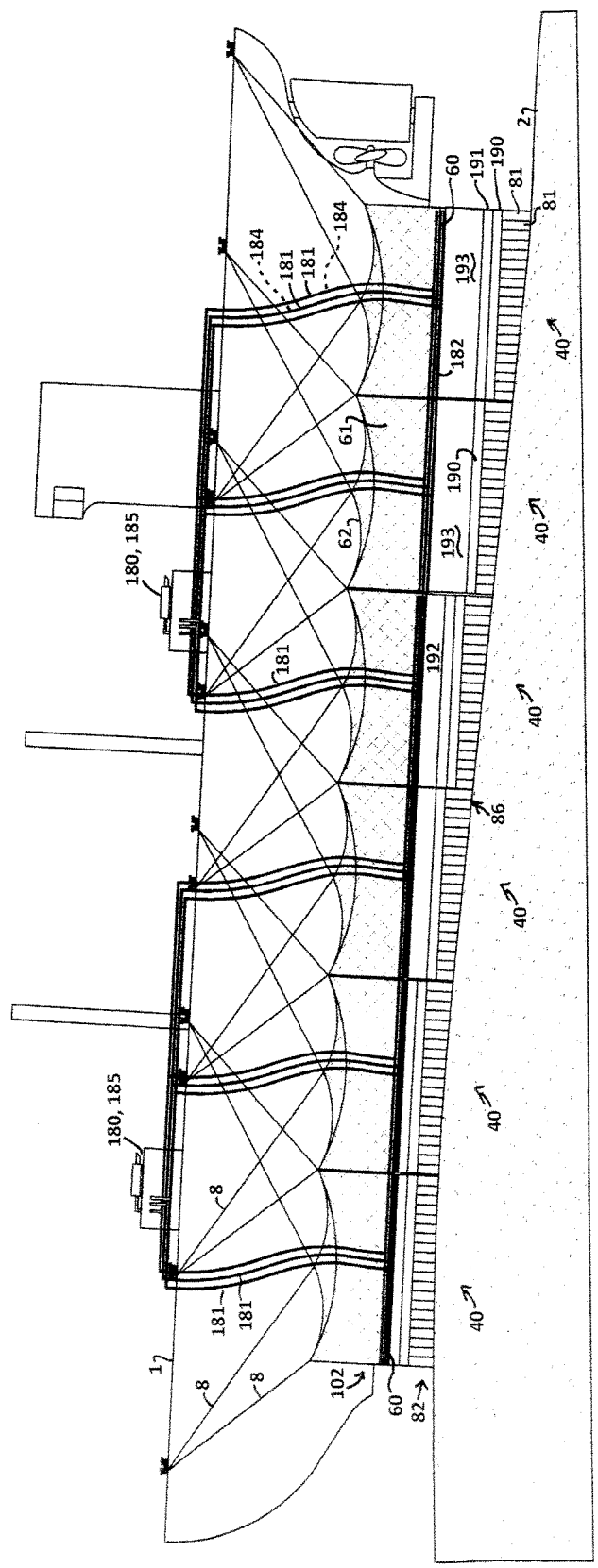
Figure 42:
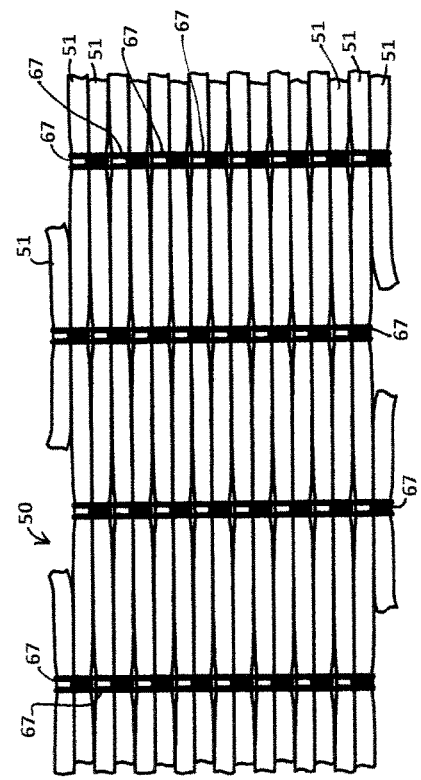
Figure 41A:
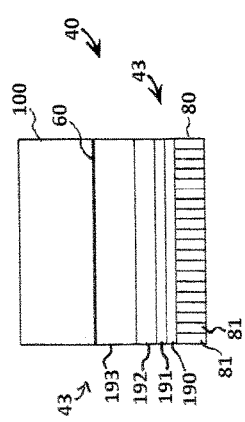
Figure 43:
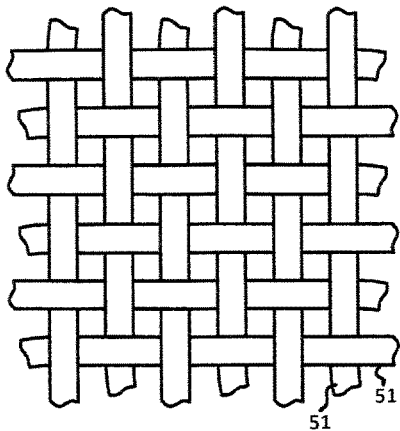
Figure 44:
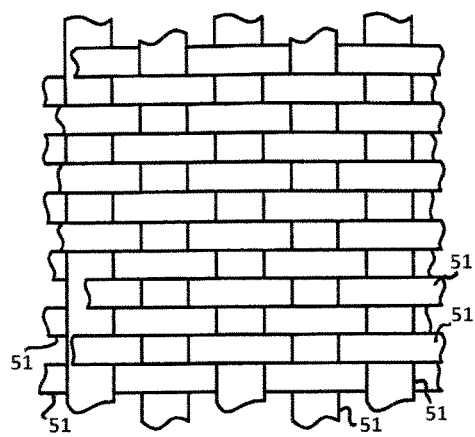
Figure 45:
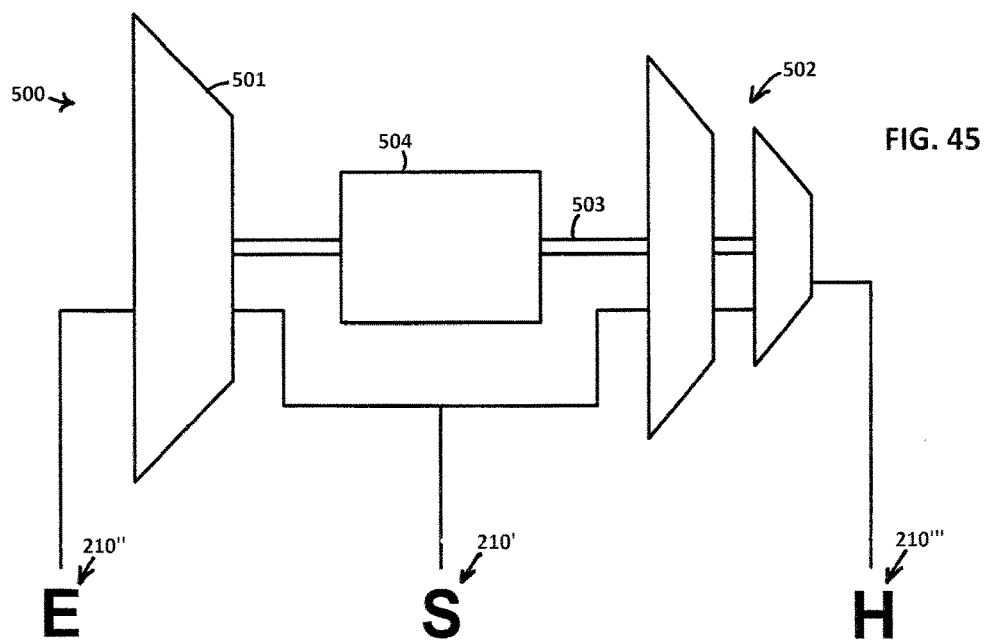
Figure 46:
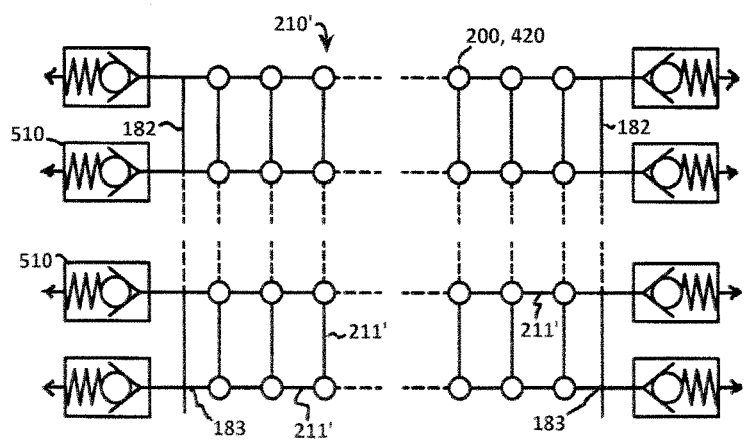
Figure 47A:
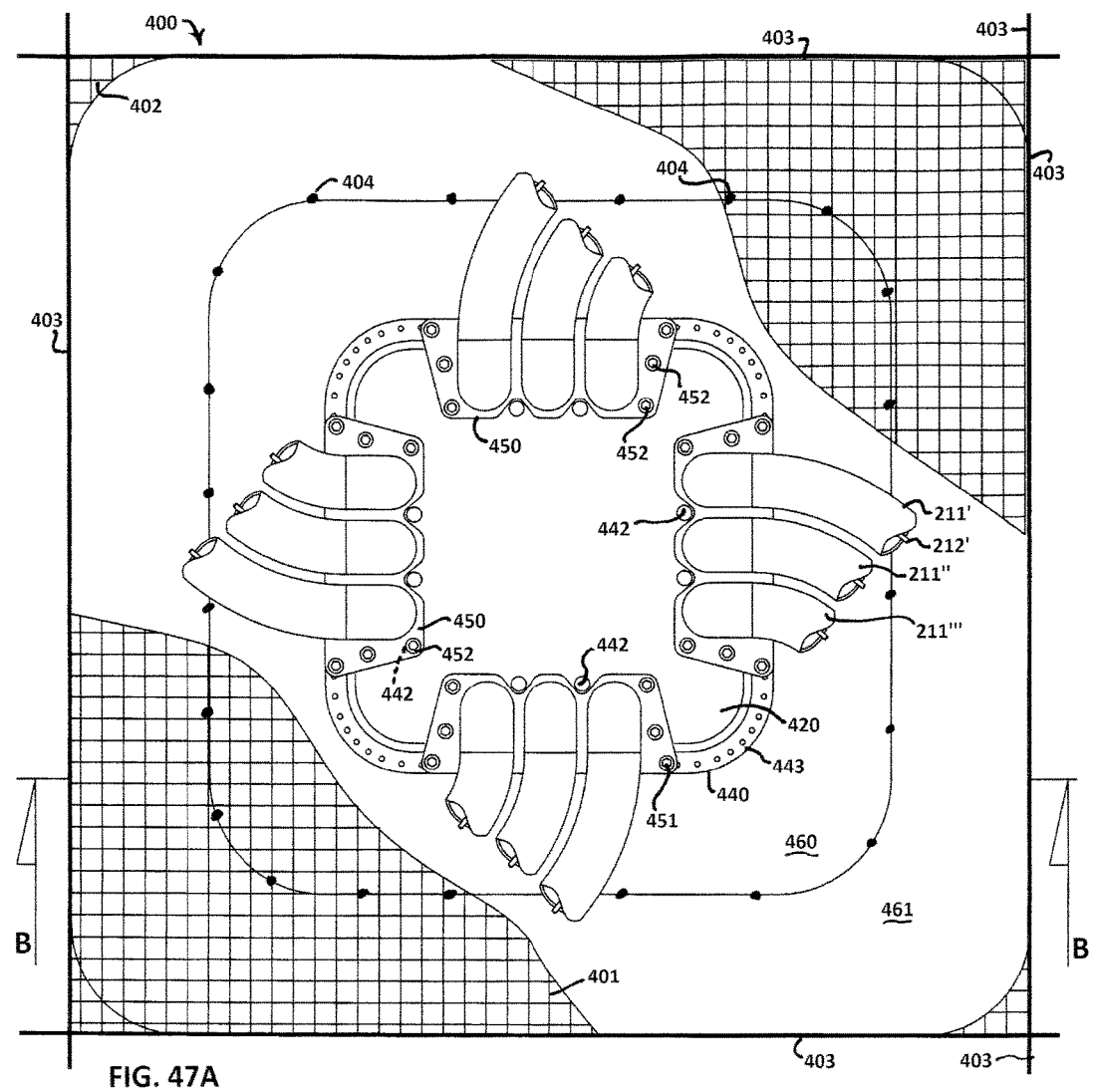
Figure 47B:
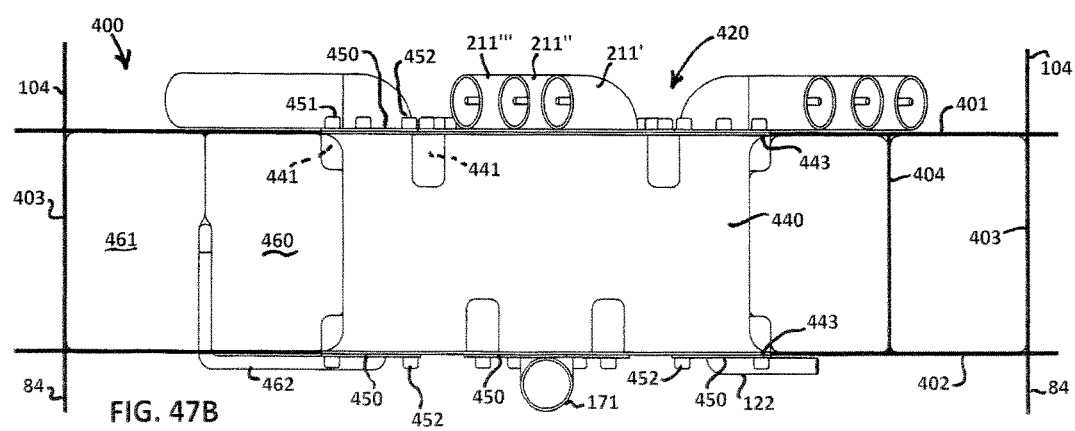

FIGS. 40A and 40B are vertical sections through part of the first layer of a cushion assembly in an almost fully inflated condition, wherein second compartments containing second bladders are arranged between the mesh sidewalls of adjacent first compartments and slightly inflated for clarity, and wherein FIG. 40A shows the first compartments without the first bladders, and FIG. 40B shows two of the first bladders in position in their respective first compartments;

FIG. 41A is an end view of an inflated cushion assembly comprising first, upper, lower intermediate, and multiple upper intermediate layers;

FIG. 41B shows a ship supported by six cushion assemblies as shown in FIG. 41A in which different ones of the upper intermediate layers are deflated in each cushion assembly to adjust the height of each first layer to conform to the ground surface topography;

FIG. 42 shows a mesh comprising elastic cords fastened together by crimps or clamps;

FIGS. 43 and 44 show two alternative woven elastic mesh structures of the flexible walls;

FIG. 45 shows an alternative pump comprising a turbine and compressor mounted on a common shaft;

FIG. 46 shows an alternative arrangement of the supply grid S for use with the pump of FIG. 45;

FIG. 47A is a plan view of one cell of the cushion assembly seen from just above the upper surface of an alternative FCM and flexible web assembly; and FIG. 47B is a section at B-B through the flexible web assembly of FIG. 47A.

Reference numerals which appear in more than one figure indicate the same or corresponding features in each of them.

The Cushion Assembly

FIGS. 4A-4C show in a fully inflated condition an inflatable cushion assembly 40 suitable for use in moving a ship 1. When considered in plan view, the inflatable cushion assembly defines a two dimensional rectilinear array of contiguous inflatable compartments which extend in a primary dimension D1 and a secondary dimension D2. In use, the shorter (primary) dimension is aligned with the length axis of the ship, and the longer (secondary) dimension extends along the transverse axis or beam of the ship. The relative proportions of the primary and secondary dimensions can be selected depending on the length of the spool 22, further described below, and the size of the ship for which the cushion assembly is designed. For convenience, the lines of compartments extending in the secondary dimension D2 will be referred to as columns 42, and the lines of compartments extending in the primary dimension D1 will be referred to as rows 41, it being understood that both the columns 42 and the rows 41 are defined in plan view in a horizontal plane.

When considered in plan view, the extremities of the cushion assembly defined by the outer sidewalls of the first compartments 81 at the ends of the columns 42 in the secondary dimension D2 are referred to as second ends 44 of the cushion assembly, also referred to in the use position as the sides of the cushion assembly, while the extremities of the cushion assembly defined by the outer sidewalls of the first compartments at the ends of the rows 41 in the primary dimension D1 are referred to as first ends 43 of the cushion assembly. In use, either or both pairs of opposite first ends 43 and second ends 44 can form leading and trailing ends of the cushion assembly, depending on its direction of travel.

The inflatable compartments are separated by a plurality of interconnected flexible walls, including a flexible web 60 which extends horizontally through the cushion assembly and divides it into a first layer 80 of contiguous first compartments 81 below the flexible web, and an upper layer 100 of contiguous upper compartments 101 above the flexible web.

The first layer 80 has an inflated rest condition, illustrated in the use position of the cushion assembly in FIGS. 6-8, in which all of the first compartments 81 are equally inflated, each to an inflated condition, so that together they form a first fluid cushion 82. The inflated condition of each first compartment may be defined by a minimum or threshold fluid pressure in the respective first compartment, or alternatively by the fully inflated volume of the first compartment, or by fluid pressure and volume.

The upper layer 100 also has an inflated condition (also illustrated in FIGS. 6-8) in which all of the upper compartments 101 are inflated so that together they form an upper fluid cushion 102 which supports the load (in the illustrated examples, the ship 1) above the first fluid cushion 82 while the first fluid cushion supports it above the ground surface 2.

At the second ends 44 of the cushion assembly in its secondary dimension, the flexible web 60 is extended outwardly to form a panel 61 terminating at its outward edge in one or more catenary tension elements 62, e.g. straps or cables, which for example may be braided from multiple filaments so that the flexible web can be connected at multiple points between the filaments to evenly distribute the load along the length of the tension element.

Where it is intended to move the load in more than one dimension, so that the direction of travel D3 can extend in either or both of the primary and secondary dimensions D1 or D2, it is desirable for there to be a sufficient number of first compartments 81 both in each column and in each row to provide that the contraction which travels through the first fluid cushion in the direction of travel will occupy only a minority of the total number of compartments, preferably not more than about 30% of the compartments, more preferably not more than about 15% of the compartments, so that the load is always distributed over the majority of the base region 83 of the first fluid cushion.

The size and hence the total number of the compartments can be selected accordingly based on the dimensions of the cushion assembly and also on the vertical depth D4 of the first compartments 81 and first layer 80, which is preferably substantially greater than (preferably at least about 2 or 3 times) the horizontal primary (D5) and secondary (D6) dimensions of each first compartment, and preferably also proportionate to the primary (D1) and secondary (D2) dimensions of the cushion assembly and optionally also to the overall length of the load, in order that the first layer 80 should be able to accommodate variations in the topography of the ground surface 2 over which the load is to travel, over the maximum dimension of the cushion assembly and optionally also the maximum dimension of a rigid load. It will be appreciated that only slight variations in the slope angle of the ground surface can amount to a significant unevenness over the length of a ship's hull, and the depth of the first layer should be sufficient to prevent the load from grounding on high spots.

Deployment

Referring to FIGS. 1A-3, a plurality of deployment modules 20 may be provided, each deployment module including a respective inflatable cushion assembly 40 and a spool assembly 21, the spool assembly including at least a spool 22 for storing the cushion assembly in a storage position (FIG. 2) and deploying the cushion assembly from the storage position to a use position (FIGS. 6-8). In the illustrated example, the spool 22 is rotatably mounted on bearings 26 between a pair of support elements for supporting the spool, each support element comprising an end plate 23 which guides the edges (i.e. the first ends 43) of the cushion assembly as it is wound onto the spool. A rotation mechanism is also provided for rotating the spool relative to the end plates so as to wind and unwind the deflated cushion assembly, with all of its component parts including the flow control modules (referred to hereinafter as FCMs) 200 together with the inflatable compartments and flexible walls as further described below, on and off the spool between the use position and the storage position.

In the illustrated example the rotation mechanism is a hydraulic motor 24 which is mounted on one of the end plates and powered via hydraulic hoses 25 from an external hydraulic pump (not shown). The motor is connected to a gear on the spool via a suitable transmission arrangement which may be similar to that of a winch. The two end plates could be fixed together by a tube 27 or the like extending inside or parallel with the spool, or could be independently mounted on the spool. The cushion assembly is deployed, for example, by suspending the spool from a crane 3 by shackles 4 and cables 5 which connect the end plates to a spreader bar 6 as shown, or by supporting it in a cradle mounted on a dedicated deployment vessel or vehicle.

The spool may be a elongate open framework or hollow body, conveniently a cylindrical hollow body as shown but alternatively for example rectangular or elliptical in cross section so that if desired, the shorter axis can be arranged horizontally to make it easier to transport the deployment module by road, for example by arranging a trailing bogey to support one of the end plates 23, and arranging the other end plate 23 on the fifth wheel of a tractor unit, so that the whole module 20 can be hauled as a trailer with the deflated cushion assembly 40 rolled around the spool and secured with straps. The end plates 23 may be provided with a flat base or other supporting or connection structure for ease of handling and storage. The spool may be covered by a resilient matting or the like to avoid damage to the FCMs and hoses as further described below.

Referring particularly to FIG. 3 and FIGS. 6-8, a plurality of deployment modules 20 can be used to deploy their respective cushion assemblies 40 to a use position in which they can be operated to move a ship 1 out of the water 7 up a sloping and partially submerged ground surface 2' which extends down into deep water, and then further inland to a position where work, e.g. repair or dismantling is to be carried out.

An inflation means is also provided for inflating the cushion assembly with a fluid. In the illustrated examples, the inflation means includes a network of interconnected flow control modules (FCMs) 200 which include valve assemblies and optionally also compressors or other pump means and form an integral part of the cushion assembly, as well as central air supply units 180 which may be mounted on the deck of the ship as shown and connected via large diameter main hoses 181 to the network of FCMs in each cushion assembly 40 so as to supply them with compressed air from the surface, particularly during initial inflation of the submerged cushion assembly but optionally also in operation on dry land. Additionally or alternatively, a central air supply unit could be provided for example in a dedicated deployment vessel in which the deployment modules are stored when not in use, as a fixed installation in a shipyard, and/or on a land vehicle or amphibious vehicle which can accompany the ship along its planned route. The compressed air and electrical power supplies of the ship itself can also be used if available.

In use, a pair of lines 8' are first passed under the floating ship 1 and connected to attachment points 63 (e.g. rings or shackles) on the catenary tension elements 62 on the first cushion assembly 40. The cushion assembly is then unreeled from the spool 22 and hauled under the ship as shown in FIG. 3 before inflating the first and upper layers to form first and upper fluid cushions 82, 102 in the use position to support the ship on the submerged ground surface 2'. The main hoses 181 and associated headers 182 could be connected before or after hauling the cushion assembly into the deployed position. If an additional pair of lines are hauled under together with the first cushion assembly then they can be used to haul the next one, and so forth until the required number of cushion assemblies 40 are arranged in series along the length of the ship.

Preferably the ship is positioned with its keel just above the submerged ground surface to maximise contact with the submerged ground surface as the cushion assemblies are inflated.

The first layer 80 of each cushion assembly may be inflated first so as to define a reference plane against which the fluid pressure in the upper fluid cushion 102 is reacted. Where the cushion assembly includes intermediate layers, as further described below, these can also be fully inflated to maximise ground contact. The fluid pressure may be adjusted to compensate for depth.

The catenary tension elements 62 of each cushion assembly are secured in tension to stablise the load on the fluid cushions by suitable releasable attachment means such as shackles and cables 8 which are winched in and secured to multiple fixtures along the deck of the ship 1. The panel 61 is stretched out in tension to retain any of the inflated upper compartments 101 which extend beyond the plan footprint of the hull of the ship to form a bulge 103 around the fluid cushion as shown in FIGS. 7 and 8, which helps to stabilise the ship and keep it in position on the fluid cushion while somewhat extending its plan footprint. If the cushion assembly is too wide for the hull then the spare compartments at the sides (i.e. second ends 44) of the cushion assembly are not inflated.

Once all the cushion assemblies 40 are inflated and secured in the use position (FIG. 6), the base regions 83 of all of the first fluid cushions 82 which together support the ship above the submerged ground surface can be moved progressively in the direction of travel D3 to as to move the ship out of the water onto land, as further described below. If the stern of the ship remains afloat then the ship's engines can be used to urge it slowly forwards until all of the first fluid cushions are in contact with the ground.

When the ship reaches the desired position on land, conventional stands, blocks, struts or the like can be arranged between the inflated cushion assemblies 40 (if gaps were left between them during deployment) or in place of selected ones of the cushion assemblies before the remaining cushion assemblies are deflated. If the cushion assembly is deflated progressively inwardly from its first ends 43 then the deflated portions can be drawn together into the centre and replaced progressively by chocks or stands, which are preferably adjustable by means of wedges or the like so that each chock or stand can take up its proportion of the load substantially without movement of the ship. The final columns of compartments in the centre of the cushion assembly 40 can then be deflated. Once the cushion assembly is in the deflated condition, it can be disconnected from the central air supply unit 180, released from the ship 1 and connected to the spool 22. The cushion assembly including the flow control modules 200 together with the inflatable compartments and flexible walls is then drawn out from underneath the ship between the chocks or stands and wound back onto the spool 22 from the use position to the storage position.

Advantageously, at least some of the flexible walls of the first compartments 81 and/or the upper compartments 101 include an elastic means, as further described below, which causes symmetric contraction of the first layer 80 and/or the upper layer 100 of inflatable compartments when the cushion assembly is deflated so that all of the inflatable compartments of the first layer are in a deflated and unloaded condition. This helps to contract the cushion assembly 40 so that it is easier to wind back onto the spool, and also makes it possible for the spool 22 to be shorter than the primary dimension D1 of the cushion assembly.

To move the ship back into the water, the cushion assemblies 40 are first redeployed by hauling them under the ship between the stands. The first and/or upper layers 80, 100 may be inflated from the centreline 45 (which extends along the primary dimension D1 parallel with its second ends 44 to bisect the cushion assembly) outwards so as to expand the cushion assembly horizontally into the use position before securing it to the ship. This inflation may commence with the central columns and then move progressively outwardly towards the columns at the first ends as the chocks or stands supporting the ship are progressively removed to be replaced by the inflated compartments. If a relatively thin intermediate layer is provided as described below, that compartments in that layer may be inflated first. The ground surface 2 provides a reference plane against which the upper compartments are inflated to the correct pressure. After inflating the first and upper fluid cushions, optionally together with the intermediate fluid cushions, the first compartments can be operated as before to move the ship progressively back into the water.

Optionally, the FCMs can be adapted to allow selected rows or columns to be inflated to a higher pressure during installation and removal of the cushion assembly, whereby the load can be concentrated during installation and removal of the chocks.

Although in the illustrated examples the cushion assemblies are arranged to cover most of the plan area of the hull, it will be understood that one, two or more cushion assemblies could alternatively be arranged to support only portions of the hull.

The Flexible Web and Flow Control Modules (FCMs)

Figure 16:
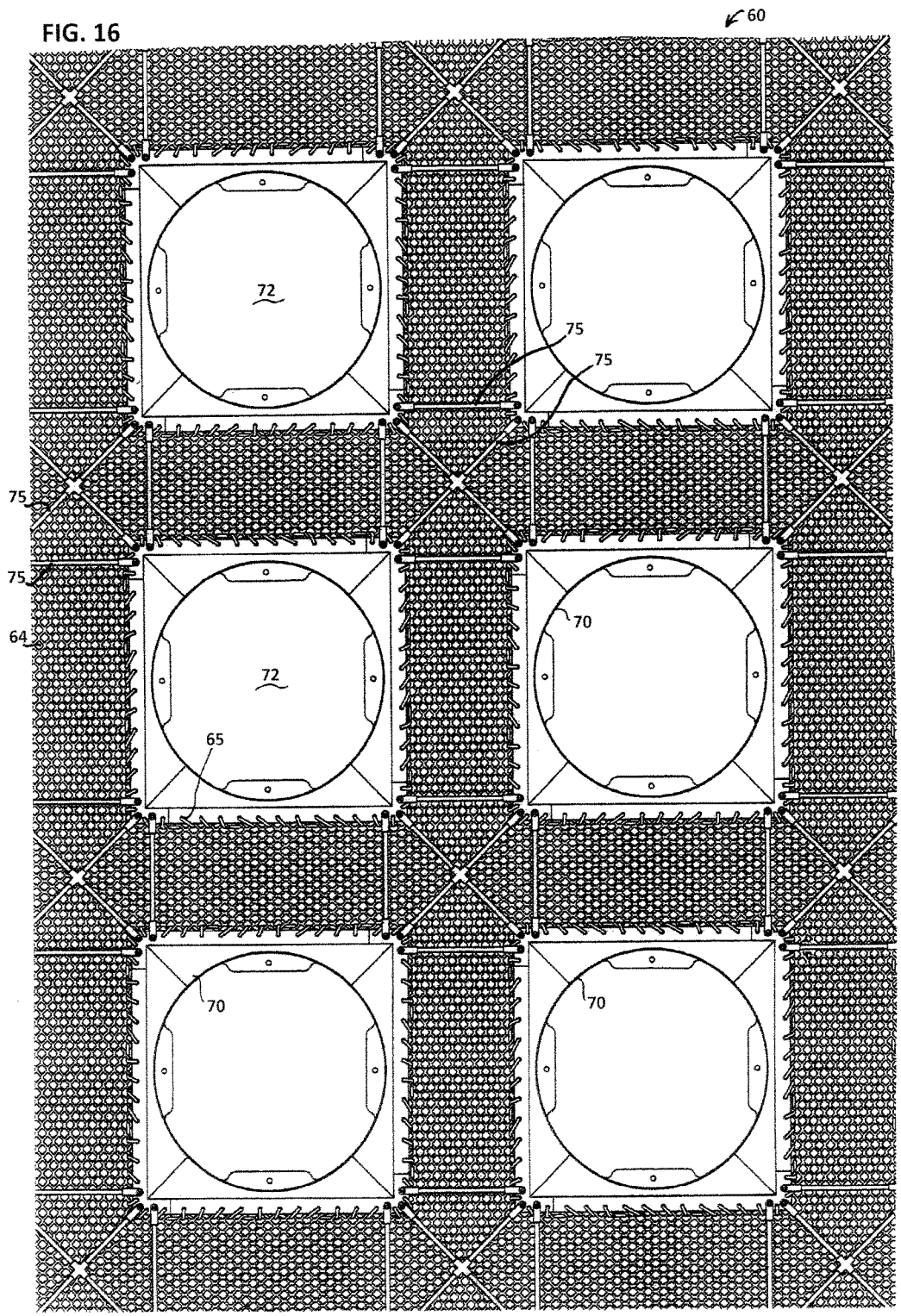

Referring to FIG. 16, the flexible web 60 is shown for clarity without the compartment sidewalls. It comprises a flexible sheet or layer with small or negligible thickness relative to its primary and secondary dimensions, which serves to divide the layers above and below it and to transmit tension forces through the cushion assembly in the plane of the web. Advantageously, the flexible web may be relatively less elastic that the sidewalls of the compartments. In the illustrated example the flexible web includes a relatively inelastic, high strength mesh 64, e.g. a woven, knitted or knotted mesh made for example from polyester or other high strength polymer or stainless steel. The mesh 64 provides a convenient structure to which the edges of the compartment sidewalls can be attached above and below the web, for example by suitable ligatures 65, high strength cable ties 66, clamps or crimps 67 made from e.g. stainless steel or aluminium, or the like.

In this specification, a mesh means a generally flat or sheet-like assembly of elongate filamentary elements such as cords, strips or the like, which may be connected together such as by weaving, knotting, clamping or otherwise. A mesh may comprise for example a tightly woven or knitted fabric in which the cords or other filamentary elements are arranged in a relaxed condition in closely abutting relation, or a more loosely woven, knitted, knotted or clamped fabric in which larger apertures are defined between the cords or other filamentary elements in a strained or relaxed condition. The filamentary elements may be bonded together by a coating so that the mesh can contain the pressurised working fluid within the compartments of the cushion assembly. Conveniently however the filamentary elements may be configured not to contain the pressurised working fluid, i.e. such that the pressurised working fluid may pass through the mesh. In this case bladders may be provided to contain the working fluid as further described below.

Referring also to FIGS. 15A-15C, the flexible web also includes an array of rigid frames 70. Each frame is arranged centrally between a respective pair of upper and first compartments so that the sidewalls of the compartments are attached along their respective upper or lower edges to the mesh 64 mid-way between adjacent frames. Each frame may be welded from steel or aluminium and is bounded by a flat flange 71 with holes through which the frame is bound by a ligature 65 to the panels of mesh 64 which extend between the frames. The frames are also connected together in the plane of the web by steel cables 75 which help to transmit tension forces between the frames.

Each frame defines an aperture 72 with four inwardly projecting flat flanges 73, each having a respective fixing hole 74. In practice the frames may be somewhat smaller than shown and hence occupy somewhat less of the area of the web, depending on the size of the compartments and the size of the FCMs 200 which are distributed through the cushion assembly by mounting them, each in the aperture 72 of a respective one of the frames 70, so that in the use position of the cushion assembly the FCMs are attached to the flexible web between the first fluid cushion and the upper fluid cushion. This protects the FCMs and the flexible hoses which connect them together from damage.

Advantageously, the apertures 72 penetrate the web and may be sufficiently large that by removing the respective FCM 200 from the frame, a slim maintenance person can pass through the aperture to access all of the compartments controlled by that FCM both above and below the frame from either above or below the cushion assembly.

Referring to FIGS. 12A-12C and 13, each FCM 200 comprises a body 201 which in practice may be more smoothly rounded than illustrated, with a plastics or rubber jacket and perhaps having an overall lenticular or flying saucer shape to provide smooth support surfaces for the bladders. Four deep grooves 202 are formed in the outer sides of the body, each groove being intersected by a bore containing a fixing screw 203. The bore is threaded on one side of groove and smooth on the other. The FCM is mounted in the frame by aligning the grooves 202 with the flanges 73 and rotating it through 45 degrees so that the flanges enter into the grooves. Each fixing screw is then rotated until its smooth portion 204 passes through the fixing hole 74 and into the smooth part of the bore, forming a strong connection whereby the body 201 of the FCM transmits tension forces across the frame as well as compression forces between the upper and first compartments and so forms an integral part of the flexible web. The fixing screw has sockets at each end so that it can be rotated by inserting a tool from either side of the frame.

The body 201 has twelve threaded sockets or ports 205 spaced around its outer sides, eight in its upper portion 206 and four in its lower portion 207, the upper and lower portions lying respectively above and below the mean plane of the web 60 in use. The ports 205 are connected together inside the body via isolation valves in three groups of four, each group of four ports forming part of a respective network of fluid conduits for conveying the fluid, which in the illustrated example is compressed air, between the FCMs. An electrical connection socket 208 is arranged coaxially within each port 205 to receive a corresponding electrical plug in the hose end terminal connector 216 which is connected to the port 205. The electrical connection socket 208 may contain one or more annular terminals protected by seals and wipers and a blanking plug which is biased to a rest position in which it sealingly occupies the socket to exclude contaminants, and which retracts into the socket as it is displaced by the plug, as known in the art of downhole (e.g. oil well) electrical connectors.

The Flexible Hoses

Figure 27:
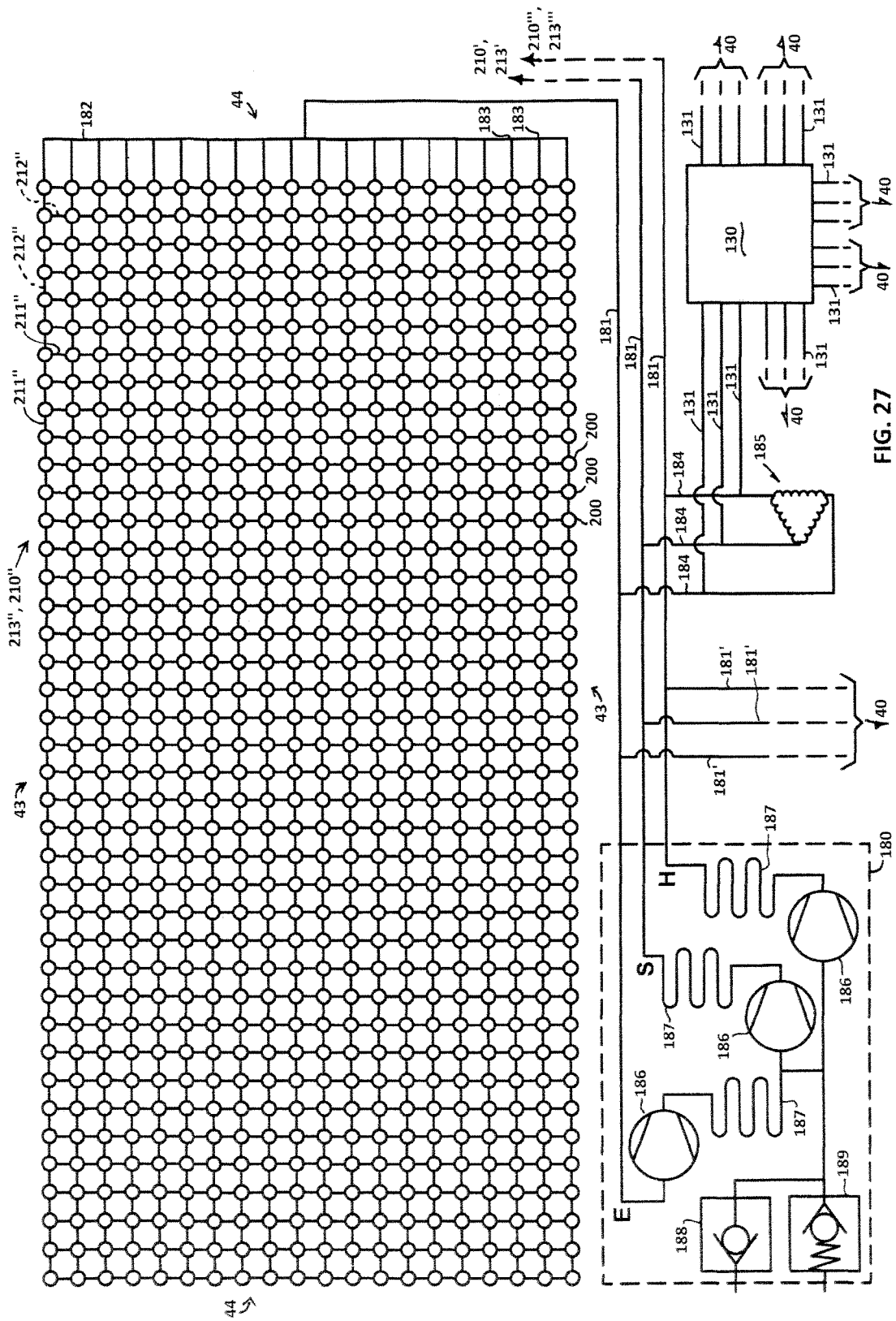
FIG. 27 shows schematically the array of 800 FCMs of one cushion assembly connected together to form a grid by three networks of flexible hoses, wherein for clarity only one of the three networks is shown, together with the central air and power supply units and the central control system from which compressed air, electrical power and control signals are distributed to the FCMs through the grid.

Referring also to FIG. 27, the cushion assembly includes a first network 210' of first flexible hoses 211' which connect together the flow control modules and conduct the fluid to the respective inflatable compartments, and a second network 210" of second flexible hoses 211" which connect together the FCMs and conduct the fluid away from respective deflating ones of the inflatable compartments. In the illustrated example, the cushion assembly further includes a third network 210''' of third flexible hoses 211''' which supply compressed air at a higher pressure from the surface compressors in the central air supply unit 180.

In FIGS. 27, 30-32, 35 and 45, for ease of understanding, the first, supply network is indicated by S, the second, exhaust network is indicated by E, and the third, high pressure network is indicated by H, while inflatable compartments are indicated by C.

The first flexible hoses are interconnected by the FCMs to form a first grid and the second flexible hoses are interconnected by the FCMs to form a second grid and the third flexible hoses are interconnected by the FCMs to form a third grid such that each FCM forms a node in the first grid and in the second grid and in the third grid. Hence the first, supply network 210' forms a first, supply grid, the second, exhaust network 210" a second, exhaust grid, and the third, high pressure network 210''' a third, high pressure grid.

Referring again to FIG. 27, it will be understood that although for clarity only the exhaust grid 210″ is shown in this figure, the first and third grids 210′, 210‴ are connected in a similar way to the supply S and high pressure H lines and are laid out between the FCMs in exactly the same way as the illustrated second grid. It can be seen that in the illustrated example, each of the FCMs is directly connected via at least two of the first flexible hoses and two of the second flexible hoses and two of the third flexible hoses to at least two adjacent ones of the FCMs, while most of the FCMs will be directly connected, each via four of the first flexible hoses and four of the second flexible hoses and four of the third flexible hoses to four adjacent ones of the FCMs. At the edges of the grid each FCM is connected to three adjacent FCMs, while each of the FCMs at the corners of the grid is connected to two adjacent FCMs. The ports 205 not required for connection to adjacent FCMs can be plugged or connected together, or can be used to connect the grid via T junctions 183 to a header 182 which is connected to (or forms part of) the main hose 181 that connects the grid to the central air supply unit 180. Alternatively the main hose 181 could be connected to the grid via T junctions in the hoses joining the FCMs at the edges of the grid. Of course, the headers and main hoses could be arranged other than as shown, and each cushion assembly could have more than one main hose and header.

The FCMs are also connected together by networks of electrical conductors 212′, 212″, 212‴ which may be incorporated into the hoses as shown, so that each of the first, second and third flexible hoses includes a respective first, second or third electrical conductor 212′, 212″, 212‴. The first, second and third electrical conductors are connected together (i.e. first 212′ to first, second 212″ to second, third 212‴ to third) via circuit breakers within each FCM to form respectively a first, second and third electrical grid 213′, 213″, 213‴ so that electrical power or control signals may be conducted via multiple electrical pathways through each of the first, second and third grids to each of the flow control modules. Each T junction 183 has electrical connections similar to the plug and socket connections by which the hose end terminals are connected to the FCMs, whereby the first, second and third networks of electrical conductors are connected via respective main conductors 184 to the central power supply and control units.

Referring to FIGS. 14A-14C, the flexible hoses 211′, 211″, 211‴ are identical (although with the correction to FIG. 17 mentioned below, two different lengths may be needed) and may be only a few meters, perhaps less than 2 m in length, depending on the size of the compartments. A first hose 211′ is shown, comprising a flexible hose body 214, e.g. of rubber or plastics material reinforced by fabric or a metal or polymer braid or the like as known in the art, which may be further reinforced in the manner of a suction hose, e.g. with a spiral wire, so that it is not crushed by the fluid pressure in the compartments that surround it. In the example shown, a series of moulded plastics stiffeners 215 are inserted along the whole length of the hose to help support it against external fluid pressure, and an insulated first electrical conductor 212′ is arranged to run coaxially through the hose via a supporting channel in each of the stiffeners. The hose terminates at each end at a terminal connector 216 with a fluid seal 217 and a threaded captive nut 218 by which it is fluidly connected to one of the ports 205 of a respective FCM. A filter 219 is arranged to prevent debris from travelling into or out of the hose. The electrical conductor 212′ terminates in an electrical plug 220 with a seal 221 which sealingly and conductively engages in the socket 208 when the hose is connected to the FCM, and which may be protected when disconnected by a retractable sheath (not shown). The O-ring seals allow the terminal connector to rotate in its connected position.

Where each FCM incorporates a pump means driven by a local motor, the motor could be rated at less than 1 kW or only a few kW. By way of example, if in the illustrated example each of the eight hundred FCMs in the cushion assembly consumed a maximum of 1.5 kW and it were desired to run them all simultaneously on maximum power, then the required 1.2 MW of power could be delivered using the three electrical grids as the three phases of a 415V 3-phase AC power supply from a central power supply unit 185 (the coils connected in star rather than delta configuration as shown), wherein each conductor 212′, 212″, 212‴ could have a diameter of less than 8 mm allowing for redundancy.

Figure 26A:
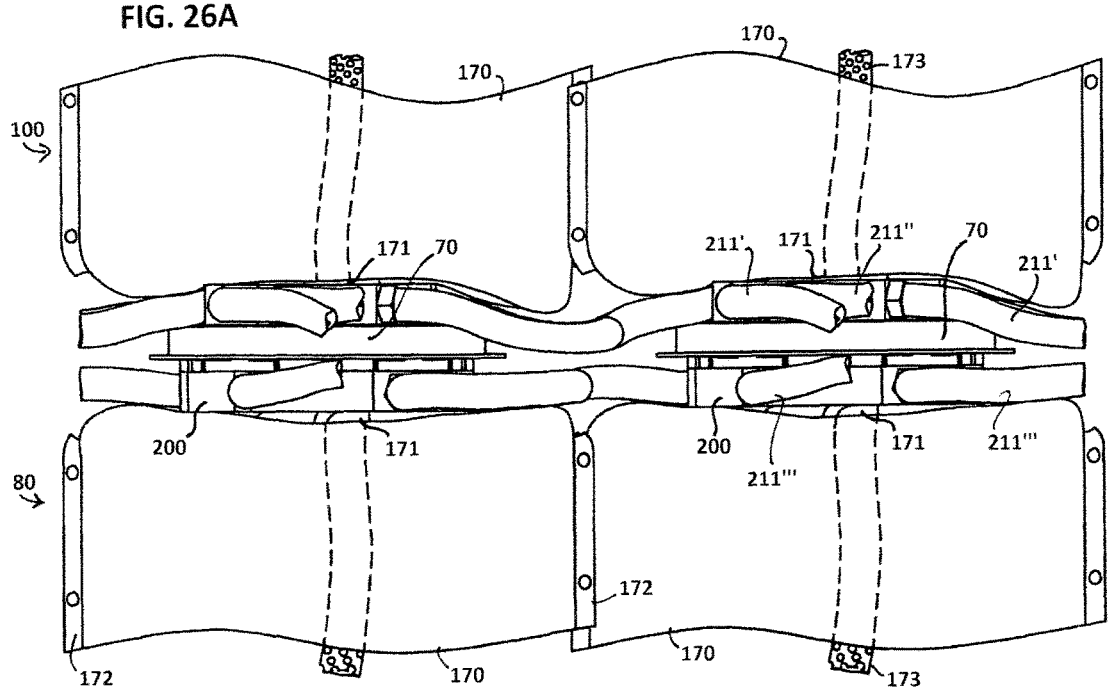
FIGS. 26A and 26B show a part of the fluid cushion comprising two of the FCMs mounted in frames and connected to the bladders of respective upper and lower compartments, respectively with the flexible web and mesh sidewalls removed, and with the flexible web and mesh sidewalls partially cut away.
Figure 26B:
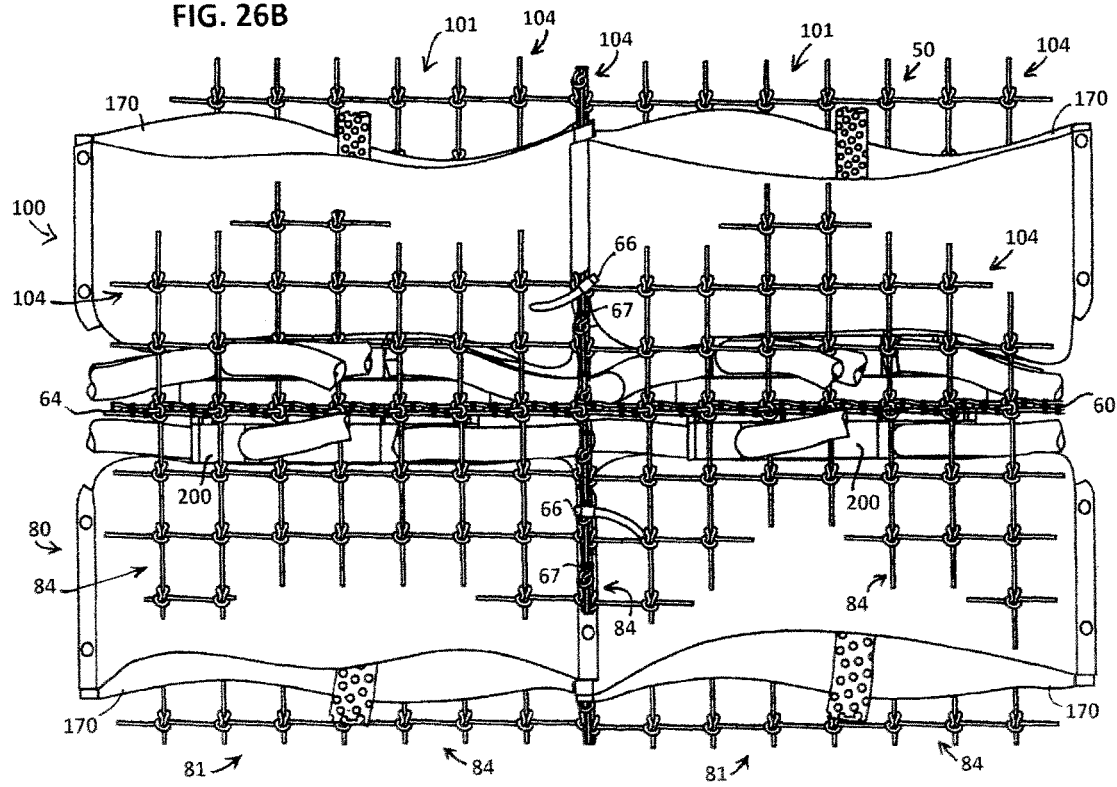

The hoses are connected to the FCMs so that the first and second networks of first and second flexible hoses 211′, 211″ are arranged above the flexible web 60 as shown in FIG. 17, and the third network of third flexible hoses 211‴ is arranged just below the flexible web 60 as shown in FIG. 18. The hoses pass through the apertures of the mesh of the compartment sidewalls so that in use, the FCMs and flexible hoses are arranged between the bladders 170 of the first and upper compartments of the first and upper layers on either side of the web, which are connected via further flexible hoses 171 (similar to the illustrated hose 211′ but not including an electrical conductor) to respective ports 209 in the upper and lower faces of the body 201 of the respective FCM as shown in FIGS. 26A and 26B. The hoses of the three grids can be arranged side by side with each FCM arranged in a defined orientation in the flexible web as shown in FIG. 17; alternatively each pair of hoses 211′, 211″ could cross over one another so that each of the four groups of connection ports can be arranged in the same order and the FCM can be arranged in any of four possible orientations. Resilient foam or rubber blocks (not shown) may be arranged between the hose ends and the web to relieve strain from the hose end terminals.

To supply the local control unit 150 of each FCM with AC or DC power, in alternative embodiments each flexible hose could have two, three or more conductors, each forming part of a separate electrical grid wherein all of the electrical grids run through the hoses of only one fluid grid, the conductors providing feed and return paths for the power supply to the modules. The conductors could run through the inside of the hoses, e.g. as shown, or alternatively could be incorporated into the hose walls or could be separate from the hoses, for example, as insulated wires or braids running along the flexible web. Alternatively there could be only a single conductor running inside each hose, with a metal braid covering or embedded in a wall of the hose acting as an electrical return path.

Alternative Flexible Web, FCM and Frame Assembly

FIGS. 47A and 47B show an alternative flexible web 400 and an alternative FCM and frame assembly 420, 440, which may be used individually or in combination in place of the flexible web 60 and/or the FCM 200 and frame 70. It will be understood that the drawing is simplified, and in practice the FCM may accommodate more or fewer flexible hoses, with additional flexible hoses (not shown) being arranged to supply the upper compartments, and/or additional layers between the flexible web 400 and the upper and lower compartments, depending on the structure of the cushion assembly.

The alternative flexible web 400 comprises an assembly of upper and lower flexible webs 401, 402 spaced apart vertically by a short distance, e.g. about 10 cm or 30 cm. Each of the upper and lower webs 401, 402 may be similar to the flexible web 60 earlier described, comprising a generally planar sheet of material with high tensile strength, optionally including elastic elements, e.g. a mesh (for example, a woven fabric) of polymer fibres, elastic shock cords and/or steel cables. The upper and lower webs 401, 402 are connected together in the centre of each cell (i.e. each vertical stack of compartments when considered in plan view) of the cushion assembly by a steel or aluminium frame 440, which may be for example circular or square as shown in plan view and which forms a wall extending between the upper and lower webs bounded at its top and bottom ends by outwardly extending flanges 443 which are attached to the upper and lower webs 401, 402, and by short vertical walls 403, for example of elastic or inelastic mesh, which serve to extend the flexible walls of the compartments above and below the flexible web 400 so as to connect them together between the upper and lower flexible webs 401, 402.

Several subframes 450, each comprising a steel plate, are arranged respectively at the upper and lower ends of the frame 440 and connected to it by screws 451, which engage in threaded sockets 441 on the frame 440 and which preferably are captive in each subframe 450 so that they don't get lost. Each of the flexible hoses 211', 211", 211'", 171, 122 terminates at one of the subframes 450. The FCM 420 is generally similar to the FCM 200 as earlier described but is adapted to fit within the frame 440 so that the upper and lower subframes 450 extend part way across its upper and lower surfaces. Each subframe 450 is connected to the FCM 420 by one or more screws 452, each of which engages in a threaded portion of a hole 442 which extends entirely through the FCM and opens at its top and bottom surfaces. Each screw 452 has a socket at each of its ends and is captive on the subframe 450 so that it can rotate freely in the subframe 450 but abuts the subframe 450 in both axial directions. Each hose 211', 211", 211'", 171, 122 terminates in a short, smooth spigot which extends from one flat face of the respective subframe 450 and is provided with a resilient seal, for example, an O-ring. The hose is sealingly connected to a respective port on the upper or lower face of the FCM 420 by inserting the spigot into the port and engaging the screw 452 in the FCM 420 so that as the screw 452 is rotated the flat face of the subframe 450 is drawn towards the upper or lower surface of the FCM 420 as the spigot is urged into sealing connection with the port.

To remove an FCM 420 for replacement or access to the compartment above or beneath, the subframes 450 on the nearest side are first disconnected by unscrewing screws 451 from the frame 440 and then disconnected from the FCM 420 by rotating the screws 452 to urge the spigots out of the ports, so that the subframes can be pushed to one side out of the way. An extended tool is inserted through the holes 442 in the FCM 420 to disconnect the screws 452 of the subframes 450 on the opposite side, after which the FCM 420 can be lifted out of the frame 440. The remaining subframes 450 can then be detached from the frame 440 as required.

An additional bladder or bladders are arranged between or around each of the frames 440 and connected to the air supply via suitable additional valves (not shown) within the FCM 420 so that when inflated they urge the adjacent frames 440 and the upper and lower webs 401, 402 apart. This extends the assembly of bladders and upper and lower webs 401, 402 comprising the compound flexible web 400 into a generally flat, rigid configuration which can be used to extend the cushion assembly beneath the load during deployment and also to provide a reference plane when the upper layer is being inflated to conform to the hull shape.

In the example shown, two additional annular bladders 460, 461 are arranged concentrically around each frame 440 in the manner of inner tubes around the wheel rim of a road vehicle, both bladders being connected to the FCM 420 via a common flexible hose 462. The bladders 460, 461 may be square or circular in shape. The upper and lower webs 401, 402 may be connected together by ties 404 which extend between the two concentric bladders 460, 461, and may include elastic shock cord or the like to contract the web horizontally when the bladders 460, 461 are deflated.

The bladders 460, 461 forming part of the assembly of the flexible web 400 are maintained in an inflated condition during use, so that the rigid condition of the flexible web 400 helps support the pressure in the upper compartments, particularly at the outer sides of the cushion assembly, as the deflated region of the first fluid cushion passes underneath them. Alternatively or additionally, the pressure in the upper compartments may be locally reduced by the local control unit 150 of the FCM 420 or 200 and then restored again when the first fluid cushion beneath them is re-inflated.

The Bladders and Flexible Walls

In the illustrated examples, each of the first and upper compartments comprises at least one inflatable bladder 170 which is arranged between the respective group of flexible walls defining the compartment, and the inflation means comprising a respective one of the FCMs 200 which is releasably fixed in the respective frame 70 is arranged to deflate and re-inflate the compartment by deflating and re-inflating the at least one bladder.

When compressed air is used as the working fluid each bladder could alternatively be referred to as an airbag. Each bladder may be made for example from a sheet of rubber or any other natural or synthetic, flexible material, whether solid, layered, woven or coated, as known in the art, which typically may be less elastic than the flexible walls. However, since the walls of the bladder are supported by the elastic mesh, the bladder may be of relatively lighter construction than would be required, for example, for a bladder which is to be used as a rolling support beneath the keel of a ship being launched down a slipway.

Referring to FIGS. 25A-25C, each bladder 170 may be slightly larger when fully inflated than the compartment which contains it when the flexible walls of the compartment are maximally tensioned, so that the bladder is always supported by the flexible walls. The bladder illustrated is the same shape as the (first or upper) compartment and has four narrow flaps 172 extending down its long sides with holes through which cable ties 66 can be inserted to attach it to the flexible walls. In the illustrated example, each bladder 170 also contains a perforated hose 173 which helps to evacuate trapped air pockets when the cushion assembly is fully deflated and wound back onto the spool. In practice an open structure perhaps similar to the stiffeners 215 might be used instead for this purpose.

The flexible walls both above and below the flexible web 60 include vertical walls which are arranged in parallel spaced relation in two groups to extend respectively in the primary dimension D1 and the secondary dimension D2 of the cushion assembly, the two groups intersecting to define the respective side walls 84 of each of the first inflatable compartments 81 which form the first layer 80 below the flexible web, and the side walls 104 each of the upper inflatable compartments 101 which form the upper layer 100 above the flexible web, so that the compartments are separated from one another by their sidewalls 84, 104 which extend respectively downwardly and upwardly from the flexible web and which are shared between adjacent compartments.

Optionally, the first layer may also include a plurality of second inflatable compartments 120 which act as a tension means, as further described below.

Preferably the first layer consists 80 essentially of the contiguous first compartments 81 and the respective groups of flexible walls comprising a tension means, or alternatively of the contiguous first and second compartments 81, 120, the second compartments 120 comprising a tension means, and the respective groups of flexible walls, so that in the rest condition the first fluid cushion 82 consists essentially of the inflated first compartments 81 which are equally inflated in the rest condition and which support substantially the entire load 1 above the ground surface 2. This provides a very simple and robust structure.

The flexible walls further include a horizontal upper wall 105 of each upper compartment 101, which is connected to the upper ends of its respective vertical sidewalls 104 and may be of similar construction, and a horizontal base wall 85 of each first compartment 81, which is connected to the lower ends of its respective vertical sidewalls 84, as further described below.

It will be understood that the flexible vertical walls can be assembled and joined together in any convenient way, so that each one could be for example a continuous panel or many small panels, or could combine parts of many tubular panels each defining a respective compartment, or could comprise parts of many continuous panels joined together in a zigzag configuration. Where the sidewalls are made from a mesh 50 as shown, the cushion assembly can be assembled simply by knotting the panels or otherwise connecting them together, e.g. using ligatures 65 or clamps or crimps 67, as shown in FIG. 26B, and can readily be disassembled and reassembled for maintenance.

Each first compartment 81 is square and conterminous in plan with a respective upper compartment 101, and has a vertical height or depth D4 along its vertical length axis which preferably is at least twice as long, and more preferably, as shown in the illustrated example, is at least three times as long as its horizontal dimensions D5, D6 in the primary and secondary dimensions D1, D2 of the cushion assembly. This columnar configuration makes it possible for the base wall 85 of each first compartment to move horizontally through a short distance relative to its upper wall with relatively little change in overall height. The upper wall of each first compartment 81 and the base wall of the corresponding upper compartment 101 are both defined by the portion of the flexible web 60 that lies between the first and upper compartments and by the respective surfaces of the frame 70 and the body 201 of the FCM that are arranged to form part of that portion of the flexible web, so that the portion of the flexible web forming the upper wall of the first compartment supports (and is supported by) the respective upper compartment above it.

In the illustrated examples, each group of flexible walls defining the first and upper compartments includes a mesh 50, best seen in FIGS. 19A-21, preferably an elastic mesh which forms the sidewalls of the compartment and acts as a tension means which is energised by inflation of a respective one or group of the inflatable compartments.

Advantageously, some or all of the flexible walls defining each first or upper or second compartment, particularly the side walls 84, 104 of each first or upper or second compartment, may consist essentially of a mesh 50, as shown. Preferably the mesh is made from cords 51, each cord comprising an elastomeric core 52, e.g. of natural rubber or a synthetic elastomer, arranged in a sheath 53 of relatively inelastic material, e.g. polyester or nylon. Cords of this type are known as shock cords, and advantageously provide a range of elastic strain which is limited by the configuration of the fibres of the outer sheath which are typically braided so that at a transition point in the stress/strain curve of the cord, the outer sheath tightens and stress begins to be transferred to the outer sheath before the elastic core reaches its elastic limit. The behaviour of the cord then becomes relatively inelastic up to its ultimate load which may be much greater than that of the core alone. The elastic mesh could be for example knitted or woven as shown in FIGS. 43 and 44, or formed as shown in FIG. 42 by clamping the elastic cords 51 together at each intersection with a stainless steel or aluminium clamp or crimp 67, perhaps with a resilient sleeve to cushion the cord inside the clamp or crimp, or it could be knotted as shown in the other figures, for example, by holding the cords under tension while knotting them, or by knotting them in the relaxed condition and then, optionally, holding them under tension to draw up the knots, perhaps in a frame or jig so as to apply even tension across the mesh.

A low friction material such as PTFE, silicones or the like could be arranged to reduce friction between the bladders and mesh, for example, as a coating or incorporated into the sheath 53 or other filamentary elements making up the mesh.

The cords 51 forming the strands of the mesh could be arranged at 45 degrees to the horizontal flexible web 60 and ground surface rather than vertically and horizontally as shown, or alternatively at a different oblique angle if the mesh is diamond shaped (with long and short axes) rather than square as shown. A 45 degree or other oblique strand orientation may be preferred in order that the upward expansion force (further explained below) can be reacted against all the strands of the mesh rather than just the vertical strands, and also in order to provide that the mesh can generate a contraction in one direction (e.g. horizontally) oblique to the strand direction responsive to tension in the other direction (e.g. vertically) oblique to the strand direction. This effect of course can be realised also with an inelastic mesh.

The following figures are provided by way of a non-limiting example which may be corrected or adapted by those skilled in the art.

Where the load is a ship, as a rule of thumb, the working pressure in the first and upper compartments may be selected to correspond to a reference pressure of 1 bar for every 10 m of displacement of the hull, calculated based on the plan area of the hull at its normal waterline but with the displacement adjusted as if the ship had a nominal block coefficient of 1, effectively averaging the displacement over its whole plan area. So for example, if a ship would have a displacement of 20 m if the hull were extended downwardly from its normal waterline to a flat base plane, then the reference pressure would be 2 bar. Alternatively a higher pressure may be used so that several cushion assemblies may be spaced apart along the length of the hull, making it easier to position the cushion assemblies to replace respective ones of the stands or chocks during deployment on land or to insert stands or chocks between the cushion assemblies to support the ship on land before the cushion assemblies are removed.

For clarity, the flexible walls are illustrated with only one layer of mesh. However, if the cord diameter required to achieve the necessary load profile is too large for the mesh size then two or more layers of mesh may be combined to form each flexible wall, or alternatively, two or more elastic cords may be combined to form each strand of the mesh.

The elastic mesh could be selected to provide maximum extension (e.g. 100% elongation of the elastic cords compared with their length at rest) at the reference pressure, or at less than the reference pressure so that the transition point is achieved under partial load, or at more than the reference pressure so that the cords are normally only partially extended.

It will be noted that the ground pressure applied by the inflated cushion assembly in use will correspond to the reference pressure. For example, at 2 bar the pressure applied to the ground surface would be similar to the pressure applied by the pneumatic tyre of a small car. If such a vehicle were to traverse a soft ground surface, e.g. sand or mud, the soft material would be extruded from beneath the tyre so the vehicle would become bogged down. A similar phenomenon could be expected to occur when the cushion assembly moves over a soft surface, but since the extrusion would occur only at the edges of the cushion assembly where a pressure gradient exists, the effect would be relatively insignificant due to the much larger area of the fluid cushion. For this reason the cushion assembly may be used in an emergency to transport a ship or similar load over mudflats, sand, marshland, cultivated fields or similar soft ground surfaces, so as to recover a ship from the water onto land or vice versa.

The respective sidewalls 84 and base walls 85 of adjacent first compartments 81 are interconnected in the base region 83 of the first fluid cushion 82 at or proximate the base surface 86 of the first layer which lies in contact with the ground in the rest position, so that in use the tension force is transmitted directly between them at or near ground level as further described below. The base surface 86 consists essentially of the downwardly facing surfaces of the contiguous base walls 85 of the first compartments so that the first fluid cushion 82 is conterminous in plan with its base surface.

Referring to FIGS. 22-24B, each base wall 85 comprises a base sheet 87 of heavy flexible sheet material such as a rubberised canvas or the like, which rests in contact with the ground surface and protects the bladder 170 against damage from ground surface debris, a lighter upper sheet 88, and a panel 89 of elastic mesh 50 which is sandwiched between the base sheet and upper sheet. The elastic mesh panel 89 is stretched, e.g. on a frame or jig (not shown), before being laid out in the position shown in FIG. 24A between the base sheet and upper sheet. The base and upper sheets 87, 88 are then fastened together through the apertures of the mesh (if the mesh is configured to define enlarged apertures as shown), e.g. by stitching 90 and/or rivets, so that after assembly and when the first compartment is deflated, the mesh causes the base panel to pucker or contract evenly over its whole surface area. The edges of the base sheet 87 extend outwardly to form a narrow strip 91 with holes along each side of the base panel.

Referring again to FIGS. 19A-20, each sidewall 84 of each first compartment terminates at its lower edge with a tape 92 which has spaced holes corresponding to the holes in the strips 91 of the base walls 85. The tape 92 is sandwiched between the strips 91 of adjacent base walls and the three layers fixed together by rivets 93 inserted through the holes. The rivets can be removed if it is necessary to replace the base panels or the sidewalls or to gain access to any of the compartments to replace the bladders or the FCM. The base surface 86 is thus formed by the contiguous base sheets 87 which present a continuous surface with narrow, downwardly facing seams which in use are pulled upwards and away from ground surface obstructions so that the fluid cushion does not become snagged during operation. Of course, the seams could be sewn rather than riveted, or any other constructional method could be adopted if preferred. For example, the individual base walls could be combined if preferred to form a single panel.

Rather than forming the elastic means of the flexible walls by knotting or clamping elastomeric cords to form a mesh, the flexible walls could comprise panels of elastic, particularly elastomeric sheet material or elasticated fabric, or panels of mesh made by knitting or interweaving elastic, preferably elastomeric cords or strips of elastic sheet material, preferably elastomeric material, or elasticated fabric. For example, elastic webbing or shock cords could be knitted or woven to form an elastic mesh, with the panels being attached together to form the flexible walls of the compartments.

Optionally, the elastic means can be arranged to apply a greater elastic force in a horizontal direction (and hence in the direction of travel) than in a vertical, upward direction. This causes the first compartments to re-inflate preferentially downwardly as the deflated region passes through the first layer, so that the base surface of each first compartment contacts the ground surface at an earlier stage of inflation, whereby the frictional contact with the ground surface helps to retain the first compartment at the desired angle of inclination as it continues to inflate.

This could be achieved for example by forming the elastic mesh from respectively vertical and horizontal groups of parallel shock cords or webbing, which may be for example clamped, knotted or woven together, wherein the vertical cords or strips are thinner or spaced further apart than the horizontal cords or strips. For example, the compartment walls could consist essentially of woven vertical and horizontal shock cords, the vertical shock cords having a smaller diameter than the horizontal shock cords.

Alternatively, the elastic panels or mesh could comprise shock cords of equal diameter arranged for example at 45 degrees to the flexible web and base surface, but wherein the compartment walls in the relaxed condition are relatively longer in the vertical dimension and shorter in the horizontal dimension than the corresponding vertical and horizontal dimensions of the bladder within the compartment. When the bladder is inflated, the omnidirectional expanding force causes equal extension in both vertical and horizontal dimensions, which results in the compartment reaching its maximum vertical length (limited by the vertical dimension of the bladder) and so contacting the ground surface before it is fully extended in the horizontal dimension. Horizontal extension then takes place by deformation of the mesh structure so that each mesh becomes relatively extended in the horizontal dimension while the vertical dimension remains the same, so that the tension force vector (corresponding to the alignment direction of the shock cords) in the horizontal dimension is concomitantly greater than in the vertical dimension. In this way a simple, regular mesh structure can apply an imbalanced force.

FIGS. 43 and 44 show two exemplary alternative compartment wall structures comprising woven elastic shock cords 51 as earlier described, respectively with equal and different diameters in the warp and weft directions. These and other conventional weave structures may be selected as required to apply the required elastic tension force in each of the two warp and weft directions of the weave. Woven structures may advantageously apply more elastic force than the knotted structures described earlier. They may be used in pairs to form double walls containing the second compartments. They may be adapted to form the ground engaging panels of the base surface, either protected by a sheet of rubberised fabric as earlier described or impregnated and coated with a rubbery compound, perhaps reinforced with fibres. Rather than using rivets, adjacent vertical and horizontal woven panels may be connected by lashing or binding them together at their edges.

The Upper Fluid Cushion

Referring to FIGS. 6-8, the flexible web 60 is arranged in the use position between the first fluid cushion 82 and the upper fluid cushion 102 in the inflated rest condition of the first fluid cushion and the inflated condition of the upper fluid cushion, and the side walls 104 of the upper compartments 101 are arranged between the flexible web 60 and the load 1, so that the upper fluid cushion maintains the load in a stable position above the first fluid cushion.

In use, the fluid pressure within the upper fluid cushion 102 maintains the flexible web in a fully extended condition. This keeps the edges of the flexible web at the first ends 43 of the cushion assembly straight and parallel when considered in plan view, so that adjacent cushion assemblies can be arranged to abut one another in the length direction of the ship in the use position. If the direction of travel is in the primary dimension D1 and hence aligned with the length direction of the ship, then as the travelling contraction approaches the respective leading end 43 of the cushion assembly, the tension force is reacted against the leading edge of the flexible web which is supported by the fluid pressure of the upper fluid cushion 102.

Referring also to FIG. 4B and FIG. 5, the upper compartments 101 are arranged in groups 106 which are arranged symmetrically on either side of the axial centreline 45 of the flexible web 60, with the flexible walls 104 of the upper compartments of each group being interconnected, and conveniently shared between adjacent upper compartments 101 so that each one forms the dividing wall of two adjacent upper compartments 101, each upper compartment containing a respective bladder 170, as shown.

Each group 106 of upper compartments is separable from an adjacent group 106 of upper compartments at a respective separation plane 107 which extends in parallel with the axial centreline 45 and downwardly through an upper surface 108 of the upper layer (comprising the upper walls 105) between the adjacent groups 106 of upper compartments so that the flexible walls 104 of the adjacent groups of upper compartments are not interconnected via the separation plane. This makes it possible for the groups of upper compartments to conform better to the concavities of a ship's hull without drawing the sides of the cushion assembly together, by allowing the sidewalls 104 bounding each group to lie partly in contact with the base surface 9 of the hull. In effect, the separation planes mean that the upper layer can accommodate greater variations in hull shape, which otherwise could only be accommodated by making the upper layer deeper (i.e. thicker). It will be noted that the separation planes on each side of the axial centreline 45 extend downwardly to a level 111 which rises outwardly from the centreline 45 towards the second ends 44 of the cushion assembly. The sidewalls 104 of all of the upper compartments 101 below this level are connected together, which helps to stabilise the upper layer.

When the flexible web 60 is arranged in a horizontal plane in a fully inflated condition of the upper layer as shown, the upper compartments 101 extend upwardly from the flexible web as shown (FIG. 4B, FIG. 5) to a height above the flexible web which increases outwardly from a central region 109 of the flexible web, which extends along its axial centreline 45, to a pair of lateral regions 110 of the flexible web spaced symmetrically on either side of the central region. (In alternative embodiments the upper compartments could be all the same height, or could reduce again in height outwardly from the lateral regions towards the second ends 44 of the cushion assembly.)

When the upper layer is arranged to support the hull of a ship, typically a base surface 9 of the load resting on the upper fluid cushion 102 will be non-parallel with a nominal, horizontal reference plane (represented in the illustrated examples by the base surface 86 lying flat against the ground surface), as shown in FIGS. 7 and 8. In this case the upper compartments 101 supporting the base surface of the load are inflated respectively to different heights above the flexible web 60 as shown (the different heights corresponding to the elevation of each point on the base surface 9 of the hull above the ground surface), so that the flexible web 60 beneath the base surface 9 is more nearly parallel than the base surface 9 with the reference plane (corresponding to flat base surface 86, resting on the ground). In practice, the flexible web 60 thus defines a fairly flat plane which assists the operation of the first compartments 81. The upper layer thus conforms to the shape of the hull of the ship 1 so that the cushion assembly can be used to move any ship within the dimensional limitations of the upper layer.

The upper compartments 101 can remain at a constant pressure in operation, or if necessary, the FCMs can be operated to adjust the fluid pressure in each upper compartment 101 of the upper layer 102 so as to maintain the flexible web 60 in a horizontal plane as the contraction travels through the first layer 80, in particular as it reaches the leading and trailing ends of the fluid cushion in the direction of travel.

The First Mode of Operation

Figure 9:
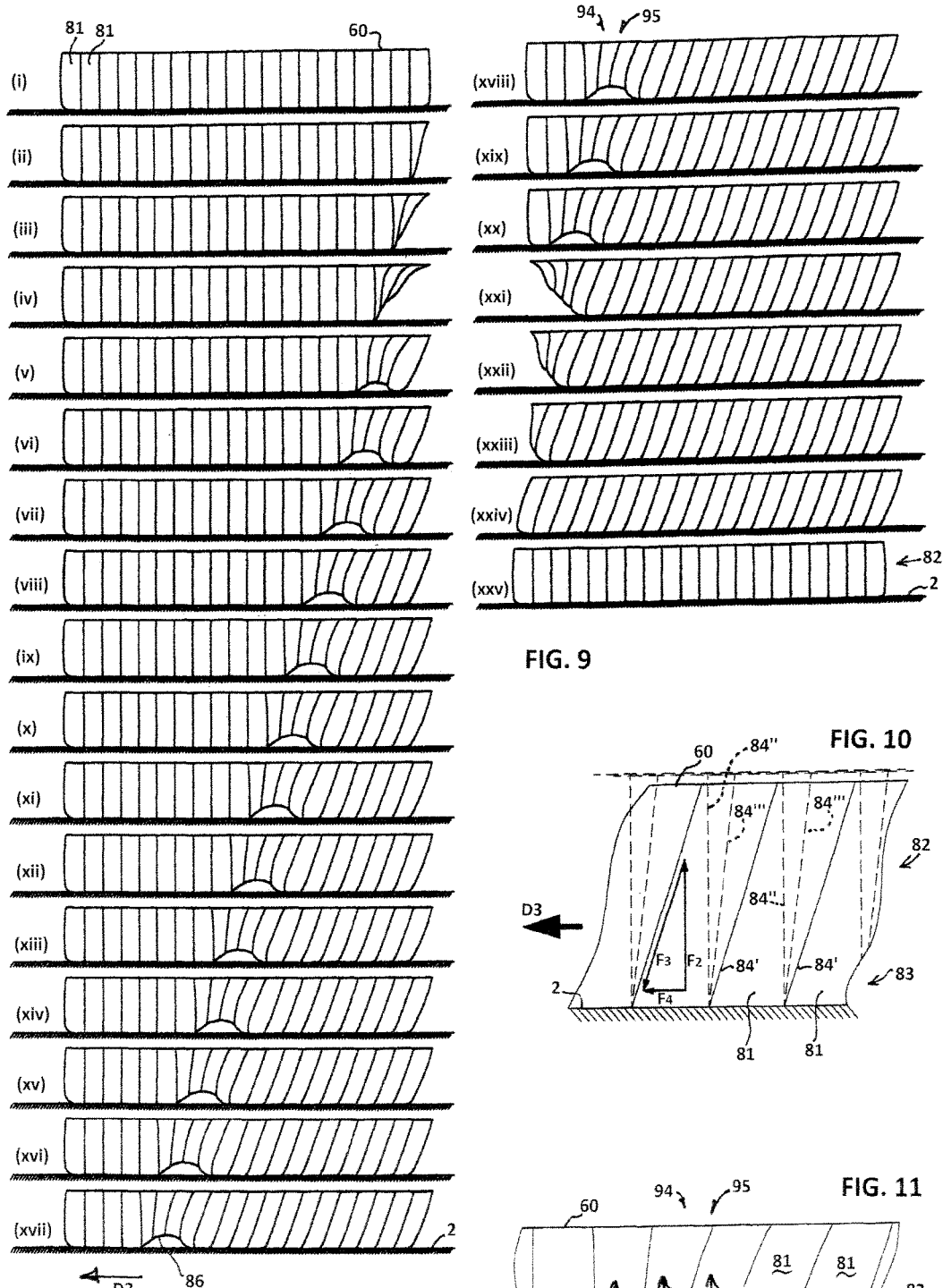
FIG. 9 is a side view showing how the first fluid cushion moves over a horizontal ground surface as the travelling contraction travels through it in 25 consecutive steps from (i) to (xxv)
Figure 11:
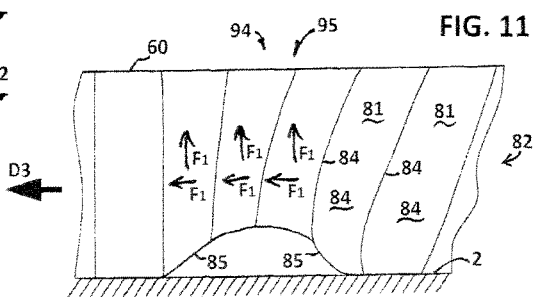
FIG. 11 shows how the tension force acts on the first compartments in the region of the travelling contraction.

Referring to FIG. 9 and FIG. 11, the first fluid cushion 82 is shown in side view in the use position wherein it is supported on the ground surface 2, so that the twenty contiguous first compartments 81 of the outermost row can be seen extending in the first dimension D1.

Where the following description refers to deflating a first compartment, it will be understood that the whole column of first compartments is deflated, although alternatively it may be preferred to deflate different first compartments of the column at different times—for example, so that the deflated region travels through the first fluid cushion in a spearhead formation, or a discontinuous checkerboard pattern, rather than a straight line when considered in plan.

For clarity, the remainder of the cushion assembly is not shown, but it will be understood that the load 1 is supported on the upper fluid cushion 102 above the flexible web 60 as previously described.

In accordance with the first mode of operation, the inflation means (comprising the FCMs and flexible hoses together with the central air supply unit 180) is operated to deflate and re-inflate selected ones of the first compartments 81 in a sequence of consecutive steps from (i) to (xxv) as shown so as to produce a deflated region 94 of the first fluid cushion 82 which travels through the first fluid cushion in the direction of travel D3. The elastic mesh 50 of the compartment walls acts as a tension means which is energised by inflating each respective first compartment 81 to expand the mesh. The expanded mesh induces a tension force F1 between respective ones of the flexible walls 84, 85, 60 of the respective first compartment, which is opposed by the fluid pressure in that compartment. The tension force F1 acts to pull respective ones of the compartment walls 84, 85 of each deflated or deflating first compartment 81, forwardly in the direction of travel D3 or upwardly away from the ground surface 2, and preferably both forwardly and upwardly as shown, as the mesh contracts again when each respective first compartment 81 is deflated.

FIG. 11 illustrates how the tension force F1 is induced between respective ones of the flexible walls of each deflated or deflating first compartment 81, and pulls a trailing flexible wall or walls of the deflating or deflated first compartment forwardly towards a leading flexible wall or walls of that deflating or deflated first compartment and upwardly away from the ground surface.

The first compartments may be fully or partially deflated in the deflated condition, which may be defined by a reduction in fluid pressure in the respective first compartment, or alternatively by a reduction in volume in the first compartment without any reduction in fluid pressure, or by a reduction in fluid pressure together with a reduction in volume. The term "deflated region" is construed accordingly.

In the illustrated example the direction of travel D3 is aligned with the primary dimension D1 of the fluid cushion and hence with the length direction of the ship 1, so that the sequence begins and ends at the opposite first ends 43 of the fluid cushion, but it could equally well be aligned with the secondary dimension D2, in which case the sequence would begin and end at the second ends 44, or it could be in a direction extending in both the first and second dimensions and so oblique to the length axis of the ship, or it could be in a non-linear direction. If the direction of travel is reversed then the sequence simply begins at the opposite end and travels in the reverse direction from that shown.

Step (i) shows the first fluid cushion in the rest condition, in which the sidewalls 84 of each first compartment 81 are substantially vertical.

The sequence of operation begins in step (ii) by deflating the outermost first compartment 81 at the trailing first end 43 of the cushion assembly. As the first compartment deflates, its trailing walls are pulled towards its leading walls and towards the remainder of the first compartments 81 ahead of it in the direction of travel which remain in the inflated condition. The next first compartment 81 is similarly deflated, and once a sufficient number (for example, two, three or four, best determined by trial and error) of first compartments have been deflated, the first compartment 81 at the trailing first end 43 is re-inflated (step v). Advantageously this occurs as the next first compartment 81 at the front of the deflated region is deflating so that the air flows from one first compartment 81 to the other (e.g. using the BALANCE function as further explained below) at least until their pressures are equalised. It can be seen that the tension force F1 exerted by the elastic mesh acts upon the re-inflating first compartment 81 in the direction of travel D3, being reacted against the walls of the still inflated first compartments which lie ahead of it in the direction of travel and which are anchored by friction against the ground surface, and so, when it makes contact again with the ground surface 2, the base wall 85 of the re-inflating first compartment 81 has been displaced in the direction of travel D3. Friction with the ground surface helps to maintain the first compartment 81 in this downwardly and forwardly inclined orientation until it is fully inflated.

The tension force F1 applied by the mesh 50 helps to rapidly deflate each respective deflating first compartment 81 and also produces a local contraction 95 in the deflated region 94 of the first fluid cushion which travels through the first fluid cushion 82 from its trailing end 43 to its leading end 43 so as to move the base region 83 of the first layer 80 of the cushion assembly progressively over the ground surface in the direction of travel D3, as shown.

As each of the first compartments 81 is re-inflated it is supported in its forwardly and downwardly inclined orientation also by the fluid pressure in the first compartment 81 immediately behind it, which relieves the tension force on the trailing side so that the tension force always acts asymmetrically in the direction of travel D3. As the deflated region reaches the leading end 43 of the first fluid cushion (step xxi), the fluid pressure in the last few inflating first compartments 81 plays a relatively greater role in moving the base surface 86 forward through steps (xxi) to (xxiv) by reaction against the inflated first compartments 81 immediately behind. During these last few steps however, as in the preceding steps, the tension force also acts to pull the compartment walls 84, 85 upwardly towards the flexible web 60, which causes each first compartment 81 to elongate downwardly towards the ground surface as it inflates. In this way the tension force ensures that also the last few first compartments are able to inflate unimpeded by the ground surface towards a forwardly and downwardly inclined orientation as shown, in which each base wall 85 is displaced somewhat forwardly from its previous position, perhaps by up to about the width of one compartment, like those of the other first compartments earlier in the sequence.

It will be understood that, while the base surface 86 is moved forwardly in the direction of travel by the tension force F1, the load 1 is moved forwardly in the direction of travel by the fluid pressure in the first compartments.

Figure 10:
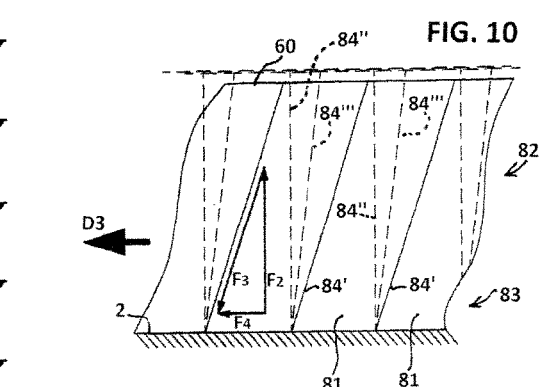
FIG. 10 shows how the tension force and fluid pressure act on the first compartments.

This is illustrated by FIG. 10 in which the sidewalls 84 of the first compartments, after they have been moved in the direction of travel by the tension force F1, are designated 84' in the forwardly and downwardly inclined orientation of the first compartments, corresponding to step xxiv of FIG. 9.

Since the volume of each first compartment 81 is at a maximum when the sidewalls are normal to the ground surface 2 (and hence vertical on a nominal, horizontal ground surface as shown), the vertically upward force component F2 of the omnidirectional fluid pressure in each first compartment in excess of the downward force applied by the load 1 is reacted as a tension force F3 in each of its sidewalls 84, with the resulting vector force F4 urging the sidewall to move in rotation towards its vertical or rest orientation 84" as the fluid expands towards its minimum energy state. It is this vector force F4 which generates the forward motion of the load in the direction of travel D3. Where the fluid cushion is being used to move the load up a gradient, a component of this forward vector force F4 will be required to counteract the opposite vector force as gravity tends to move the load down the gradient, and the remaining component of the vector force F4 will move the sidewall to an intermediate position 84''' so that the distance travelled on each operational cycle is reduced proportionately to the gradient. On a downhill gradient the opposite principle applies.

In the example of FIG. 9, the movement of the base surface 86 of the cushion assembly takes place without concomitant movement of the load from step (i) to step (xxiv) while the movement of the load takes place without movement of the base surface 86 from step (xxiv) to step (xxv). This could be achieved for example by increasing fluid pressure from step (xxiv) to step (xxv). In practice however the movement of the load 1 is likely to be more gradual, particularly where several fluid cushions are arranged in series along the length of the load as shown in FIG. 6 and operated in a sequence or asynchronously relative to each other. As the base surface 86 of each cushion assembly is progressively moved in the direction of travel, the net balance of forces between all the first fluid cushions may produce a gradual and continuous forward movement of the load, lagging behind the movement of some of the first compartments while urging others forward in the direction of travel before the travelling contraction has reached them. Optimal strategies for operating multiple cushion assemblies in sequence or in synchrony, and for adjusting or balancing fluid pressures between different cushion assemblies (optionally by means of fluid connections between them and/or between different central air supply units 180), may be developed through practical experience. It is also possible for multiple, spaced contractions to travel simultaneously through a single fluid cushion.

Compared with the prior art, the novel cushion assembly is more certain and reliable in operation, particularly on rough or uneven ground. Advantageously, the tension force F1 may be arranged to act as shown both forwardly in the direction of travel and upwardly away from the ground surface. This provides particularly reliable operation since it pulls the deflated compartment walls upwardly and forwardly over irregularities in the ground surface.

Advantageously, at any given moment the majority of the first compartments 81 are inflated. This means that the load is spread over the largest possible ground area, and ensures maximum redundancy so that normal operation can continue if an individual bladder should fail. Advantageously, the side walls 84 of the first compartments are fixed in contiguous relation at the flexible web 60, so that their upper walls (defined by the portion of the flexible web 60 above each first compartment 81) do not change in area as the first compartment inflates and deflates. This contrasts with prior art arrangements where each airbag when inflated must extend over the downwardly facing surface of the load substantially beyond its deflated footprint in order to obtain the desired displacement of the load, and so avoids the attendant problem of how to support the flaccid airbag in its deflated condition so as to prevent it from becoming entrapped between an adjacent inflated airbag and the downwardly facing surface of the load or an uneven ground surface, as well as providing more even distribution of applied forces throughout the apparatus and avoiding stress concentration at the point of attachment of the airbag to its supporting surface.

Second Compartments and Second Mode of Operation

Alternatively or additionally to the elastic tension means, the tension means may comprise a plurality of second inflatable compartments 120.

In the example shown in FIGS. 36A-40B, each of the second compartments 120 comprises at least one inflatable second bladder 121 which is arranged between a pair of the flexible walls which are arranged in proximate opposed relation in the deflated condition as shown in FIG. 38A. The inflation means is arranged to inflate and deflate the second bladder 121 and hence the second compartment 120 to induce the tension force F1 in the respective pair of flexible walls when the second bladder is inflated from a deflated (unenergised) condition (FIGS. 36A, 36B, 38A) to an inflated (energised) condition (FIGS. 37A, 37B, 38B).

Advantageously, the pair of walls 84 may be walls of the adjacent first compartments 81 as shown in FIGS. 40A and 40B, so that the second compartment 120 is arranged between the adjacent first compartments 81 which help it to fully deflate. In the illustrated example, the height dimension or vertical depth D4 of each first compartment 81 is three times its width or length in the primary and secondary dimensions D1, D2, and there are two parallel sidewalls 84 between each pair of adjacent first compartments. Each second compartment 120 is square and is bounded by seams which join together the adjacent pair of sidewalls 84 on all four sides, so that there are two horizontal seams, one above the other, dividing each pair of sidewalls of each first compartment into a vertical array of three second compartments 120.

The second bladders 121 of all three second compartments 120 are connected together in parallel via a flexible hose 122 to an additional port (not shown) in the lower surface of the respective FCM 200, similar to the port 209 to which the bladder 170 of the respective first compartment 81 is connected.

The pair of walls 84 forming the square sides of each second compartment 120 are urged apart in the inflated condition of the second bladder 121 so as to induce the tension force F1 in the respective pair of walls 84. The tension force acts to pull spaced portions 123 of the respective pair of walls, one towards another, so as to apply the tension force to a flexible wall or walls 84 of a respective one or group of the first compartments 81 when the second compartment 120 is inflated. (In the illustrated example the indicated spaced portions 123 are proximate the horizontal seams dividing the second compartments.) The spaced portions 123 in turn pull the flexible wall or walls of a respective one or group of the first compartments 81 in the base region 83 of the first layer forwardly in the direction of travel or upwardly away from the ground surface, and preferably both forwardly and upwardly, so as to produce the contraction 95 in the first fluid cushion as shown in FIG. 39.

In the illustrated example, each second compartment is square and flat so that its two walls 84 comprising two square panels of mesh 50 joined together at their edges are conterminous, flat and parallel when deflated. Since the central region of each second compartment inflates towards an ideal shape which is spherical (as shown in FIGS. 37A, 37B, and 38B), the distance between the spaced portions 123 defined by opposite sides of the second compartment 120 along a horizontal or vertical line bisecting the compartment in a fully deflated and flattened condition in the plane of the walls 84 is reduced by up to approximately one third in the fully inflated condition. (A similar dimensional ratio is achieved if the second compartment is cylindrical when inflated and rectangular when deflated, but only along the width axis of the rectangle.)

It will be understood that as long as the second bladder 121 is large enough to sufficiently expand the second compartment 120, what determines the dimensional ratio between the deflated and inflated states is the shape of the mesh walls 84 of the second compartment rather than the shape of the second bladder. Conveniently each second bladder can be square and similar in size to the second compartment, although it could be somewhat larger than the second compartment, particularly if the second compartment walls 84 are elastic and it is desired that they should relieve stress from the walls of the bladder when fully inflated. The second bladders 121 may have a narrow strip 124 around their edges with holes by which they can be attached via cable ties 66 or the like to the mesh walls.

Although in the illustrated example the walls 84 of the second compartments 120 are made from the elastic mesh 50 which acts as an elastic tension means, the second compartments 120 can be used as an alternative to the elastic tension means, in which case the flexible walls of the first and second compartments may comprise a relatively inelastic (e.g. polyester or nylon) mesh. Alternatively as shown, the second compartments may be provided in combination with the elastic tension means and used when additional tension force is required. Alternatively, if only the first mode of operation is to be used, then second compartments 120 may not be provided, in which case the first compartments may be separated by single sidewalls 84 (each preferably comprising one or more layers of elastic mesh 50), each forming a shared sidewall 84 of the two first compartments 81 which it separates, as illustrated in FIG. 26B.

Where second compartments 120 are provided, the inflation means (comprising in the illustrated examples the respective FCM 200 and central air supply unit 180) is arranged to inflate and deflate selected ones of the second compartments in a sequence so as to induce a travelling contraction 95 in the first fluid cushion. Each one or group of second compartments 120 is connected via the respective hose 122 to a respective valve subassembly (not shown) in a respective one of the FCMs, similar to the valve subassemblies which control the first and upper compartments 81 and 101, via the additional port provided in the outer case of the FCM. The valve subassembly for the second compartment could be somewhat simpler than those of the first and upper compartments, for example, providing only FILL and EXHAUST functions, or alternatively it could include BALANCE and other functions as further described below, so that the second compartments 120 could be connected, e.g. with other respective ones of the second compartments so that one inflates as the other deflates, or with adjacent first compartments 81 so that the second compartment inflates as the first compartment deflates and vice versa.

In accordance with the second, alternative mode of operation, the cushion assembly includes a tension means which is energised so as to induce a tension force F1 between respective ones of the flexible walls. The tension means pulls, by the tension force, a respective flexible wall or walls of each respective first compartment 81 in the base region 83 of the first layer, in the inflated condition of the said first compartment, forwardly in the direction of travel D3 or upwardly away from the ground surface 2. This produces a local contraction 95 in the first fluid cushion, as shown in FIG. 39. The tension means is energised to apply the tension force to the respective flexible walls of selected ones of the first compartments in a sequence, so that the contraction 95 travels through the first fluid cushion and moves the base region 83 of the first layer of the cushion assembly progressively over the ground surface 2 in the direction of travel. The sequence of operation is generally as shown in FIGS. 9, 10 and 11 and as described with reference to the first mode of operation, except that the contraction takes place without any deflated region 94.

If the second mode of operation is adopted, then the second compartments 120 may be used as the tension means, and may be inflated to a higher pressure than the adjacent first compartments 81. This can be accomplished for example by controlling the pressure supplied to each (first, upper, and/or second) compartment by respective valves of the respective FCM valve subassemblies, e.g. fixed or variable pressure limit valves or valves controlled responsive to pressure sensors. So for example, if the supply grid S is at a higher pressure than the working pressure of the first compartments and the first compartments are supplied from the supply grid S via pressure limiting valves (not shown), then the second compartment could be supplied directly at the supply grid S pressure. Alternatively, where a high pressure grid H is provided, the second compartment 120 could be supplied from that grid.

Where second compartments 120 are provided, they can be used in accordance with either of the first and second modes of operation. For example, the second mode may be used to provide more rapid movement on smoother ground. The first mode may be preferred in order to minimise stresses in the cushion assembly.

The first and second modes of operation may also be combined, by deflating each first compartment 81 and simultaneously inflating the adjacent second compartment or compartments 120 so as to maintain a substantially constant pressure in the first compartment 81 as its volume contracts. The lost volume is partially replaced by the increased volume of the second compartment 120 which draws the walls of the first compartment forwardly and/or upwardly to form the contracted region of the first fluid cushion. In this hybrid mode of operation the inflated condition of the first compartment 81 as defined herein is taken to be maintained in the sense that its fluid pressure is maintained, but at the same time, the tension force F1 is applied while the first compartment 81 is deflating in the sense that its volume is reducing although its pressure remains constant. This hybrid mode of operation is therefore construed as embodying both the first mode of operation and the second mode of operation as defined herein.

The elastic flexible walls may be used in combination with the second compartments in a hybrid (combined first and second) mode of operation in which each FCM is arranged to exhaust the respective first compartment while simultaneously inflating the second compartments on either side of it, with both the elastic flexible walls and the second compartments exerting a tension force in the plane of the flexible walls. The second compartments maintain the elastic walls, e.g. cords 51 in a strained condition so that as they inflate they apply the tension force in the inelastic regime of the elastic walls, e.g. cords 51. In this way the local contraction may pass through the first fluid cushion very rapidly and without the first compartments becoming fully deflated, so that the cushion assembly can travel more quickly over the ground surface.

The two-dimensional array comprising rows and columns of compartments means that the inflation means can be operated to deflate and re-inflate the first compartments 81 in any desired sequence so as to generate a travelling contraction 95 which moves through the first fluid cushion in any desired direction of travel, including both forwardly and backwardly in opposite directions in both the primary and secondary dimensions D1, D2 (to move the ship in the direction of its length or beam axis), in any selected direction oblique to the primary and secondary dimensions (to move the ship on a diagonal path), or in rotation about a static or moving point.

The Central Control System and Air Supply Unit

In the illustrated example, the working fluid is compressed air, and as shown in FIG. 6, the cushion assemblies are connected in use to a central air supply unit 180 and central power supply unit 185 via the main hoses 181 and main conductors 184 which are incorporated into the main hoses in a similar way to the conductors 212', 212", 212''' in the flexible hoses 211', 211", 211'''. This allows the FCMs 200 to be powered by a central generator of the power supply unit 185 and supplied with air from the surface, particularly when the cushion assembly is inflated while submerged in the sea, but also in operation on dry land. In addition, the FCMs are arranged to transfer and optionally also to pump air between respective ones of the inflating and deflating compartments so that the demand for air via the main hoses is reduced in normal operation.

In alternative embodiments it will be understood that the cushion assemblies could be substantially autonomous and so could operate without central air supply units, or alternatively the compartments of each fluid cushion could be inflated and deflated exclusively by a central air supply under central control external to the fluid cushion. Advantageously however, by combining distributed valve control and recycling of the working fluid within the fluid cushion with a central air supply external to the fluid cushion, the preferred embodiment provides efficient fluid transfer and hence faster operation while still allowing work to be done, and hence waste heat to be rejected, at the surface (central) units.

In the illustrated example as shown in FIG. 6, each central air supply unit 180 and power supply unit 185 is containerised and is temporarily mounted on the deck of the ship 1 to be moved, optionally being shared between several cushion assemblies 40 as shown, so that the ship is entirely free from external physical connections. In alternative arrangements the central air supply unit 180 and power supply unit 185 could be located on a dedicated deployment vessel or vehicle, or could form part of the fixed equipment of the ship 1 being moved. A dedicated deployment vessel could also have an additional, high volume air supply unit to supplement the illustrated central air supply units 180 during initial inflation of the cushion assembly.

Referring to FIG. 27, each central air supply unit 180 may be arranged to supply compressed air to the supply (S) grid 210' and optionally also to a separate high pressure (H) supply grid 210'" and/or also to exhaust air from the exhaust (E) grid 210". In the illustrated example this is accomplished by three interconnected high volume engine or motor driven compressors or staged blowers 186, with waste heat being rejected via heat exchangers 187 and ambient air being drawn in or exhausted as required by the momentary operational state of the three grids via check valve 188 and pressure relief valve 189.

Since the required fluid pressure in the supply network S may be only a few bar, for example, 1-4 bar, a relatively low compression ratio may be used for the compressor serving the supply grid 210'. However, where a high pressure grid 210'" is also provided, the pressure is advantageously at least about 8 bar or 10 bar so that the waste heat rejected by the heat exchangers 187 is effectively replaced later in the operational cycle by waste heat generated within the cushion assembly, e.g. by the operation of distributed air compressors in the FCMs, which is transferred to the compressed air leaving the high pressure grid 210'" as it expands and cools. In this way the high pressure grid can be used in effect to extract waste heat from the cushion assembly. Of course, the supply grid 210' could be operated in a similar way by supplying air through the main hose 181 at e.g. 10 bar which expands through a fixed or variable pressure limiting valve or valves in each FCM down to the operating pressure of each compartment. In this case the functions of the supply S and high pressure H grids, as further described below, could be combined, with only one or two grids being provided, and perhaps a single phase rather than three phase electrical power supply. (Of course, if each flexible hose had multiple conductors rather than single conductors, a redundant three phase power supply would still be possible.)

The central air supply unit 180 may supply more than one cushion assembly 40 via further main hoses 181' as shown. The central power supply unit 185 comprises 3-phase delta supply windings which are connected to the main conductors 184 of the three electrical grids 213', 213", 213'" of the respective cushion assembly as shown, although, of course, DC or other AC power supply configurations could be used instead. Each cushion assembly may be supplied by a separate set of windings so that although the compressed air supplies are shared (which may advantageously average out fluctuating supply and demand between them), the electrical supplies of each fluid cushion are separated. This makes it easier to inject control signals from the central control system 130 via signal lines 131 into the three main conductors 184, which also function to carry bidirectional data transmissions between the central controller and each individual FCM 200 over the power supply.

Referring to FIG. 28, the central control system 130 includes a processing unit or central controller 132 with a user interface comprising a keyboard 133 and screen 134 and a memory 135 in which is stored a digital map 136 of the shipyard or other environment through which the ship 1 is to be moved. The user interface and the rest of the central control system can be physically located anywhere. For example, the user interface could be located in a portable unit on the bridge of the ship 1 with a wireless transceiver to transmit the control signals to signal processing and relay units (not shown) located in the central air supply and power supply units, which may be generally under the control of the controller 132 but responsive to the momentary demand for air and power from the cushion assemblies 40.

The controller 132 generates and sends control signals to, and also receives data from, the local control unit 150 of each FCM, further described below, via signal-over-power transmission units 137 which inject and retrieve the signals via the signal lines 131 to and from each set of main conductors 184 of each of the cushion assemblies 40 on which the load 1 is supported.

The position and orientation of the ship is continuously computed and updated by a navigational or position finding system, comprising for example signal transceiver and positional data computation units 138 mounted on the ship 1 and receiving positional signals from fixed terrestrial beacons 139 and/or satellite transmitters 140, and transmitted to the controller 132, e.g. via a transceiver 141.

The controller 132 may be programmed with the desired sequence of movement of the ship 1 or may be arranged to compute an optimal course within the available envelope of space represented by the map based on its initial and final target positions, moving the ship 1 progressively through the series of positions represented in broken lines in FIG. 28. The controller 132 may then compute the optimal sequence of operation of all of the inflatable compartments of each of the cushion assemblies 40 supporting the ship to move the ship over the planned course. The controller then implements the planned sequence by sending control signals to each of the FCMs in each cushion assembly. The signal-over-power transmission protocol is selected as known in the art to provide reliable transmission, e.g. by selecting appropriate data packet processing routines, anti-collision routines, appropriate transmission rates, perhaps identifying each data packet by a unique sequential identifier, and/or other means as known in the art to provide reliable bidirectional data communications between the FCMs and central controller via multiple signal pathways through the electrical grids.

In the illustrated example, the ship 1 is moved forwards and then in rotation to clear fixed obstructions (e.g. other ships) in the shipyard before being moved backwards to its final position where repair work is to be carried out. FIGS. 29A-29D show four sequential stages in the sequence of operation of the first compartments when moving the ship in rotation in the reverse direction towards its final position.

The controller 132 identifies an optimal, static or moving point 142 about which the ship is to rotate, and computes a radius line 143 extending from that point which is swept through the array of first compartments from one end of the ship to the other in the direction of travel D3. The front of the travelling contraction 95 is generated at the line 143 and moves with the line through the first fluid cushions, either as a single wave front which travels sequentially through each of them in turn or as a set of separate wave fronts which travel through each fluid cushion, the wave fronts of different fluid cushions being synchronised or alternatively asynchronous. By repeating the sequence, either maintaining the point 142 in a fixed position or moving it progressively with each operation, the ship 1 is gradually moved in the direction of travel D3 as shown in FIG. 29E.

In the illustrated example the point 142 is outside the envelope of the fluid cushions, so that the contraction 95 always sweeps all the way through each fluid cushion between its outer sides, i.e. from one of its ends or pairs of ends 43, 44 to the other. However, if it is necessary to move the ship in rotation with as little translation as possible, then the point 142 could be located inside the footprint of one of the fluid cushions. In this case the point 142 will be at the focus of a circle which is tangent to the nearest outer wall (at a respective end 43 or 44) of the respective cushion assembly. First compartments 81 outside this circle will experience movement beginning at the outermost compartments which are free to contract, whereas first compartments 81 inside the circle will experience less movement. However, all of the first compartments 81 may be deflated and inflated in sequence as described above, so that internal torsional stresses are relieved as the ship slowly rotates about the point 142.

First FCM Valve Assembly

Each flow control module (FCM) includes a respective valve assembly which is arranged to control a flow of compressed air or other fluid to and from a respective one or group of the inflatable compartments, and a local electrical control system embodied in the local control unit 150 which communicates with the central controller 132 and optionally also with the local electrical control systems of the other FCMs.

Conveniently, each FCM controls the inflation and deflation of all the bladders in the group located vertically above and below the FCM. If second compartments 120 are provided in the sidewalls 84 of the respective first compartment then each FCM controls the second compartments in two of those sidewalls, one extending in the primary dimension D1 and the other in the secondary dimension D2. (The FCM at the middle or end of a row or column can control the second compartments in both sidewalls of a respective dimension.) The valve assembly of each FCM is individually controlled via the local control unit 150 by signals from the central controller 132 to selectively inflate and deflate each of the inflatable compartments in that group.

The flexible hoses of each grid 210', 210", 210''' define for each FCM 200 a plurality of different flow paths through which the fluid flowing to a respective inflatable compartment via the respective FCM may travel. Compressed air in each of the three grids may thus flow through all of the flexible hoses of the grid simultaneously from regions of higher pressure to regions of lower pressure. Advantageously, the valve assemblies can be operated to direct the fluid to flow via the exhaust E and supply S networks of flexible hoses from respective deflating ones of the inflatable compartments to respective inflating ones of the inflatable compartments, so that work is reduced, flow paths are shortened and operation is faster and more energy efficient.

Advantageously, by arranging the FCMs as shown to form fluid nodes (i.e. fluid interconnection points) in each grid 210', 210", 210''', it is possible to control the FCMs so as to isolate a failed hose or another, failed FCM from the rest of the grid. For this purpose, preferably each FCM includes a plurality of isolation valves, each isolation valve being selectively operable to isolate or restrict the flow of fluid via a respective one of the flexible hoses 211', 211", 211'''.

FIGS. 30-30(c) show a first valve assembly, which comprises the compressed air fluid flow components of one FCM for controlling two inflatable compartments, e.g. a first compartment 81 and an upper compartment 101 connected to the FCM via ports 209. For ease of reference the inflatable compartments are indicated respectively as C. It should be noted that all of the content of FIG. 30 can be seen more clearly in one or more of FIGS. 30(a), 30(b) and 30(c).

In this example, each isolation valve is a poppet valve 231 controlled by a pilot air supply from a detented, 2-position spool valve 232, the spool valve being controlled in turn by respective solenoids 233. In a normal, open position corresponding to spool valve position P1, the poppet valve 231 permits bidirectional flow between the respective flexible hose 211', 211", or 211''' connected to the respective port 205 and an internal manifold 234 which forms the local fluid interconnection between all four flexible hoses of that respective grid 210', 210", or 210'''. When the solenoid of the respective spool valve 232 is commanded by the local controller 152 to move the spool valve to position P2, the poppet valve 231 closes to isolate that respective end of the flexible hose from the manifold 234 and hence (if the corresponding isolation valve in the FCM at the other end of the hose is also closed) from the respective grid. The momentary, intermediate position of the spool valve is indicated as P0.

Since various different pressures exist within the various compartments and fluid networks, it may be preferred to select the highest and lowest of those pressures available at each FCM for use as pilot air supplies to the various spool valves. This is accomplished via check valves 235 which exhaust air from a low pressure pilot manifold 236, indicated for ease of reference as LO, to each available pressure point, and check valves 237 which supply air from each available pressure point to a high pressure pilot manifold 238, indicated for ease of reference as HI.

Each compartment C is supplied with compressed air from the supply manifold 234 of the supply network S via a supply poppet valve 240, and exhausted via another, exhaust poppet valve 241 to the exhaust manifold 234 of the exhaust network E. The supply poppet valve 240 is arranged to selectively permit both unidirectional flow into the respective compartment and bidirectional flow in and out of the respective compartment, while the exhaust poppet valve 241 permits only unidirectional flow out of the respective compartment.

The two poppet valves 240, 241 of each compartment C are controlled by pilot pressure from a three position, detented spool valve 242 controlled by the local controller 152 via respective solenoids 233. The spool valve 242 is moveable between a first position P3, a second position P4, and a third position P5, via momentary intermediate positions indicated by P0, which provide four functions which are referred to hereinafter as BALANCE, FILL, STOP and EXHAUST. The functions are defined as follows:

BALANCE provides bidirectional flow in and out of the compartment. By fluidly connecting together a selected group of two or more compartments using the BALANCE function, the pressures in each of the selected compartments can be equalised. This is useful for example to fill an empty, inflating compartment from a full, deflating compartment, or to equalise pressures between different fluid cushions or across a fluid cushion, e.g. across the upper compartments of the upper fluid cushion so as to adjust the position of the load or during initial deployment, or across the first compartments of the first fluid cushion at the end of an operational cycle, or even to equalise pressures between respective fluid cushions of different cushion assemblies fed from the same central air supply unit or otherwise connected together via main hoses 181, which could optionally provide interconnections between all of the cushion assemblies supporting the load.

STOP prevents air from entering or leaving the compartment, and can be used for example to isolate a compartment while other compartments are on BALANCE.

FILL is a check valve function providing unidirectional flow into the compartment to maintain the compartment at not less than the supply pressure or, optionally, a lower pressure selected by a fixed or variable pressure limit valve.

EXHAUST permits unidirectional flow out of the compartment into the exhaust network E or to an outlet to ambient.

In the illustrated example, the STOP function is implemented by the second position P4 of the spool valve 242, wherein both poppet valves 240, 241 are closed so that no air can enter or leave the compartment.

The EXHAUST function is implemented by the third position P5 of the spool valve 242, wherein the supply poppet valve 240 is closed but the exhaust poppet valve 241 can open under a slight positive pressure inside the compartment relative to the pressure in the manifold 234 of the exhaust network E. Since the spool valve 242 is detented it can be left in this position after the electrical supply has been disconnected so that any remaining air inside the compartment will be exhausted as the cushion assembly is wound back onto the spool 22 after use.

The first position P3 of the spool valve 242 implements both the BALANCE and FILL functions, depending on the position of a second, two-position detented spool valve 243 which is also controlled by the local controller 152 via two respective solenoids 233.

In position P3 of spool valve 242, the exhaust poppet valve 241 is closed, but the position of the supply poppet valve 240 depends on the position of spool valve 243 which is moveable between position P6 and position P7 via a momentary intermediate position P0. In position P6 the supply poppet valve 240 is open so that bidirectional flow is possible, corresponding to the BALANCE function.

In position P7 the supply poppet valve 240 is controlled by pilot pressure from a third, pressure limiting spool valve 244, which closes poppet valve 240 when the pressure in the respective compartment C exceeds the set limit pressure, and permits it to open when the pressure in the compartment is below the set limit pressure and there is a positive pressure from the manifold 234 of the supply network S. Rather than a set limit pressure as shown, the limit pressure could be variable under the control of the local controller 152 and/or the central controller 132. This could be useful for example to vary the inflation pressure of any of the compartments to compensate for the depth of a submerged cushion assembly during deployment, or to suit the load.

Those skilled in the art will appreciate that the valve functions could alternatively be implemented by many other valve systems as known in the art. For example, high flow rate spool valves could be used instead of poppet valves.

Each FCM may also include a pump for pumping the fluid between the respective inflatable compartments and the central air supply unit or an ambient air inlet or outlet and/or from respective deflating ones of the inflatable compartments to respective inflating ones of the inflatable compartments, conveniently by pumping the fluid from the exhaust E network to the supply S network. In this specification a pump is construed as any means for urging a flow of fluid from an inlet to an outlet. Where the working fluid is air or another gas the pump may be for example a compressor or a jet pump or a blower, for example, a blower comprising multiple stages to achieve the required outlet pressure.

In the example of FIGS. 30-30(c), the FCM 200 includes a local, multi-stage blower or compressor 250 arranged between the exhaust E and supply S manifolds and driven by a motor 251 controlled by the local controller 152 and/or by inlet and outlet pressure sensing lines 252 (which are the only electrical connections indicated in FIGS. 30-30(c)). A pressure limit valve 253 may also be provided if necessary to limit the intake pressure so as to prevent damage to a compressor with a fixed compression ratio by fluctuating pressure at the inlet. Alternatively, the compressor 250 could be arranged to discharge when the compressed gas pressure inside the compressor rises above the pressure at the outlet, so that the compression ratio may vary with the inlet pressure. In a piston compressor this can be accomplished without special additional measures by the check valve 254 typically arranged at the outlet from the chamber. In a vane type compressor it could be accomplished by arranging each vane to act as a check valve, e.g. by pivoting away from the casing, or alternatively by providing each vane with a check valve, so that air compressed within each compartment defined between adjacent vanes is able to flow via the check valve to the next compartment and so to the outlet when the pressure in the compartment rises above the pressure at the outlet. In other types of compressor a similar arrangement could be provided by check valves arranged in the moving parts or in the casing. Since any number of the local compressors can be operated simultaneously to pump compressed air from the exhaust network E to the supply network S, each one may be a small, compact unit consuming only a few kW or even less than 1 kW of power.

Alternatively or additionally to a compressor or blower, the FCM may include a jet pump 255 or similar device comprising a high pressure nozzle 256 which acts as a flow restrictor 256' through which a flow of high pressure air from the high pressure network H passes through a Venturi 257 to generate suction pressure which sucks air from the manifold 234 of the exhaust network E via check valve 258. If the exhaust network E is momentarily at a higher pressure than the supply network S then the pressures are balanced by flow through the check valve 258, which can be provided between the two respective manifolds 234 even if the jet pump is not included.

In the illustrated example the air exhausted from the jet pump flows through a heat exchanger 259 to extract waste heat from the compressor motor 251 before entering the supply S manifold 234 via flowpath 260. In alternative embodiments the expanding air from the supply S or high pressure H network could be used without a jet pump to cool the local compressor.

In alternative embodiments, the FCMs could be connected together by only the first network of first flexible hoses, or by only the first and second networks, in which case the body of each FCM may have fewer sockets, and the valve assembly will be suitably adapted to provide the required functions. For example, if only the supply S and exhaust E networks are provided, then operation may be substantially as described for the illustrated embodiment, except that the high pressure supply H is not provided. If only one network is provided, then a deflating first compartment could still supply air to other inflating first compartments via the first network using the BALANCE function, and could be fully exhausted to ambient via an open port (preferably protected by a check valve against ingress of water) opening through the outer casing of each FCM. Alternatively, if each FCM is provided with a pump, e.g. a compressor, then the respective first compartment could be alternately supplied from the first network and exhausted to the first network by running the pump to pump the air or other working fluid in or out of the first compartment in either or both directions. The valve assembly could then be a relatively simple arrangement for directing the airflow through the pump, respectively from the first network to the first compartment, and vice versa, with check valves arranged in parallel with the pump to permit flow in the desired direction whenever a favourable pressure differential is present. Alternatively the first network could be maintained at supply pressure and each first compartment supplied via a valve from the first network and exhausted via the pump to the first network and/or via a valve to ambient. Similar arrangements can be provided for the second compartments and upper compartments. Of course, more than three networks of flexible hoses could be provided.

The Local Control Unit

Referring to FIG. 35, in the example shown, the local electrical control unit 150 of each FCM 200 includes a processor or local controller 152, a plurality of pressure and/or flow sensors 151, and valve position sensors 153 which indicate the operational state of each of the valves.

The flow sensors 151 are arranged to sense the fluid flow and pressure at various points including for example the ambient pressure outside the casing of the FCM, the pressure within each compartment C and at each of the manifolds 234 and the flow rate via each respective one of the flexible hoses 211', 211", 211'". The central and/or local controllers 132, 152 may be arranged to control the isolation valves 231 of each flexible hose, for example, responsive to signals from the flow sensors 151 indicating abnormal pressure or flow rate compared with the other adjacent hoses of the same grid, or responsive to signals from the flow sensors 151 of two adjacent FCMs indicating a difference in the flow rate at respective opposite ends of the same hose representative of a burst or leak.

In the illustrated example there is a single electrical conductor 212', 212", 212'" in each flexible hose, so that the three fluid networks S, E and H incorporate three electrical grids 213', 213", 213'" which can be used to supply 3-phase delta power to the compressors in the FCMs. Each of these electrical grids acts as a separate, redundant pathway for control signals which are sent over the power lines to control the operation of each FCM, and for data communications from each FCM indicating its status to the central controller 132. Of course, the grids could alternatively be used for different signal paths, e.g. by dividing the FCMs of each module between the three grids so as to reduce the volume of data traffic in each grid. Each signal pathway can be selectively interrupted at the respective transmission unit 137 and/or the local signal processing unit 162 of the FCM if there is a fault in one of the three electrical grids. Each compressor can also be arranged (e.g. by switching the configuration of its motor windings) to run on less than three grids if there is a fault in one of the grids.

Since each FCM also forms an electrical node (i.e. an electrical interconnection point) in each of the power grids 213', 213", 213'", a local electrical fault may be isolated by opening respective circuit breakers 154 which connect each of the conductors 212', 212", 212'" to a local electrical bus 155 which forms the local interconnection of the respective grid 213', 213", or 213'". Each circuit breaker is operated by the local controller 152 responsive to an abnormal current reading at a respective sensor 156. Of course, this function could also be carried out independently of the local controller 152 in the manner of a conventional overcurrent or residual current circuit breaker.

The three electrical buses 155 supply power to a local relay or switching unit 157 which is controlled by the local controller 152 to switch the electrical loads of the FCM including the valve solenoids 233 or valve control motor or motors 281 (further described below with reference to the alternative valve assemblies) and compressor motor 251. Where a valve control motor 281 is provided, a position sensor 158 may also be provided to sense the position of the valve control plate 282 or valve control rotor 283.

The local control unit 150 may also include a local energy storage device such as a supercapacitor or battery 159, additional sensors (not shown) for sensing charge state, temperature and other parameters, and a local memory 160 for storing commands from the central controller 132 and data from all the sensors. The unique identity data 161 of the FCM can be stored e.g. in an erasable ROM so that a failed FCM can be replaced with a new one programmed with the same identity. Usefully, the identity can comprise a row and column number which is also written on the casing of the FCM and on the upper wall 105 and base wall 85 of the upper and first compartments controlled by that FCM for ease of maintenance. Command signals and data from the various sensors of the FCM are transmitted bidirectionally between the local controller 152 and the central controller 132 over the electrical grids 213', 213", 213'" via the local signal processing unit 162 which is interfaced with the electrical buses 155, so that data indicating a failure can be stored and output via the user interface of the central control system so that the failed FCM can be swapped out at the next opportunity.

Instead of controlling each local control unit in real time, the central controller could be arranged to program all of the local control units with a predefined sequence of operations, so that each local control unit then executes its programmed operations at the correct point in the sequence. A clock signal sent from the central control unit, or generated independently by each local control unit, could be used to trigger each sequential operation in the sequence so that for example, a first group of FCMs operate at T+1, a second group at T+2, etc. Alternatively the central control unit could command each group of FCMs with a single command signal which all the members of the group are programmed to recognise. Alternatively each operation could be triggered by a completion signal from the local control units of the previous group in the sequence. The central control unit could command a first cycle in which all the local control units operate in sequence to generate the travelling contraction or waveform through the fluid cushion. On successful completion, the central control unit could command a second identical cycle, or could reprogram all the local control units with another sequence so as to change the direction of travel. The sequence of operations in each FCM (e.g. managing air pressures and coordinating the actions of the first and second compartments) could be performed autonomously by the local control unit.

Kill Valve

Each FCM may also include a kill valve (not shown) which is operable independently of the other valves in the FCM, preferably by a separate kill valve control unit (not shown) which is controlled by separate hardware and software and programmed with a separate identity from the identity 161 of the principal local control unit 150, and controlled by the central controller 132 over the same electrical grid or grids or alternatively over a separate one of the electrical grids from that over which it communicates with the principal local control unit 150. The kill valve comprises an exhaust valve, optionally in series with one or more check valves. Each of the bladders or compartments controlled by the respective FCM is fluidly connected via a respective check valve to the kill valve, each check valve permitting flow outwardly from the respective compartment via the kill valve to an exhaust outlet which preferably opens to ambient via the outer casing of the FCM, and/or may discharge to the exhaust network E. When the kill valve is closed the rest of the valves of the respective FCM function normally. When the kill valve is actuated, all of the compartments may deflate via the kill valve to ambient. The kill valve may be actuated individually to override the operation of a faulty FCM. By actuating all of the kill valves after the cushion assembly is finished with, the kill valves can also provide rapid deflation of all the compartments as the cushion assembly is wound back onto the spool. For this purpose the kill valve may comprise for example a poppet valve controlled by a detented spool valve which remains in the kill (open or deflation) position when moved to that position by the dedicated kill valve control unit, even when the power supply is disconnected. A battery may be provided to operate the spool valve in the event that the power supply is disabled. The kill valve control unit could also be radio controlled in addition or alternatively to being controlled by signals over the power supply via the electrical grid. If an FCM malfunctions, the compartments can be deflated by operating the kill valve, and the electrical and/or fluid supply lines isolated by closing the respective isolation valves and circuit breakers in the neighbouring FCMs to which it is connected. These routines could be performed either by the central control unit or by the local control unit or kill valve control unit responsive to sensor input corresponding to a preprogrammed fault condition. A report is generated by the central controller so that the faulty FCM can be identified and replaced at the next opportunity.

Alternatively or additionally, each FCM may also include an emergency default valve which is operable to prevent deflation of the first and upper compartments to maintain the cushion assembly in an inflated condition to support the load. The emergency default valve could be operable for example by an emergency activation signal sent wirelessly or through any one of the grids to the local control unit or a separate emergency control unit in the FCM, or automatically by the local control unit or emergency control unit in the event that a predefined signal cancelling emergency activation is not received after a predefined interval.

Alternative Valve Assemblies

It will be understood that the first valve assembly shown in FIGS. 30-30(*c*) includes a lot of functionality, purely by way of example. The valve assembly of each FCM could alternatively be much simpler.

FIGS. 31A-31E illustrate schematically an alternative valve assembly comprising a valve control element, in this example a flat valve control plate 282, defining cam surfaces which engage cam followers 284 which operate spring loaded check valves 285 via levers 286 mounted on pivots 287. The valve plate 282 is driven reciprocally by valve motor 281 with a position sensor 158 feeding its position back to the local controller 152. As shown in FIG. 31E, the motor may comprise windings 288 and a rotor 289 which is free to turn through nearly a full rotation before engaging an abutment surface on the threaded spindle 290 which drives the plate, so that an initial impact can help to move each cam follower from its rest position. The cam followers move the three check valves to effect the four valve functions: BALANCE (FIG. 31A); FILL (FIG. 31B), which in this example does not have a pressure limiting function; STOP (FIG. 31C); and EXHAUST (FIG. 31D). By arranging the valve control element within a compartment 291 through which air can flow between the three check valves, all four functions are accomplished in a very simple mechanism with few moving parts and few fluid seals.

FIG. 32 shows schematically another alternative valve assembly which like the previous example also employs cam followers 284 operating spring loaded check valves 285, 285', 285" via levers 286 mounted on pivots 287. In this case the cam surfaces are formed on cam plates 292 which are stacked to form a valve control rotor 283 driven in rotation about axle 293 by a valve control motor 281, with a position sensor (not shown) feeding back its position to the local controller 152. Each cam follower engages its own cam plate, although they could be angularly separated around the axle and share cam plates if the cam profiles allow.

Again, the valve control rotor 283 is arranged within a compartment 291 which fluidly communicates with four of the five check valves that it controls. Only one of the check valves 285' controlled by the valve control rotor has a sliding fluid seal 294 around its control rod 295 to fluidly seal the valve element from the compartment 291.

In this example there are two identical valve assemblies 296, 297, each comprising a respective said compartment 291 containing a respective said valve control rotor 283 and a set of five respective said check valves 285, 285', 285". The reference numerals are only included in one of them to avoid cluttering the drawing.

The two valve assemblies are arranged to control the flow of compressed air to and from two compartments C connected to the respective ports 209 of the FCM, with compressed air being supplied from a supply network S and exhausted to an exhaust network E or ambient exhaust outlet. The check valves 285 of each of the valve assemblies control a respective one of the compartments C providing BALANCE, FILL, STOP and EXHAUST functions as previously described.

In addition, each valve assembly 296, 297 controls the supply of compressed air from the supply manifold 298 to the respective supply valve 285 of the other valve assembly, and also provides a special additional EXHAUST function for the compartment C controlled by the other valve assembly. In this manner, in the event that one of the two valve assemblies 296, 297 should malfunction, the other one can be used to interrupt the supply of compressed air to the failed valve assembly and exhaust the compartment C controlled by it. This is accomplished as follows by the additional check valves 258', 258" of each valve assembly.

The check valve 285' of each valve assembly 296, 297 has the following two functions:—

NORMAL—in normal operation, it supplies compressed air from the supply manifold 298 to the respective supply valve 258 of the other valve assembly.

NO FILL—in the event that the other valve assembly malfunctions, it interrupts the supply of compressed air to the respective supply valve 258 of the other valve assembly.

The check valve 258" of each valve assembly 296, 297 places the compartment 291 of that valve assembly in communication with the compartment C of the other respective valve assembly via a respective check valve 299 which permits unidirectional flow from the respective compartment C to the respective compartment 291. In normal operation, the check valve 258" is closed, but in the event of a malfunction of the other respective valve assembly 296 or 297 it can be opened to provide a special EXHAUST function to the compartment C normally controlled by that other respective valve assembly.

This special EXHAUST function depends on the operational state of the other valves 258, particularly the exhaust valve 258 of the functional valve assembly. If the functional valve assembly is in the state EXHAUST so that its exhaust valve 258 is open, the compartment C of the failed valve assembly will be exhausted via check valve 299 to the exhaust network or ambient exhaust outlet E. If the functional valve assembly is in the state STOP with its exhaust valve 258 closed, then the compartment C of the failed valve assembly will be able to exhaust via the supply valve of the functional valve assembly but only down to the pressure of the supply network S or the other compartment C.

FIG. 34 shows how for each valve assembly 296 or 297 the functional states of its three check valves 258, represented by the inner circle, can be combined with the functional states of its two special check valves 258' and 258", represented by the outer circle. EXHAUST is abbreviated EXH and BALANCE is abbreviated BAL. Available functional combinations are indicated by radially aligned groups. Rotation of the valve control rotor 283 causes a rotational transition from each functional state to the next as shown. Bidirectional rotation of the valve control rotor 283 advantageously provides functional transitions which do not pass through undesired functional states.

The example of FIG. 32 also provides an alternative arrangement for isolating individual flexible hoses forming the supply network S, 210'. Each of the four ports 205 is fluidly connected to the supply manifold 298 via a respective spring balanced check valve 300 which is arranged to close when the flow rate or pressure gradient across the valve element exceeds the spring bias force. A small leakage path 301 is provided across each valve element so that in the event that a healthy hose becomes isolated at each end, the valves will open when the pressure has gradually balanced out across them.

Turbine Driven Pump

Advantageously, where each FCM includes a pump, the pump may be driven by a turbine. The pump may be a compressor, preferably a high speed, e.g. centrifugal compressor driven by a high speed turbine, preferably driven by pressurised fluid from a source external to the cushion assembly. The compressor and turbine may be mounted on a common shaft. A commercially available automotive turbocharger may be adapted for this purpose. Optionally, a bypass valve (not shown) may be arranged in the manner of the wastegate of an automotive turbocharger to regulate its operation.

Further advantageously, the cushion assembly may include a third network of third flexible hoses which connect together the flow control modules and conduct the fluid from a pressurised fluid source external to the cushion assembly to drive the turbine. Further advantageously, the fluid may be compressed air which is delivered from a powerful compressor via the third network comprising a high pressure grid H and discharged from the turbine into the supply grid S, with the compressor being arranged to pump the air discharged from the deflating compartments from the exhaust grid E into the supply grid S.

Instead of a turbine driven compressor, each FCM may include a pump comprising a high speed, e.g. centrifugal compressor driven by a high speed electric motor, in the manner of an automotive supercharger.

In the example of FIGS. 45 and 46, the FCMs 200, 420 are connected by an exhaust grid (E) 210", supply grid (S) 210', and high pressure grid (H) 210''' generally as shown in FIG. 27, of which only the supply grid 210' is shown in FIG. 46. The high pressure grid H is supplied with high pressure compressed air (e.g. at about 10 bar, 15 bar or even more) from a compressor 186 in a central air supply unit 180, arranged for example in an amphibious support vehicle or on the ship's deck, as shown in FIG. 27. The exhaust and supply grid S may, but need not, also be connected to the central air supply unit 180. Any or all of the three grids may be connected to the central power supply unit 185 and/or the central control system 130 via electrical connections as shown in FIG. 27, which of course may be relatively low voltage if they are only required to carry power and control signals to the valve assemblies.

Each FCM includes a pump 500 resembling a turbocharger, comprising a high speed rotor which includes a centrifugal compressor 501 directly coupled to a turbine 502 on a common shaft 503. The turbine may have one stage or several sequential stages so that as high pressure air flows via the turbine from the high pressure grid H to the supply grid S it is progressively expanded to convert its energy into shaft power which drives the compressor to extract air from the exhaust grid E and deliver it to the supply grid S.

The high pressure air is cooled to ambient temperature by the heat exchanger 187 before being fed into the high pressure grid so that it acts as a coolant as it expands. The surplus air flowing from the high pressure grid H into the supply grid S is exhausted to ambient via pressure relief valves 510 incorporated into the T junctions 183 which join the ends of the flexible hoses 211' of the supply grid S to the header 182 along each side of the cushion assembly. The pressure relief valves limit the pressure in the supply grid S to a pressure equal to or higher than the highest working pressure of the bladders but lower than that of the high pressure grid H. Non-return valves (not shown) may be incorporated in a similar way into the headers 182 of the exhaust grid E so that any positive air pressure in the exhaust grid may discharge to ambient.

Optionally, the rotor may include a high speed electric motor 504 for driving the shaft in rotation, the motor being powered as in the previously described embodiments by a high voltage, 3-phase AC power supply 185 via electrical conductors incorporated into the three grids E, S and H. In this case the turbine may be omitted, or may be arranged to deliver less shaft power than the compressor requires to run at the same speed, with the electric motor supplying the balance of the power required to turn the shaft at its operating speed. As in the previously described embodiments, the expanding high pressure air acts as a coolant which absorbs the waste heat from the motor. The excess air discharged via the turbine into the supply grid S is discharged to ambient via the pressure relief valves 510.

If the rotor is driven exclusively by the shaft power generated by the turbine 502 then the electric motor 504 may be omitted or even replaced by a generator for powering the electrical components of the FCM, in which case the FCMs could be controlled wirelessly via radio signals.

Intermediate Layers

Referring to FIGS. 41A and 41B, in a development, particularly where an array of cushion assemblies 40 are used to move a very long ship 1 over a ground surface 2 with significant topographic variation, the flexible walls may be arranged to define a lower intermediate layer 190 of lower intermediate inflatable compartments above the first layer 80, and one or more upper intermediate layers 191, 192, 193 of upper intermediate inflatable compartments above the lower intermediate layer 190. Preferably an upper layer 100 of upper inflatable compartments 101 is also provided and a flexible web 60 is arranged between the uppermost, upper intermediate layer 193 and the upper layer 100, so that the sidewalls of the upper intermediate inflatable compartments of the uppermost upper intermediate layer extend downwardly from the flexible web 60 which forms the upper walls of those compartments.

An upper extension layer (not shown) can also be provided between the flexible web and the upper layer. Alternatively an upper extension layer may be arranged immediately below the flexible web and above the upper intermediate layers, or two upper extension layers may be arranged respectively, immediately above and below the flexible web.

In the illustrated example the individual inflatable compartments of the additional layers are not shown. However, the details of the additional layers 190, 191, 192, 193, and of the first and upper layers 80, 100, the upper extension layer (not shown) and the flexible web 60 and other features are generally as described and illustrated in the other examples, with each of the layers comprising a plurality of compartments which are coextensive in plan, each compartment having preferably mesh, advantageously elastic mesh 50 sidewalls and upper and lower walls enclosing an inflatable bladder. However, the sidewalls 84 of the first inflatable compartments forming the first layer extend downwardly from the lower surface of the lower intermediate layer 190, which may be for example either an elastic mesh or a relatively inelastic mesh, rather than from the flexible web 60 as in the earlier described examples. Each of the additional bladders is inflated by an additional valve sub-assembly (not shown) in the respective FCM 200 which controls all the compartments in that vertical stack, i.e. one bladder in each layer of the cushion assembly, similar to the valve sub-assemblies described above which control the first and upper compartments C. The additional valve sub-assembly is coupled to the respective additional bladder via a respective flexible hose and an additional port 209 in the casing of the respective FCM and may have any or all of the functionality of the other valve sub-assemblies, including FILL, STOP, BALANCE and EXHAUST functions as required. The flexible hoses may be arranged spirally around the compartments so that they coil without kinking as the layers collapse.

In use, each of the upper intermediate layers 191, 192, 193 is either fully inflated to form a rigid upper intermediate fluid cushion, or fully deflated so that its walls are compressed between the rigid fluid cushions above and below it. The lower intermediate compartments of the lower intermediate layer 190 are maintained in a fully inflated condition, so that the lower intermediate layer 190 forms a rigid, lower intermediate fluid cushion. The fluid pressure which maintains in an extended condition the lower surface of the lower intermediate fluid cushion (defining the upper walls of the first compartments 81) serves to react the tension force F1 in the sidewalls 84 of the first compartments as the contraction 95 travels through the first fluid cushion 82, and particularly as it approaches the leading wall of the first fluid cushion.

All the layers of the cushion assembly can be inflated to support the load on a horizontal ground surface. When a respective one of the cushion assemblies supporting the load moves over a high spot on the ground surface 2, one or more of its upper intermediate fluid cushions can be fully deflated. The lower surface of the upper layer 100 (comprising the flexible web 60) or of the lowermost inflated one of the upper intermediate layers 191, 192, 193 will then rest on the upper surface of the inflated lower intermediate layer 190, with any fully deflated upper intermediate layers lying compressed between these two surfaces. In this way the lower intermediate fluid cushion is frictionally engaged with the fully inflated layer above it so it cannot move horizontally relative to the flexible web 60. This means that the first layer 80 can be operated in the same way as in the other examples, with the tension force F1 induced by the elastic tension means 50 or second compartments 120 causing the travelling contraction 95 to move in the desired direction of travel D3, while its height has been raised relative to the ground surface 2 and relative to that of the adjacent fluid cushions to bring the ground surface within the range of upward and forward motion of its first compartments 81.

A plurality of upper intermediate layers can be provided, either all the same height or different heights, the height of each layer being selected so that they can be inflated in combination to elevate the first layer to any required height. At least one of the upper intermediate layers is preferably not more than about 50%, more preferably not more than about 30% of the height of the first layer.

For example, if the first layer 80 is 3 m high, there could be four upper intermediate layers, respectively 1 m, 2 m, 4 m, and 8 m high, so that by deflating and inflating them in selected combinations, the first layer 80 could be raised in increments of 1 m through a total range of 15 m to accommodate a maximum deviation of 15 m at any one point on the ground surface 2 from a flat plane following the average slope of the ground surface over the total length of the ship 1, wherein each of the upper intermediate layers is always either fully inflated or fully deflated irrespective of the incremental position. In this case the first layer 80 need only be deep enough to accommodate variations in ground surface level over the length of that individual cushion assembly 40 in its longest dimension D2 (assuming that omnidirectional movement is required). This makes it possible to use relatively shorter first compartments 81, which provide a smaller upward movement of the base surface 86 of the first fluid cushion but can be operated more quickly because of the smaller volume of fluid that needs to be moved.

Alternatively, rather than inflating all of the intermediate layers 190, 191, 192, 193, they could all be deflated by default and then selectively inflated as the cushion assembly 40 passes over a low spot on the ground surface. The intermediate compartments could also be operated to maintain the load 1 at a constant attitude relative to the ground surface 2. When moving a ship between water and land, their buoyancy can be exploited to adjust the angle of the ship to the slope angle of the submerged ground surface.

The FCMs may be arranged to reduce the pressure in some or all of the compartments of the upper layer as the deflated region of the first fluid cushion passes under them, so that the pressure in the unsupported upper compartments does not cause the flexible web to bulge downwards from its nominal horizontal plane, while the or each upper extension layer remains permanently inflated in the use position so that as the deflated region passes through the first fluid cushion it maintains the flexible web in its horizontally extended condition. The pressure in the upper compartments is increased again as the first compartments beneath are re-inflated.

Alternatively or additionally, the first compartments may be deflated and re-inflated along a curved or discontinuous wave front rather than a continuous, straight wave front. For example, the wave front may commence in the middle of the row or column of first compartments at the trailing edge of the cushion assembly as the central, leading portion of a curved wave front which progressively moves out to deflate the compartments at the outer sides as it moves in the direction of travel. Alternatively, the deflated region may commence and pass through the first fluid cushion as several discontinuous wavefronts, optionally overlapping but time sequenced, which are spaced apart (optionally with overlap) in the direction transverse to the direction of travel. In either case, there are always some inflated compartments left to support the upper layer at the trailing and leading ends of the cushion assembly as the deflated region passes through the first fluid cushion beneath it.

Optionally, the intermediate layers and/or upper extension layer(s) and/or upper layer could have relatively inelastic compartment walls, with elastic compartment walls being provided only or at least for the first layer.

Summary

In summary, in accordance with a preferred embodiment, a ship or other large and heavy load may be supported on a fluid cushion comprising a two dimensional array of airbags constrained within elastic mesh compartments and inflated by individual valve assemblies connected by a grid of airlines and distributed over a flexible web which separates respective horizontal layers of the assembly, the ship resting on an upper layer while the compartments of a lower layer are inflated and deflated in sequence to generate a travelling contraction which moves through the fluid cushion to translate its base surface over the ground in any desired direction of travel, with the load gradually moving by fluid pressure in the same direction of travel. The deflated cushion assembly can be stored and deployed on a spool rotated by a hydraulic motor.

The compartmentalised elastic mesh structure distributes stresses throughout the assembly, avoiding local stress concentrations, and facilitates repair and maintenance, e.g. by laying out the cushion assembly on a warehouse floor and inflating the group of compartments surrounding the affected region which is left deflated. Failed airbags or FCMs can then easily be removed and replaced by removing the upper or lower wall of the affected group of vertically aligned compartments. Structural damage can be repaired simply by removing the airbags from the affected compartments, cutting out the mesh panels, fixing new mesh panels by tying or clamping and then replacing the removed components.

The cushion assembly can be used for moving ships and other heavy loads e.g. within shipyards, allowing the shipyard to be extended inland from a single ramp or slipway into deep water, or even to move ships or other heavy loads for longer distances over land from one body of water to another.

The novel cushion assembly can be used to move any large and heavy load, particularly where the load has a hull or other extensive downwardly facing structural surface which distributes its mass over a large surface area. For this reason the apparatus is particularly suitable for moving buoyant bodies such as ships, boats, barges, submarines and the like. Of course, the apparatus could be used for moving any load if the load is arranged on a suitable supporting structure such as a barge.

Alternative Embodiments

In alternative embodiments it is possible to rely on the compressive action of the inflated compartments instead of a tension force to move the compartment walls in the direction of travel, as known in the art. However, this is less preferred since the force applied by inflation is omnidirectional and so will tend to engage the compartment walls against the ground surface as the compartment inflates so that the intended forward motion is impeded, resulting in unreliable operation particularly on uneven ground.

Preferably in the inflated rest condition the first compartments are contiguous or have only the deflated second compartments interposed between them. In less preferred embodiments the sidewalls of adjacent first compartments could be separated by other components or by spaces, with suitable connection means being provided where necessary to communicate the tension force to the compartment walls. Preferably however the sidewalls of the first compartments are interconnected at or proximate the base region of the first layer so that the tension force can be transmitted directly between them to generate a travelling contraction close to the ground surface, and preferably in the inflated rest condition the inflated first compartments occupy at least 80%, more preferably at least 90%, yet more preferably at least 95% of the volume of the first layer.

Of course, the upper flexible compartments could be selectively inflated to the desired degree to level the load on a sloping ground surface or to adapt the level of the first compartments to conform to an uneven ground surface, with the attachment means being adjusted as necessary. Instead of intermediate layers which are either fully inflated or fully deflated as shown, a third layer of third inflatable compartments (not shown) could be provided either above or below the flexible web so that they form a third fluid cushion between the flexible web and either the upper or the first fluid cushion. The third compartments can then be inflated and deflated selectively to the extent required for the same purpose, optionally with an additional attachment means to stabilise the third layer by attaching it directly to the load.

In alternative, less preferred embodiments, the cushion assembly could include only the first layer of inflatable compartments, which optionally may extend downwardly from a flexible web attached directly to the load, or could include only the first layer and upper layer, either with or without the flexible web between them, or only the first layer together with the upper intermediate and lower intermediate layers as illustrated, but without the upper layer and either with or without a flexible web which is directly attachable to the load. Alternatively the cushion assembly could include the first layer, the upper layer, and one or more (lower and/or upper) intermediate layers between the first layer and the upper layer, either with or without a flexible web between an upper one of the intermediate layers and the upper layer.

Where the flexible web is not provided, or where a flexible web is provided but it is preferred not to attach it releasably to the load, the load could rest on the fluid cushion without being attached to it, relying on friction to maintain the fluid cushion in position beneath the load. The flexible web preferably comprises frames or other means for supporting FCMs, and preferably is less elastic than the side walls, but alternatively it could simply comprise the contiguous upper and lower walls of the layers of inflatable compartments between which it is arranged, which may be constructed in a similar way to the side walls, for example, with similar elasticity.

Where an upper layer is provided, it could be of a different construction from the first layer, comprising for example an assembly of horizontally elongate compartments without bladders whereas the first layer may comprise generally upright compartments with bladders enclosed between mesh walls. Similarly, where lower intermediate and upper intermediate layers are provided, they could also have different compartmental structures.

The cushion assembly could be flexibly folded or rolled to the storage configuration without using a spool.

Where a tension means is provided for moving the base region of the cushion assembly in the direction of travel, the tension means may advantageously comprise an elastic means which is preferably incorporated into a respective one or ones of the flexible walls of each first compartment, and is preferably energised by inflation of the respective first compartment to the inflated condition, and preferably is an elastic mesh as described with reference to the first embodiment. Alternatively the tension force could act between other ones of the flexible walls of the cushion assembly. The tension means could be energised other than by inflation of the first compartment, for example, by inflation of a respective second compartment.

Advantageously, each group of flexible walls defining a first compartment, and preferably at least the side walls of the group, includes an elastic means, preferably an elastomer, as described with reference to the preferred embodiment. In alternative embodiments, instead of using a mesh, the elastic means could be an elastomeric sheet material which forms the compartment walls, which may be arranged to contain the pressurised fluid or may enclose separate bladders for containing the pressurised fluid.

In alternative embodiments the tension means could be an elastic means other than an elastomer, which could be energised by inflation of the compartments or by other means. For example, it could comprise a network of helical springs joined together to form a mesh which forms the compartment walls, or otherwise an arrangement of springs or other resilient bias means attached directly or indirectly to the compartment walls and energised by inflation of the compartments or by actuators.

The tension means could be other than an elastic means. For example, it could be a shape memory polymer material incorporated into the compartment walls with suitable electrical control means, or any other mechanical arrangement, for example, hydraulic or pneumatic pistons or electromagnetic actuators, for pulling the compartment walls upwardly or forwardly in the direction of travel.

The flexible walls could be made from a relatively inelastic mesh, for example, where the tension force is generated by second compartments.

Where second inflatable compartments are provided for inducing the tension force, they could be arranged other than between the sidewalls of the first compartments, for example, by connecting them to the walls of the first compartments by a tension link or via other ones of the flexible walls.

In a yet further embodiment, each second compartment may be arranged between a pair of walls comprising an upper flexible wall and a lower flexible wall which are connected at their edges, both to one another and to respective ones of the first walls which form sidewalls of a respective one of the first compartments, so that the pair of walls form a base of the first compartment. An inflatable bladder may be arranged between the pair of walls, or alternatively the pair of walls may be arranged to form a bladder, which is inflatable from an unenergised condition in which the respective pair of walls are flat and parallel, to an energised condition in which the respective pair of walls are urged apart so as to induce in the walls a tension force which pulls opposite edges of the respective pair of walls towards one another in the direction of travel beneath the deflated or inflated first compartment. When energised in sequence, the second compartments define a wavelike undulation which moves through the base region of the first fluid cushion in the direction of travel.

Preferably, the selected ones of the compartments are deflatable and inflatable individually in sequence. Alternatively however, respective ones of the compartments could be fluidly connected in groups, in which case the selected ones of the compartments will comprise groups of selected ones of the compartments which are deflated and inflated in sequence. For example, the groups could be arranged to produce a repeating multiple waveform in the cushion assembly.

In the preferred embodiment, each of the first, second and upper compartments comprises a bladder which contains the pressurised fluid and which is separate from the flexible walls, each bladder being confined within or between a respective one or group of the flexible walls. In yet further embodiments, each first, second or upper compartment may comprise two or more bladders which are inflated together to inflate the respective compartment, and which may be separated by internal flexible walls of the compartment.

In alternative embodiments, each of the first, second, and/or upper compartments may comprise a volume or interior space enclosed and defined by a respective one or ones of the flexible walls which contain the pressurised fluid, wherein each flexible wall may define a wall of only one compartment or more than one adjacent compartment. For example, the flexible walls may comprise a rubberised canvas, a woven fabric coated or impregnated with PVC or other plastics material, an homogeneous, rolled or extruded sheet of rubber, plastics or similar material, a laminated material, or any other flexible sheet material suitable to form a bladder to contain the pressurised fluid, wherein the sheet material is arranged in panels which are sealingly joined together at their edges to define a cellular, i.e. compartmental structure.

In less preferred embodiments, each first compartment may consist of an individual bladder, wherein the flexible walls comprise the walls of the bladder. The bladder may be made from an elastomer so that the walls of the bladder comprise the tension means. The bladders may be interconnected for example by means of tabs or flanges of fabric which are fixed to each bladder and to one another, so that the bladders together form the first layer of the cushion assembly.

In further alternative embodiments, each first compartment could comprise at least one or more side walls and an upper wall defining e.g. a hexagon or other polygon in plan, or could have one or an infinite number of side-walls defining the curved boundary of e.g. a cylindrical compartment. Each compartment could have its own sidewalls rather than sharing its sidewalls with the adjacent compartments, in which case the sidewalls of adjacent compartments could be arranged in contiguous abutting relation.

Preferably each first compartment has a vertical height greater than its horizontal (primary or secondary) dimension in the direction of travel, more preferably at least twice or, still more preferably, at least three times its horizontal dimension. Of course, if it is intended for the load to move only in one dimension, the compartments could be elongated in one dimension so as to form a single row or a single column in the other.

The flexible web could be made from a sheet material other than a mesh, which could incorporate the upper walls of the first compartments and/or the lower walls of the upper compartments.

Instead of providing each deployment module with its own support elements and rotation mechanism, the support elements and rotation mechanism could alternatively comprise part of a separate deployment apparatus on which each spool is releasably mounted in use. The spool could be supported by one or more than two support elements and powered e.g. by an electric motor or any other rotation mechanism rather than a hydraulic motor.

Instead of a square grid with four hoses per FCM per grid, each FCM could have less than four hoses or more than four hoses per grid (and a corresponding number of sockets in its body). For example, if the first compartments are hexagonal rather than square so that the first layer resembles a honeycomb in plan view with one FCM per compartment, then each FCM could be directly connected to six adjacent FCMs so that each FCM has six hoses per grid. In less preferred embodiments, the FCMs could be connected via flexible hoses which are connected together other than at the FCMs, so that the FCMs do not form nodes in the grid. The grid hose connections could be 90 degree elbows mounted via swivel joints in the upper and lower faces of the FCM, similar to the bladder hose connections illustrated. Alternatively the hose connections could be made to ports incorporated in the frames 70 with further fluid connections being made between each FCM and corresponding ports on the frame so that the FCM can be mounted and dismounted in a single step without disconnecting the hoses.

In alternative embodiments, the electrical components of each FCM could be powered by a battery or by a generator powered by the working fluid, e.g. via a turbine, or even by an inductive field which penetrates the whole fluid cushion. Control signals could be transmitted wirelessly, e.g. by radio transceivers or via fluid pressure modulation, so that no electrical conductors are required between the FCMs or between the FCMs and the central control system. The FCMs could be controlled pneumatically or hydraulically instead of electrically so that no electrical system is required at all. The control system could be implemented by distributed logic or processing capacity shared between the FCMs instead of a central controller.

In yet further alternative embodiments the fluid source may be a pressurised fluid source external to the fluid cushion, e.g. a supply from a large air compressor or blower, or an ambient fluid source, e.g. air or water. In either case the inflation means may include pumping or pressurisation means, either individual to each valve unit (such as a small rotary or reciprocal pump or compressor drawing ambient air or water from the exterior of the valve unit) or central (such as a single pump or compressor supplying air or water via fluid conduits to each of the valve units). If the fluid source is pressurised then the inflation means may comprise only valves and fluid conduits. The working fluid could be exhausted partially to an exhaust network and partially to an outlet to ambient, and/or could be supplied partially from a supply network and partially from ambient, e.g. to speed up operation or to reject waste heat. In yet further embodiments, rather than individual FCMs distributed through the fluid cushion assembly, the valve units may be arranged in a valve assembly external to the fluid cushion and connected via conduits to the respective inflatable compartments.

Further Alternative Embodiments

In further aspects of the invention, various of the features described and illustrated may alternatively be used in other embodiments which may, but need not, include the principal features of the preferred embodiment, and which may, but need not, be in accordance with either of the first and second modes of operation.

As an alternative to the first and second modes of operation, it is possible for example to move the base region of an inflatable cushion assembly forwardly in a direction of travel other than by a tension means incorporated into the cushion assembly.

In one such alternative mode of operation, a load supported on a fluid cushion may be moved in the direction of travel by applying an external force to move a base region of the cushion assembly forwardly in the direction of travel. The external force may be applied by an elongate vehicle which extends (either as a rigid beam or as a series of articulated elements) along its length axis, preferably for at least the breadth of the load transverse to the direction of travel, and which defines a cross-section having a generally wave-like form in a plane aligned with the direction of travel. The cross section may define a flat base and a curved upper surface, each of the base and the upper surface having a respective set of wheels, rollers, tracks or the like, which rotate in opposite directions so that when introduced into the interstice between the base of the cushion assembly and the ground surface at the trailing end of the cushion assembly, by driving the rotating elements in rotation or alternatively by urging the vehicle forward, e.g. by winches or separate tractor units, the vehicle lifts the base region of the cushion assembly to define a wavelike contraction conforming to the curvature of its upper surface. By moving the vehicle forward beneath the cushion assembly until it exits at the leading end, the base region of the cushion assembly can be progressively displaced in the direction of travel in a manner similar to that accomplished by the internal tension means described in accordance with the first and second modes of operation.

In accordance with one further aspect of the invention, a further embodiment comprises an apparatus for moving a load over a ground surface in a direction of travel, including an inflatable cushion assembly and an inflation means for inflating the cushion assembly with a fluid. The cushion assembly includes a plurality of inflatable compartments separated by a plurality of interconnected flexible walls, the flexible walls being arranged to define at least a first layer of said inflatable compartments. The first layer includes at least first said inflatable compartments and has an inflated rest condition in which all of the first compartments are inflated, each to an inflated condition, to form together a first fluid cushion which supports the load above the ground surface. Each of the first compartments comprises at least one inflatable bladder which is arranged between a respective group of said flexible walls, and the inflation means is arranged to inflate the first compartment by inflating the at least one bladder.

Optionally, these and other features may be the same as, or similar to, those of the preferred embodiment.

The cushion assembly is easier to manufacture on a large scale than prior art cushion assemblies in which the interconnected compartment walls must be fluidly sealed to contain the pressurised fluid. Each bladder can be individually removed and replaced if it fails, which also makes it possible for maintenance personnel to enter the individual compartments to repair the compartment walls. Since the walls of each bladder can be supported by the walls of the compartment which contains it, the bladders can be of relatively lighter construction than prior art bladders of comparable size. The use of bladders means that the compartment walls can be made from a mesh, which makes it much easier to join together multiple panels to create a very large scale compartmental structure, and also to separate and replace the panels for maintenance and repair. The mesh walls distribute evenly throughout the cushion assembly the stresses applied by the load resting on the inflated bladders and by the tension means or other arrangement for moving the cushion assembly in the direction of travel.

In accordance with a yet further aspect of the invention, a further embodiment comprises an apparatus for moving a load over a ground surface in a direction of travel, including an inflatable cushion assembly and an inflation means for inflating the cushion assembly with a fluid. The cushion assembly includes a flexible web and a plurality of inflatable compartments, the inflatable compartments being separated by a plurality of interconnected flexible walls, the flexible walls being arranged to define a first layer of said inflatable compartments beneath the flexible web. The first layer includes at least first said inflatable compartments and has an inflated rest condition in which all of the first compartments are inflated, each to an inflated condition, to form together a first fluid cushion which supports the load above the ground surface. The flexible walls are arranged to define an upper layer of upper said inflatable compartments above the flexible web, the upper layer having an inflated condition in which all of the upper compartments are inflated to form together an upper fluid cushion which supports the load above the first fluid cushion in a use position. Each of the upper compartments is arranged between a respective group of said flexible walls including one or more respective side walls which separate the upper compartments from one another. In the use position, the flexible web is arranged between the first fluid cushion and the upper fluid cushion in the inflated rest condition of the first fluid cushion and the inflated condition of the upper fluid cushion, and the side walls of the upper compartments are arranged between the flexible web and the load. A base region of the first layer of the cushion assembly is then moved progressively over the ground surface in the direction of travel.

Advantageously, the cushion assembly may include releasable attachment means whereby the flexible web is releasably attached in tension to the load.

Optionally, these and other features may be the same as, or similar to, those of the preferred embodiment.

The upper compartments can be selectively inflated to conform to the shape of the load, with their contiguous side walls extending upwardly from the flexible web to allow the upper fluid cushion to completely fill the volume between the load and the generally horizontal web. The upper fluid cushion stabilises the flexible web in a fixed position relative to the downwardly facing surface of the load so that the base region of the first fluid cushion can be progressively displaced across the ground surface while the load remains stably positioned on the cushion assembly. Where flow control modules are provided to control the inflation and deflation of the compartments, they may be attached to the web so that they are protected against damage by crushing between the load and the ground surface.

In accordance with a yet further aspect of the invention, a further embodiment comprises an apparatus for use in moving a load over a ground surface in a direction of travel, including an inflatable cushion assembly, an inflation means for inflating the cushion assembly with a fluid to form a first fluid cushion which supports the load above the ground surface, and a spool for storing the cushion assembly in a storage position and deploying the cushion assembly from the storage position to a use position. The apparatus also includes at least one support element for supporting the spool, wherein the spool is rotatably mounted on the support element, and a rotation mechanism for rotating the spool relative to the at least one support element to wind and unwind the deflated cushion assembly on and off the spool between a use position and a storage position. In the use position, a base region of the cushion assembly can be moved progressively over the ground surface in the direction of travel. After use, the cushion assembly can be deflated and then wound back onto the spool from the use position to the storage position.

Optionally, these and other features may be the same as, or similar to, those of the preferred embodiment.

Advantageously, a plurality of deployment modules can be provided, each deployment module including a respective inflatable cushion assembly and spool, and optionally also a respective support element or elements and rotation mechanism. The deployment spool makes it easy to handle and deploy a very large cushion assembly and helps to fully deflate the compartments as they are wound onto the spool for storage.

In some such embodiments, the or each cushion assembly could comprise a single compartment filled for example with air or water. If a single compartment or each compartment is filled with water or another liquid then it is conceivable to form it as vessel with an open top so that it is inflated simply by pouring or pumping water into it, with the sides of the vessel supported for example by semi-rigid walls formed from multiple compartments inflated with compressed air. In such embodiments the load can float directly on the fluid. Preferably however the or each compartment is arranged to contain a pressurised gas so that it is inflated by filling it with e.g. compressed air, and preferably the cushion assembly comprises multiple compartments separated by flexible walls as described above with reference to the preferred embodiment.

In accordance with a yet further aspect of the invention, a further embodiment comprises an apparatus for use in moving a load over a ground surface in a direction of travel, including an inflatable cushion assembly, an inflation means for inflating the cushion assembly, and a control system. The cushion assembly includes a plurality of inflatable compartments separated by a plurality of interconnected flexible walls, the flexible walls being arranged to define at least a first layer of said inflatable compartments. The first layer includes at least first said inflatable compartments and has an inflated rest condition in which all of the first compartments are inflated, each to an inflated condition, to form together a first fluid cushion for supporting the load above the ground surface. The inflation means includes a plurality of valve assemblies, each valve assembly being arranged to control a flow of fluid to and from a respective one or group of said inflatable compartments. Each valve assembly is individually controllable by the control system to selectively inflate and deflate the respective one or group of said inflatable compartments. The inflation means includes a plurality of individual flow control modules, each flow control module including a respective one of the valve assemblies, and the flow control modules are distributed through the cushion assembly.

In accordance with a corresponding method of use, the load is supported on the first fluid cushion while a base region of the cushion assembly is moved progressively over the ground surface in the direction of travel, and the valve assembly of each flow control module is individually controlled by signals from the control system to selectively inflate and deflate the respective one or group of inflatable compartments. After deflating the cushion assembly to a deflated condition the cushion assembly including the flow control modules together with the inflatable compartments and flexible walls is flexibly folded or rolled to the storage configuration.

Optionally, these and other features may be the same as, or similar to, those of the preferred embodiment.

The distributed flow control modules can be used to control the inflation and deflation of the first compartments, or alternatively or additionally, to control the inflation and deflation of the upper compartments and/or the second compartments, as described with reference to the preferred embodiment. They avoid the need to connect each compartment separately and individually to a remote fluid source external to the cushion assembly, which greatly simplifies the cushion assembly when manufactured on a very large scale with many compartments. Preferably the flow control modules are connected together by flexible hoses to form a grid or grids through which the fluid can flow through multiple parallel flow paths between the respective inflating and deflating compartments. The flow paths can be very short so that the rate of flow and hence the speed of travel is greatly increased.

Those skilled in the art will conceive many further adaptations within the scope of the claims.

List of MIALCs

In this specification, a MIALC is a feature or combination of features as defined below.

MIALC 1. An apparatus for moving a load over a ground surface in a direction of travel, including an inflatable cushion assembly and an inflation means for inflating the cushion assembly with a fluid;

the cushion assembly including a plurality of inflatable compartments and a plurality of interconnected flexible walls;

each compartment being separated from an adjacent one or ones of the compartments by a respective one or ones of the flexible walls, the flexible walls being arranged to define at least a first layer of said inflatable compartments;

the first layer including at least first said inflatable compartments and having an inflated rest condition in which all of the first compartments are inflated, each to an inflated condition, to form together a first fluid cushion which supports the load above the ground surface;

wherein the inflation means is operable to deflate and re-inflate selected ones of the first compartments in a sequence so as to produce a deflated region of the first fluid cushion which travels through the first fluid cushion in the direction of travel;

and the cushion assembly includes a tension means, the tension means being arranged to induce a tension force between respective ones of the flexible walls on deflation of each respective first compartment from the inflated condition to a deflated condition;

and the tension means is arranged to pull, by the tension force, a respective said flexible wall or walls of each deflating or deflated first compartment in a base region of the first layer forwardly in the direction of travel or upwardly away from the ground surface, so as to produce a contraction in the deflated region of the first fluid cushion, the contraction travelling through the first fluid cushion so as to move the base region of the first layer of the cushion assembly progressively in the direction of travel.

MIALC 2. An apparatus according to MIALC 1, wherein the tension means is energised by inflation of a respective one or group of the inflatable compartments.

MIALC 3. An apparatus according to MIALC 1, wherein the tension means comprises an elastic means, and the elastic means is energised by inflation of a respective first compartment to the inflated condition.

MIALC 4. An apparatus according to MIALC 1, wherein each of the first compartments comprises at least one inflatable bladder which is arranged between a group of said flexible walls, and the inflation means is arranged to deflate and re-inflate the compartment by deflating and re-inflating the at least one bladder.

MIALC 5. An apparatus according to MIALC 4, wherein each group of flexible walls includes a mesh.

MIALC 6. An apparatus according to MIALC 5, wherein the mesh is made from cords, each cord comprising an elastomeric core arranged in a sheath of relatively inelastic material.

MIALC 7. An apparatus according to MIALC 1, wherein the tension means comprises a plurality of second said inflatable compartments, each second compartment being arranged to induce the tension force when the second compartment is inflated from a deflated condition to an inflated condition;

and the inflation means is operable to inflate and deflate selected ones of the second compartments in a sequence.

MIALC 8. An apparatus according to MIALC 1, wherein the flexible walls are arranged to define an upper layer of upper said inflatable compartments above the first layer, the upper layer having an inflated condition in which all of the upper compartments are inflated to form together an upper fluid cushion which supports the load above the first fluid cushion.

MIALC 9. An apparatus according to MIALC 8, wherein a flexible web is arranged between the upper layer and the first layer;

and the cushion assembly includes a releasable attachment means for attaching the flexible web in tension to the load.

MIALC 10. An apparatus according to MIALC 8, wherein the flexible walls are arranged to define at least one intermediate layer of intermediate said inflatable compartments between the upper layer and the first layer.

MIALC 11. An apparatus according to MIALC 8, wherein the flexible walls are arranged to define at least two intermediate layers of intermediate said inflatable compartments between the upper layer and the first layer.

MIALC 12. An apparatus according to MIALC 1, wherein a spool is provided, and the cushion assembly is wound onto the spool in a deflated condition.

MIALC 13. An apparatus according to MIALC 1, wherein the inflation means includes a plurality of flow control modules, each flow control module including a respective valve assembly, each valve assembly being arranged to control a flow of fluid to and from a respective one or group of said inflatable compartments; and the flow control modules are distributed through the cushion assembly.

MIALC 14. A method of moving a load over a ground surface in a direction of travel, including:

arranging the load on an inflatable cushion assembly, the cushion assembly including a plurality of inflatable compartments and a plurality of interconnected flexible walls;

each compartment being separated from an adjacent one or ones of the compartments by a respective one or ones of the flexible walls, the flexible walls being arranged to define at least a first layer of said inflatable compartments, the first layer including at least first said inflatable compartments;

the cushion assembly further including a tension means;

the first compartments being inflated to define an inflated rest condition of the first layer in which all of the first compartments are inflated, each to an inflated condition, to form together a first fluid cushion which supports the load above the ground surface;

and deflating and re-inflating selected ones of the first compartments in a sequence so as to produce a deflated region of the first fluid cushion which travels through the first fluid cushion in the direction of travel;

and energising the tension means so as to induce a tension force which acts between respective ones of the flexible walls on deflation of each respective first compartment from the inflated condition to a deflated condition;

and pulling, by the tension force, a respective said flexible wall or walls of each deflating or deflated first compartment in a base region of the first layer forwardly in the direction of travel or upwardly away from the ground surface so as to produce a contraction in the deflated region of the first fluid cushion, the contraction travelling through the first fluid cushion so as to move the base region of the first layer of the cushion assembly progressively in the direction of travel.

MIALC 15. A method according to MIALC 14, wherein the tension means is energised by inflation of a respective one or group of the said inflatable compartments.

MIALC 16. A method according to MIALC 14, wherein the flexible walls are arranged to define an upper layer of upper said inflatable compartments above the first layer, and all of the upper compartments are inflated to form together an upper fluid cushion which supports the load above the first fluid cushion.

MIALC 17. A method according to MIALC 14, wherein the flexible walls are arranged to define an upper layer of upper said inflatable compartments above the first layer, and at least one intermediate layer of intermediate said inflatable compartments between the upper layer and the first layer;

and all of the upper compartments are inflated to form together an upper fluid cushion which supports the load above the first fluid cushion;

and the at least one intermediate layer is inflated and deflated to adjust a height of the first layer relative to the ground surface.

MIALC 18. A method according to MIALC 17, wherein the flexible walls are arranged to define a lower intermediate layer of lower intermediate said inflatable compartments between the said at least one intermediate layer and the first layer;

and all of the lower intermediate compartments are maintained in an inflated condition while the contraction travels through the first fluid cushion.

MIALC 19. A method according to MIALC 14, wherein a spool is provided, and the cushion assembly is wound onto the spool in a deflated condition.

MIALC 20. A method according to MIALC 14, wherein the load is a ship, and the cushion assembly is arranged beneath the ship while the ship is afloat in water, and the base region of the first layer of the cushion assembly is moved progressively over a submerged ground surface so as to move the ship out of the water onto land.

MIALC 21. An apparatus for moving a load over a ground surface in a direction of travel, including an inflatable cushion assembly and an inflation means for inflating the cushion assembly with a fluid;

the cushion assembly including a plurality of inflatable compartments and a plurality of interconnected flexible walls;

each compartment being separated from an adjacent one or ones of the compartments by a respective one or ones of the flexible walls, the flexible walls being arranged to define at least a first layer of said inflatable compartments;

the first layer including at least first said inflatable compartments and having an inflated rest condition in which all of the first compartments are inflated, each to an inflated condition, to form together a first fluid cushion which supports the load above the ground surface;

the cushion assembly further including a tension means;

wherein the tension means is arranged to induce a tension force between respective ones of the flexible walls, and to pull, by the tension force, a respective flexible wall or walls of each respective first compartment in a base region of the first layer, in the inflated condition of the said first compartment, forwardly in the direction of travel or upwardly away from the ground surface, so as to produce a local contraction in the first fluid cushion;

and the tension means is operable to apply the tension force to the said respective flexible walls of selected ones of the first compartments in a sequence, so that the contraction travels through the first fluid cushion and moves the base region of the first layer of the cushion assembly progressively in the direction of travel.

MIALC 22. An apparatus according to MIALC 21, wherein the tension means comprises a plurality of second said inflatable compartments, each second compartment being arranged between respective ones of the flexible walls;

each second compartment being arranged to apply the tension force to a flexible wall or walls of a respective one or group of the first compartments;

and the inflation means is operable to inflate and deflate selected ones of the second compartments in a sequence.

MIALC 23. An apparatus according to MIALC 22, wherein each second compartment is arranged between a pair of the flexible walls;

and the respective pair of walls are arranged in proximate opposed relation in the deflated condition, and are urged apart in the inflated condition so as to induce the tension force in the respective pair of walls, the tension force acting to pull spaced portions of the respective pair of walls, one towards another;

the said spaced portions being arranged to pull said flexible wall or walls of said respective one or group of the first compartments in the base region of the first layer forwardly in the direction of travel or upwardly away from the ground surface, so as to produce the contraction in the first fluid cushion.

MIALC 24. An apparatus according to MIALC 22, wherein each second compartment is arranged between respective adjacent ones of the first compartments; and the inflation means is arranged to inflate each second compartment to a higher pressure than the respective adjacent ones of the first compartments.

MIALC 25. An apparatus according to MIALC 22, wherein each of the second compartments comprises at least one inflatable bladder which is arranged between respective ones of the flexible walls, and the inflation means is arranged to inflate and deflate the second compartment by inflating and deflating the at least one bladder.

MIALC 26. An apparatus according to MIALC 21, wherein each of the first compartments comprises at least one inflatable bladder which is arranged between a respective group of said flexible walls.

MIALC 27. An apparatus according to MIALC 26, wherein said group of flexible walls includes a mesh.

MIALC 28. An apparatus according to MIALC 21, wherein the flexible walls are arranged to define an upper layer of upper said inflatable compartments above the first layer, the upper layer having an inflated condition in which all of the upper compartments are inflated to form together an upper fluid cushion which supports the load above the first fluid cushion.

MIALC 29. An apparatus according to MIALC 28, wherein a flexible web is arranged between the upper layer and the first layer;

and the cushion assembly includes a releasable attachment means for attaching the flexible web in tension to the load.

MIALC 30. An apparatus according to MIALC 28, wherein the flexible walls are arranged to define at least one intermediate layer of intermediate said inflatable compartments between the upper layer and the first layer.

MIALC 31. An apparatus according to MIALC 28, wherein the flexible walls are arranged to define at least two intermediate layers of intermediate said inflatable compartments between the upper layer and the first layer.

MIALC 32. An apparatus according to MIALC 21, wherein a spool is provided, and the cushion assembly is wound onto the spool in a deflated condition.

MIALC 33. An apparatus according to MIALC 21, wherein the inflation means includes a plurality of flow control modules, each flow control module including a respective valve assembly, each valve assembly being arranged to control a flow of fluid to and from a respective one or group of said inflatable compartments; and the flow control modules are distributed through the cushion assembly.

MIALC 34. A method of moving a load over a ground surface in a direction of travel, including:

arranging the load on an inflatable cushion assembly, the cushion assembly including a plurality of inflatable compartments and a plurality of interconnected flexible walls;

each compartment being separated from an adjacent one or ones of the compartments by a respective one or ones of the flexible walls, the flexible walls being arranged to define at least a first layer of said inflatable compartments, the first layer including at least first said inflatable compartments;

the cushion assembly further including a tension means;

the first compartments being inflated to define an inflated rest condition of the first layer in which all of the first compartments are inflated, each to an inflated condition, to form together a first fluid cushion which supports the load above the ground surface;

and energising the tension means so as to induce a tension force between respective ones of the flexible walls;

and pulling, by the tension force, a respective flexible wall or walls of each respective first compartment in a base region of the first layer, in the inflated condition of the said first compartment, forwardly in the direction of travel or upwardly away from the ground surface, so as to produce a local contraction in the first fluid cushion;

the tension means being energised to apply the tension force to the said respective flexible walls of selected ones of the first compartments in a sequence, so that the contraction travels through the first fluid cushion and moves the base region of the first layer of the cushion assembly progressively in the direction of travel.

MIALC 35. A method according to MIALC 34, wherein the tension means comprises a plurality of second said inflatable compartments, each second compartment being arranged between respective ones of the flexible walls;

and the inflation means is operated to inflate and deflate selected ones of the second compartments in a sequence so as to apply the tension force to the flexible walls of the selected ones of the first compartments.

MIALC 36. A method according to MIALC 35, wherein each second compartment is arranged between respective adjacent ones of the first compartments; and the inflation means is operated to inflate each second compartment to a higher pressure than the respective adjacent ones of the first compartments.

MIALC 37. A method according to MIALC 34, wherein the tension force is applied in a sequence which causes the contraction to travel through the first fluid cushion in rotation about a static or moving point.

MIALC 38. A method according to MIALC 34, wherein the flexible walls are arranged to define an upper layer of upper said inflatable compartments above the first layer, and all of the upper compartments are inflated to form together an upper fluid cushion which supports the load above the first fluid cushion.

MIALC 39. A method according to MIALC 34, wherein the flexible walls are arranged to define an upper layer of upper said inflatable compartments above the first layer, and at least one intermediate layer of intermediate said inflatable compartments between the upper layer and the first layer;

and all of the upper compartments are inflated to form together an upper fluid cushion which supports the load above the first fluid cushion;

and the at least one intermediate layer is inflated and deflated to adjust a height of the first layer relative to the ground surface.

MIALC 40. A method according to MIALC 39, wherein the flexible walls are arranged to define a lower intermediate layer of lower intermediate said inflatable compartments between the said at least one intermediate layer and the first layer;

and all of the lower intermediate compartments are maintained in an inflated condition while the contraction travels through the first fluid cushion.

MIALC 41. A method according to MIALC 34, wherein a spool is provided, and the cushion assembly is wound onto the spool in a deflated condition.

MIALC 42. A method according to MIALC 34, wherein the load is a ship, and the cushion assembly is arranged beneath the ship while the ship is afloat in water, and the base region of the first layer of the cushion assembly is moved progressively over a submerged ground surface so as to move the ship out of the water onto land.

MIALC 43. An apparatus for moving a load over a ground surface in a direction of travel, including an inflatable cushion assembly and an inflation means for inflating the cushion assembly with a fluid;

the cushion assembly including a plurality of inflatable compartments separated by a plurality of interconnected flexible walls, the flexible walls being arranged to define at least a first layer of said inflatable compartments;

the first layer including at least first said inflatable compartments and having an inflated rest condition in which all of the first compartments are inflated, each to an inflated condition, to form together a first fluid cushion which supports the load above the ground surface;

wherein each of the first compartments comprises at least one inflatable bladder which is arranged between a respective group of said flexible walls, and the inflation means is arranged to inflate the first compartment by inflating the at least one bladder.

MIALC 44. An apparatus according to MIALC 43, wherein each group of flexible walls includes an elastic means.

MIALC 45. An apparatus according to MIALC 44, wherein the elastic means is an elastomer.

MIALC 46. An apparatus according to MIALC 44, wherein the elastic means is arranged to cause symmetric contraction of the first layer of inflatable compartments when the cushion assembly is deflated.

MIALC 47. An apparatus according to MIALC 43, wherein each group of flexible walls includes a mesh.

MIALC 48. An apparatus according to MIALC 47, wherein the mesh is made from cords, each cord comprising an elastomeric core arranged in a sheath of relatively inelastic material.

MIALC 49. An apparatus according to MIALC 43, wherein each said group of flexible walls comprises at least an upper wall and one or more side walls; and the respective side walls of adjacent first compartments are interconnected at or proximate a base surface of the first layer.

MIALC 50. An apparatus according to MIALC 43, wherein the first layer consists essentially of the first compartments and respective groups of flexible walls.

MIALC 51. An apparatus according to MIALC 43, wherein the flexible walls are arranged to define an upper layer of upper said inflatable compartments above the first layer, the upper layer having an inflated condition in which all of the upper compartments are inflated to form together an upper fluid cushion which supports the load above the first fluid cushion.

MIALC 52. An apparatus according to MIALC 51, wherein a flexible web is arranged between the upper layer and the first layer;

and the cushion assembly includes a releasable attachment means for attaching the flexible web in tension to the load.

MIALC 53. An apparatus according to MIALC 51, wherein the flexible walls are arranged to define at least one intermediate layer of intermediate said inflatable compartments between the upper layer and the first layer.

MIALC 54. An apparatus according to MIALC 51, wherein the flexible walls are arranged to define at least two intermediate layers of intermediate said inflatable compartments between the upper layer and the first layer.

MIALC 55. An apparatus according to MIALC 51, wherein each of the upper compartments comprises at least one inflatable bladder which is arranged between a respective upper group of said flexible walls, and the inflation means is arranged to inflate the upper compartment by inflating the at least one bladder.

MIALC 56. An apparatus according to MIALC 43, wherein a spool is provided, and the cushion assembly is wound onto the spool in a deflated condition.

MIALC 57. An apparatus according to MIALC 43, wherein the inflation means includes a plurality of flow control modules, each flow control module including a respective valve assembly, each valve assembly being arranged to control a flow of fluid to and from a respective one or group of said inflatable compartments; and the flow control modules are distributed through the cushion assembly.

MIALC 58. An apparatus for moving a load over a ground surface in a direction of travel, including an inflatable cushion assembly and an inflation means for inflating the cushion assembly with a fluid;

the cushion assembly including a flexible web and a plurality of inflatable compartments, the inflatable compartments being separated by a plurality of interconnected flexible walls, the flexible walls being arranged to define a first layer of said inflatable compartments beneath the flexible web;

the first layer including at least first said inflatable compartments and having an inflated rest condition in which all of the first compartments are inflated, each to an inflated condition, to form together a first fluid cushion which supports the load above the ground surface;

wherein the flexible walls are arranged to define an upper layer of upper said inflatable compartments above the flexible web, each of the upper compartments being arranged between a respective group of said flexible walls including one or more respective side walls which separate the upper compartments from one another;

the upper layer having an inflated condition in which all of the upper compartments are inflated to form together an upper fluid cushion which supports the load above the first fluid cushion in a use position, wherein in the use position the flexible web is arranged between the first fluid cushion and the upper fluid cushion in the inflated rest condition of the first fluid cushion and the inflated condition of the upper fluid cushion, and the side walls of the upper compartments are arranged between the flexible web and the load.

MIALC 59. An apparatus according to MIALC 58, wherein the cushion assembly includes releasable attachment means for releasably attaching the flexible web in tension to the load.

MIALC 60. An apparatus according to MIALC 58, wherein the upper compartments are arranged in groups, the flexible walls of the upper compartments of each group being interconnected, the groups of upper compartments being arranged symmetrically on either side of an axial centreline of the flexible web;

each group of upper compartments being separable from an adjacent group of upper compartments at a respective separation plane, the separation plane extending in parallel with the axial centreline and downwardly through an upper surface of the upper layer between the adjacent groups of upper compartments so that the flexible walls of the adjacent groups of upper compartments are not interconnected via the separation plane.

MIALC 61. An apparatus according to MIALC 58, wherein, when the flexible web is arranged in a horizontal plane in a fully inflated condition of the upper layer, the upper compartments extend upwardly from the flexible web to a height above the flexible web; and the height of the upper compartments increases outwardly from a central region of the flexible web to a pair of lateral regions of the flexible web spaced symmetrically on either side of the central region, the central region extending along an axial centreline of the flexible web.

MIALC 62. An apparatus according to MIALC 58, wherein the flexible walls are arranged to define at least one intermediate layer of intermediate said inflatable compartments between the flexible web and the first layer.

MIALC 63. An apparatus according to MIALC 58, wherein the flexible walls are arranged to define at least two intermediate layers of intermediate said inflatable compartments between the flexible web and the first layer.

MIALC 64. An apparatus according to MIALC 58, wherein at least some of the flexible walls comprise an elastic means.

MIALC 65. An apparatus according to MIALC 64, wherein the elastic means is an elastomer.

MIALC 66. An apparatus according to MIALC 64, wherein the elastic means is arranged to cause symmetric contraction of the first layer of inflatable compartments when the cushion assembly is deflated.

MIALC 67. An apparatus according to MIALC 58, wherein each of the first compartments is arranged between a respective group of said flexible walls including one or more respective side walls, the side walls of each first compartment including an elastic means; and the flexible web is relatively less elastic than the side walls of the first compartments.

MIALC 68. An apparatus according to MIALC 58, wherein the first layer consists essentially of the first compartments and respective ones of the flexible walls.

MIALC 69. An apparatus according to MIALC 58, wherein each first compartment is arranged between a respective group of said flexible walls including one or more respective side walls; and the respective side walls of adjacent first compartments are interconnected at or proximate a base surface of the first layer.

MIALC 70. An apparatus according to MIALC 58, wherein a spool is provided, and the cushion assembly is wound onto the spool in a deflated condition.

MIALC 71. An apparatus according to MIALC 58, wherein the inflation means includes a plurality of flow control modules, each flow control module including a respective valve assembly, each valve assembly being arranged to control a flow of fluid to and from a respective one or group of said inflatable compartments; and the flow control modules are distributed through the cushion assembly.

MIALC 72. An apparatus according to MIALC 71, wherein the flow control modules are attached to the flexible web between the first fluid cushion and the upper fluid cushion in the use position.

MIALC 73. A method of moving a load over a ground surface in a direction of travel, including:
arranging the load on an inflatable cushion assembly,
the cushion assembly including a flexible web and a plurality of inflatable compartments, the inflatable compartments being separated by a plurality of interconnected flexible walls, the flexible walls being arranged to define a first layer of said inflatable compartments beneath the flexible web and an upper layer of upper said inflatable compartments above the flexible web;
the first layer including at least first said inflatable compartments;
the first compartments being inflated to define an inflated rest condition of the first layer in which all of the first compartments are inflated, each to an inflated condition, to form together a first fluid cushion which supports the load above the ground surface;
each of the upper compartments being arranged between a respective group of said flexible walls including one or more respective side walls which separate the upper compartments from one another;
the upper compartments being inflated to define an inflated condition of the upper layer in which all of the upper compartments are inflated to form together an upper fluid cushion which supports the load above the first fluid cushion in a use position of the cushion assembly,
wherein in the use position the flexible web is arranged between the first fluid cushion and the upper fluid cushion in the inflated rest condition of the first fluid cushion and the inflated condition of the upper fluid cushion, and the side walls of the upper compartments are arranged between the flexible web and the load;
and moving a base region of the first layer of the cushion assembly progressively over the ground surface in the direction of travel.

MIALC 74. A method according to MIALC 73, including releasably attaching the flexible web in tension to the load in the use position.

MIALC 75. A method according to MIALC 73, wherein a base surface of the load resting on the upper fluid cushion is non-parallel with a horizontal reference plane;
and the upper compartments supporting the said base surface are inflated respectively to different heights above the flexible web, so that the flexible web beneath the said base surface is more nearly parallel than the said base surface with the reference plane.

MIALC 76. A method according to MIALC 73, wherein the flexible walls are arranged to define at least one intermediate layer of intermediate said inflatable compartments between the flexible web and the first layer;
and the at least one intermediate layer is inflated and deflated to adjust a height of the first layer relative to the ground surface.

MIALC 77. A method according to MIALC 76, wherein the flexible walls are arranged to define a lower intermediate layer of lower intermediate said inflatable compartments between the said at least one intermediate layer and the first layer;
and all of the lower intermediate compartments are maintained in an inflated condition while the base region of the first layer of the cushion assembly is moved over the ground surface in the direction of travel.

MIALC 78. A method according to MIALC 73, wherein the load is a ship, and the cushion assembly is arranged beneath the ship while the ship is afloat in water, and the base region of the first layer of the cushion assembly is moved progressively over a submerged ground surface so as to move the ship out of the water onto land.

MIALC 79. A method according to MIALC 73, wherein a spool is provided, and the cushion assembly is wound onto the spool in a deflated condition.

MIALC 80. An apparatus for use in moving a load over a ground surface in a direction of travel, including:
an inflatable cushion assembly;
an inflation means for inflating the cushion assembly with a fluid to form a first fluid cushion for supporting the load above the ground surface; and
a spool for storing the cushion assembly in a storage position and deploying the cushion assembly from the storage position to a use position;
the apparatus further including:
at least one support element arranged to support the spool in use,
wherein in use the spool is rotatably mounted on the at least one support element, and
a rotation mechanism for rotating the spool relative to the at least one support element so as to wind the deflated cushion assembly onto the spool from the use position to the storage position.

MIALC 81. An apparatus according to MIALC 80, wherein the apparatus comprises a plurality of deployment modules, each deployment module including a respective said inflatable cushion assembly and spool.

MIALC 82. An apparatus according to MIALC 81, wherein each deployment module includes a respective said at least one support element and rotation mechanism.

MIALC 83. An apparatus according to MIALC 80, wherein the cushion assembly includes a plurality of inflatable compartments separated by a plurality of interconnected flexible walls, the flexible walls being arranged to define at least a first layer of said inflatable compartments;

the first layer including at least first said inflatable compartments and having an inflated rest condition in which all of the first compartments are inflated, each to an inflated condition, to form together the first fluid cushion.

MIALC 84. An apparatus according to MIALC 83, wherein at least some of the flexible walls comprise an elastic means.

MIALC 85. An apparatus according to MIALC 84, wherein the elastic means is an elastomer.

MIALC 86. An apparatus according to MIALC 84, wherein the elastic means is arranged to cause symmetric contraction of the first layer of inflatable compartments when all of the inflatable compartments of the first layer are in a deflated and unloaded condition.

MIALC 87. An apparatus according to MIALC 83, wherein the inflation means includes a plurality of flow control modules, each flow control module including a respective valve assembly, each valve assembly being arranged to control a flow of fluid to and from a respective one or group of said inflatable compartments; and the flow control modules are distributed through the cushion assembly.

MIALC 88. A method of moving a load over a ground surface in a direction of travel, comprising:

providing an inflatable cushion assembly and a spool, the cushion assembly being wound on the spool in a storage position;

supporting the spool by at least one support element and rotating the spool relative to the at least one support element so as to unwind the cushion assembly from the storage position to a use position; and then inflating the cushion assembly with a fluid to form in the use position a first fluid cushion which supports the load above the ground surface; and then moving a base region of the cushion assembly progressively over the ground surface in the direction of travel; and then deflating the cushion assembly and supporting the spool by the at least one support element and operating a rotation mechanism to rotate the spool relative to the at least one support element so as to wind the deflated cushion assembly onto the spool from the use position to the storage position.

MIALC 89. A method according to MIALC 88, wherein the load is a ship, and a plurality of deployment modules are provided, each deployment module including a respective said inflatable cushion assembly and spool;

the respective cushion assemblies being arranged in series in the use position along a length of the ship and inflated so as to form a series of said first fluid cushions which together support the ship above the ground surface.

MIALC 90. A method according to MIALC 89, wherein each cushion assembly is hauled under the ship into the use position while the ship is afloat in water and then inflated to support the ship on a submerged ground surface, and the base region of each cushion assembly is moved progressively over the submerged ground surface in the direction of travel to as to move the ship out of the water onto land.

MIALC 91. An apparatus for use in moving a load over a ground surface in a direction of travel, including:

an inflatable cushion assembly, an inflation means for inflating the cushion assembly, and a control system;

the cushion assembly including a plurality of inflatable compartments separated by a plurality of interconnected flexible walls, the flexible walls being arranged to define at least a first layer of said inflatable compartments;

the first layer including at least first said inflatable compartments and having an inflated rest condition in which all of the first compartments are inflated, each to an inflated condition, to form together a first fluid cushion for supporting the load above the ground surface;

the inflation means including a plurality of valve assemblies, each valve assembly being arranged to control a flow of fluid to and from a respective one or group of said inflatable compartments;

each valve assembly being individually controllable by the control system to selectively inflate and deflate the respective one or group of said inflatable compartments;

the cushion assembly being flexibly foldable or rollable in a deflated condition from a use configuration to a storage configuration;

wherein the inflation means includes a plurality of individual flow control modules, each flow control module including a respective one of the valve assemblies, and the flow control modules are distributed through the cushion assembly.

MIALC 92. An apparatus according to MIALC 91, wherein the cushion assembly includes a first network of first flexible hoses which connect together the flow control modules and conduct the fluid to the respective inflatable compartments.

MIALC 93. An apparatus according to MIALC 92, wherein the valve assemblies are operable to direct the fluid to flow via the first flexible hoses from respective deflating ones of the inflatable compartments to respective inflating ones of the inflatable compartments.

MIALC 94. An apparatus according to MIALC 92, wherein the first flexible hoses define for each flow control module a plurality of different flow paths through which the fluid flowing to a respective inflatable compartment via the respective flow control module may travel.

MIALC 95. An apparatus according to MIALC 92, wherein each of the first flexible hoses includes a respective first electrical conductor, the first electrical conductors forming a first electrical grid through which electrical power or control signals may be conducted via multiple electrical pathways to each of the flow control modules.

MIALC 96. An apparatus according to MIALC 92, wherein the first flexible hoses are interconnected by the flow control modules to form a first grid such that each flow control module forms a node in the first grid.

MIALC 97. An apparatus according to MIALC 96, wherein each flow control module is directly connected via at least two of the first flexible hoses to at least two adjacent ones of the flow control modules.

MIALC 98. An apparatus according to MIALC 96, wherein most of the flow control modules are directly connected, each via four of the first flexible hoses to four adjacent ones of the flow control modules.

MIALC 99. An apparatus according to MIALC 96, wherein each flow control module includes a plurality of isolation valves, each isolation valve being selectively operable to isolate or restrict the flow of fluid via a respective one of the first flexible hoses.

MIALC 100. An apparatus according to MIALC 92, wherein the cushion assembly includes a second network of second flexible hoses which connect together the flow control modules and conduct the fluid away from respective deflating ones of the inflatable compartments.

MIALC 101. An apparatus according to MIALC 100, wherein the first flexible hoses are interconnected by the flow control modules to form a first grid and the second flexible hoses are interconnected by the flow control modules to form a second grid such that each flow control module forms a node in the first grid and in the second grid.

MIALC 102. An apparatus according to MIALC 101, wherein most of the flow control modules are directly connected, each via four of the first flexible hoses and four of the second flexible hoses to four adjacent ones of the flow control modules.

MIALC 103. An apparatus according to MIALC 100, wherein each flow control module includes a pump for pumping the fluid, and each pump is arranged to pump the fluid from the second network to the first network.

MIALC 104. An apparatus according to MIALC 103, wherein each pump comprises a compressor driven by a turbine; and the cushion assembly includes a third network of third flexible hoses which connect together the flow control modules and conduct the fluid from a pressurised fluid source external to the cushion assembly to drive the turbine.

MIALC 105. An apparatus according to MIALC 100, wherein each of the first flexible hoses includes a respective first electrical conductor and each of the second flexible hoses includes a respective second electrical conductor, the first electrical conductors forming a first electrical grid and the second electrical conductors forming a second electrical grid so that electrical power or signals may be conducted via multiple electrical pathways through each of the first and second grids to each of the flow control modules.

MIALC 106. An apparatus according to MIALC 91, wherein each flow control module includes a pump for pumping the fluid.

MIALC 107. An apparatus according to MIALC 106, wherein the pump comprises a compressor driven by a turbine.

MIALC 108. An apparatus according to MIALC 91, wherein the flow control modules are connected together by a network of first electrical conductors, the first electrical conductors forming a first electrical grid through which electrical power or control signals may be conducted via multiple electrical pathways to each of the flow control modules.

MIALC 109. A method of moving a load over a ground surface in a direction of travel, including:
providing an inflatable cushion assembly,
an inflation means for inflating the cushion assembly, and
a control system;
the cushion assembly including a plurality of inflatable compartments separated by a plurality of interconnected flexible walls, the flexible walls being arranged to define at least a first layer of said inflatable compartments;
the first layer including at least first said inflatable compartments and having an inflated rest condition in which all of the first compartments are inflated, each to an inflated condition, to form together a first fluid cushion for supporting the load above the ground surface;
the inflation means including a plurality of valve assemblies, each valve assembly being arranged to control a flow of fluid to and from a respective one or group of said inflatable compartments;
the cushion assembly being flexibly foldable or rollable in a deflated condition from a use configuration to a storage configuration;
wherein the load is supported on the first fluid cushion while a base region of the cushion assembly is moved progressively over the ground surface in the direction of travel;
and the inflation means includes a plurality of individual flow control modules, each flow control module including a respective one of the valve assemblies, and the flow control modules are distributed through the cushion assembly;
and the valve assembly of each flow control module is individually controlled by signals from the control system to selectively inflate and deflate the respective one or group of said inflatable compartments;
and after deflating the cushion assembly to the deflated condition the cushion assembly including the flow control modules together with the inflatable compartments and flexible walls is folded or rolled to the storage configuration.

MIALC 110. A method according to MIALC 109, wherein a spool is provided;
and the spool is supported by at least one support element;
and after deflating the cushion assembly to the deflated condition, the spool is rotated relative to the at least one support element so as to wind the deflated cushion assembly including the flow control modules together with the inflatable compartments and flexible walls onto the spool to the storage configuration.

MIALC 111. A method according to MIALC 110, wherein the load is a ship, and a plurality of deployment modules are provided, each deployment module including a respective said inflatable cushion assembly and spool;
the respective cushion assemblies being arranged in series in a use position along a length of the ship and inflated so as to form a series of said first fluid cushions which together support the ship above the ground surface.

MIALC 112. A method according to MIALC 111, wherein each cushion assembly is hauled under the ship into the use position while the ship is afloat in water and then inflated to support the ship on a submerged ground surface,
and the base region of each cushion assembly is moved progressively over the submerged ground surface in the direction of travel to as to move the ship out of the water onto land.

MIALC 113. A method according to MIALC 109, wherein the flow control modules are connected together by a network of flexible hoses, and the valve assemblies are operated to direct the fluid to flow via the flexible hoses from respective deflating ones of the inflatable compartments to respective inflating ones of the inflatable compartments.

MIALC 114. A method according to MIALC 109, wherein each flow control module includes a pump, and the pumps are operated to pump the fluid from respective deflating ones of the inflatable compartments to respective inflating ones of the inflatable compartments.

MIALC 115. A method according to MIALC 109, wherein the flow control modules are connected together by a network of first electrical conductors, the first electrical conductors forming a first electrical grid through which electrical power or control signals are conducted via multiple electrical pathways to each of the flow control modules.

The invention claimed is:

1. An apparatus for moving a load over a ground surface in a direction of travel, including an inflatable cushion assembly and an inflation means for inflating the cushion assembly with a fluid;
   the cushion assembly including a plurality of inflatable compartments and a plurality of interconnected flexible walls;
   each compartment being separated from an adjacent one or ones of the compartments by a respective one or ones of the flexible walls, the flexible walls being arranged to define at least a first layer of said inflatable compartments;
   the first layer including at least first said inflatable compartments and having an inflated rest condition in which all of the first-compartments are inflated, each to an inflated condition, to form together a first fluid cushion which supports the load above the ground surface;
   wherein the inflation means is operable to deflate and re-inflate selected ones of the first compartments in a sequence so as to produce a deflated region of the first fluid cushion which travels through the first fluid cushion in the direction of travel;
   and the cushion assembly includes a tension means,
   the tension means being arranged to induce a tension force between respective ones of the flexible walls on deflation of each respective first compartment from the inflated condition to a deflated condition;
   and the tension means is arranged to pull; by the tension force, a respective said flexible wall or walls of each deflating or deflated first compartment in a base region of the first layer forwardly in the direction of travel or upwardly away from the ground surface, so as to produce a contraction in the deflated region of the first fluid cushion,
   the contraction travelling through the first fluid cushion so as to move the base region of the first layer of the cushion assembly progressively in the direction of travel.

2. An apparatus according to claim 1, wherein the tension means comprises an elastic means, and the elastic means energized by inflation of a respective first compartment to the inflated condition.

3. An apparatus according to claim 1, wherein each of the first compartments comprises at least one inflatable bladder which is arranged between a group of said flexible walls, and the inflation means is arranged to deflate and re-inflate the compartment by deflating and re-inflating the at least one bladder.

4. An apparatus according to claim 3, wherein each group of flexible walls includes a mesh, and wherein
   the mesh is made from cords, each cord comprising an elastomeric core arranged in a sheath of material which is inelastic relative to the elastomeric core.

5. An apparatus according to claim 1, wherein the tension means comprises a plurality of second said inflatable compartments, each second compartment being arranged to induce the tension force when the second compartment is inflated from a deflated condition to an inflated condition;
   and the inflation means is operable to inflate and deflate selected ones of the second compartments in a sequence.

6. An apparatus according to claim 1, wherein the flexible walls are arranged to define an upper layer of upper said inflatable compartments above the first layer, the upper layer having an inflated condition in which all of the upper compartments are inflated to form together an upper fluid cushion which supports the load above the first fluid cushion.

7. An apparatus according to claim 1, wherein a spool is provided, and the cushion assembly is wound onto the spool in a deflated condition.

8. An apparatus according to claim 1, wherein the inflation means includes a plurality of flow control modules, each flow control module including a respective valve assembly, each valve assembly being arranged to control a flow of fluid to and from a respective one or group of said inflatable compartments; and the flow control modules are distributed through the cushion assembly.

9. A method of moving a load over a ground surface in a direction of travel, including:
   arranging the load on an inflatable cushion assembly,
   the cushion assembly including a plurality of inflatable compartments and a plurality of interconnected flexible walls;
   each compartment being separated from an adjacent one or ones of the compartments by a respective one or ones of the flexible walls, the flexible walls being arranged to define at least a first layer of said inflatable compartments, the first layer including at least first said inflatable compartments;
   the cushion assembly further including a tension means;
   the first compartments being inflated to define an inflated rest condition of the first layer in which all of the first compartments are inflated, each to an inflated condition, to form together a first fluid cushion which supports the load above the ground surface;
   and deflating and re-inflating selected ones of the first compartments in a sequence so as to produce a deflated region of the first fluid cushion which travels through the first fluid cushion in the direction of travel;
   and energizing the tension means so as to induce a tension force which acts between respective ones of the flexible walls on deflation of each respective first compartment from the inflated condition to a deflated condition;
   and pulling, by the tension force, a respective said flexible wall or walls of each deflating or deflated first compartment in a base region of the first layer forwardly in the direction of travel or upwardly away from the ground surface so as to produce a contraction in the deflated region of the first fluid cushion,
   the contraction travelling through the first fluid cushion so as to move the base region of the first layer of the cushion assembly progressively in the direction of travel.

10. A method according to claim 9, wherein the tension means is energized by inflation of a respective one or group of the said inflatable compartments.

11. A method according to claim 9, wherein the load is a ship, and the cushion assembly is arranged beneath the ship while the ship is afloat in water, and the base region of the first layer of the cushion assembly is moved progressively over a submerged ground surface so as to move the ship out of the water onto land.

12. An apparatus for moving a load over a ground surface in a direction of travel, including an inflatable cushion assembly and an inflation means for inflating the cushion assembly with a fluid;
   the cushion assembly including a plurality of inflatable compartments and a plurality of interconnected flexible walls;
   each compartment being separated from an adjacent one or ones of the compartments by a respective one or ones of the flexible walls, the flexible walls being arranged to define at least a first layer of said inflatable compartments;

the first layer including at least first said inflatable compartments and having an inflated rest condition in which all of the first compartments are inflated, each to an inflated condition, to form together a first fluid cushion which supports the load above the ground surface;

the cushion assembly further including a tension means;

wherein the tension means is arranged to induce a tension force between respective ones of the flexible walls, and to pull, by the tension force, a respective flexible wall or walls of each respective first compartment in a base region of the first layer, in the inflated condition of the said first compartment, forwardly in the direction of travel or upwardly away from the ground surface, so as to produce a local contraction in the first fluid cushion;

and the tension means is operable to apply the tension force to the said respective flexible walls of selected ones of the first compartments in a sequence, so that the contraction travels through the first fluid cushion and moves the base region of the first layer of the cushion assembly progressively in the direction of travel.

13. An apparatus according to claim 12, wherein the tension means comprises a plurality of second said inflatable compartments, each second compartment being arranged between respective ones of the flexible walls;

each second compartment being arranged to apply the tension force to a flexible wall or walls of a respective one or group of the first compartments when the second compartment is inflated from a deflated condition to an inflated condition;

and the inflation means is operable to inflate and deflate selected ones of the second compartments in a sequence; and wherein each second compartment is arranged between a pair of the flexible walls;

and the respective pair of walls are arranged in proximate opposed relation in the deflated condition of the second compartment, and are urged apart in the inflated condition of the second compartment so as to induce the tension force in the respective pair of walls, the tension force acting to pull spaced portions of the respective pair of walls, one towards another;

the said spaced portions being arranged to pull said flexible wall or walls of said respective one or group of the first compartments in the base region of the first layer forwardly in the direction of travel or upwardly away from the ground surface, so as to produce the contraction in the first fluid cushion.

14. An apparatus according to claim 12, wherein each of the first compartments comprises at least one inflatable bladder which is arranged between a respective group of said flexible walls.

15. An apparatus according to claim 12, wherein the flexible walls are arranged to define an upper layer of upper said inflatable compartments above the first layer, the upper layer having an inflated condition in which all of the upper compartments are inflated to form together an upper fluid cushion which supports the load above the first fluid cushion.

16. An apparatus according to claim 12, wherein a spool is provided, and the cushion assembly is wound onto the spool in a deflated condition.

17. An apparatus according to claim 12, wherein the inflation means includes a plurality of flow control modules, each flow control module including a respective valve-assembly, each valve assembly being arranged to control a flow of fluid to and from a respective one or group of said inflatable compartments; and the flow control modules are distributed through the cushion assembly.

18. A method of moving a load over a ground surface in a direction of travel, including:

arranging the load on an inflatable cushion assembly, the cushion assembly including a plurality of inflatable compartments and a plurality of interconnected flexible walls;

each compartment being separated from an adjacent one or ones of the compartments by a respective one or ones of the flexible walls, the flexible walls being arranged to define at least a first layer of said inflatable compartments, the first layer including at least first said inflatable compartments;

the cushion assembly further including a tension means;

the first compartments being inflated to define an inflated rest condition of the first layer in which all of the first compartments are inflated, each to an inflated condition, to form together a first fluid cushion which supports the load above the ground surface;

and energizing the tension means so as to induce a tension force between respective ones of the flexible walls;

and pulling, by the tension force, a respective flexible wall or walls of each respective first compartment in a base region of the first layer, in the inflated condition of the said first compartment, forwardly in the direction of travel or upwardly away from the ground surface, so as to produce a local contraction in the first fluid cushion;

the tension means being energized to apply the tension force to the said respective flexible walls of selected ones of the first compartments in a sequence, so that the contraction travels through the first fluid cushion and moves the base region of the first layer of the cushion assembly progressively in the direction of travel.

19. A method according to claim 18, wherein the tension means comprises a plurality of second said inflatable compartments, each second compartment being arranged between respective ones of the flexible walls;

and the inflation means is operated to inflate and deflate selected ones of the second compartments in a sequence so as to apply the tension force to the flexible walls of the selected ones of the first compartments.

20. A method according to claim 19, wherein each second compartment is arranged between respective adjacent ones of the first compartments; and the inflation means is operated to inflate each second compartment to a higher pressure than the respective adjacent ones of the first compartments.

21. A method according to claim 18, wherein the load is a ship, and the cushion assembly is arranged beneath the ship while the ship is afloat in water, and the base region of the first layer of the cushion assembly is moved progressively over a submerged ground surface so as to move the ship out of the water onto land.

22. An apparatus for use in moving a load over a ground surface in a direction of travel, including:

an inflatable cushion assembly, an inflation means for inflating the cushion assembly, and a control system;

the cushion assembly including a plurality of inflatable compartments separated by a plurality of interconnected flexible walls, the flexible walls being arranged to define at least a first layer of said inflatable compartments;

the first layer including at least first said inflatable compartments and having an inflated rest condition in which all of the first compartments are inflated, each to an inflated condition, to form together a first fluid cushion for supporting the load above the ground surface;

the inflation means including a plurality of valve assemblies, each valve assembly being arranged to control a flow of fluid to and from a respective one or group of said inflatable compartments;

each valve assembly being individually controllable by the control system to selectively inflate and deflate the respective one or group of said inflatable compartments;

the cushion assembly being flexibly foldable or rollable in a deflated condition from a use configuration to a storage configuration;

wherein the inflation means includes a plurality of individual flow control modules, each flow control module including a respective one of the valve assemblies, and the flow control modules are distributed through the cushion assembly; and wherein the cushion assembly further includes a first network of first flexible hoses which connect together the flow control modules and conduct the fluid to the respective inflatable compartments, and a second network of second flexible hoses which connect together the flow control modules and conduct the fluid away from respective deflating ones of the inflatable compartments; and wherein each flow control module includes a pump for pumping the fluid, and each pump is arranged to pump the fluid from the second network to the first network.

23. A method of moving a load over a ground surface in a direction of travel, including:

providing an inflatable cushion assembly, an inflation means for inflating the cushion assembly, and a control system;

the cushion assembly including a plurality of inflatable compartments separated by a plurality of interconnected flexible walls, the flexible walls being arranged to define at least a first layer of said inflatable compartments;

the first layer including at least first said inflatable compartments and having an inflated rest condition in which all of the first compartments are inflated, each to an inflated condition, to form together a first fluid cushion for supporting the load above the ground surface;

the inflation means including a plurality of valve assemblies, each valve assembly being arranged to control a flow of fluid to and from a respective one or group of said inflatable compartments;

the cushion assembly being flexibly foldable or rollable in a deflated condition from a use configuration to a storage configuration;

wherein the load is supported on the first fluid cushion while a base region of the cushion assembly is moved progressively over the ground surface in the direction of travel;

and the inflation means includes a plurality of individual flow control modules, each flow control module including a respective one of the valve assemblies, and the flow control modules are distributed through the cushion assembly;

and the valve assembly of each flow control module is individually controlled by signals from the control system to selectively inflate and deflate the respective one or group of said inflatable compartments;

and after deflating the cushion assembly to the deflated condition the cushion assembly including the flow control modules together with the inflatable compartments and flexible walls is folded or rolled to the storage configuration; and wherein a plurality of pumps are provided, each of the flow control modules including a respective one of the pumps, and the pumps are operated to pump the fluid from respective deflating ones of the inflatable compartments to respective inflating ones of the inflatable compartments.

* * * * *